United States Patent
Geramita et al.

(10) Patent No.: US 9,714,172 B2
(45) Date of Patent: *Jul. 25, 2017

(54) PREPARATION OF POLYMERIC RESINS AND CARBON MATERIALS

(71) Applicants: Georgia-Pacific Chemicals LLC, Atlanta, GA (US); Energ2 Technologies, Inc., Seattle, WA (US)

(72) Inventors: Katharine Geramita, Seattle, WA (US); Benjamin E. Kron, Seattle, WA (US); Henry R. Costantino, Woodinville, WA (US); Aaron M. Feaver, Seattle, WA (US); Avery Sakshaug, Lynnwood, WA (US); Leah A. Thompkins, Seattle, WA (US); Alan Tzu-Yang Chang, Renton, WA (US); Xing Dong, Decatur, GA (US); Shahid P. Qureshi, Duluth, GA (US); John B. Hines, Atlanta, GA (US); Gerald A. Knazek, Alpharetta, GA (US); Joseph Frank Ludvik, Midlothian, VA (US)

(73) Assignees: Georgia-Pacific Chemicals LLC, Atlanta, GA (US); EnerG2 Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/647,322

(22) PCT Filed: Nov. 26, 2013

(86) PCT No.: PCT/US2013/072050
§ 371 (c)(1),
(2) Date: May 26, 2015

(87) PCT Pub. No.: WO2014/082086
PCT Pub. Date: May 30, 2014

(65) Prior Publication Data
US 2015/0321920 A1 Nov. 12, 2015

Related U.S. Application Data

(60) Provisional application No. 61/729,967, filed on Nov. 26, 2012.

(51) Int. Cl.
| | | |
|---|---|---|
| C01B 31/02 | (2006.01) |
| C01B 31/08 | (2006.01) |
| H01M 4/583 | (2010.01) |
| H01G 11/34 | (2013.01) |
| H01G 11/38 | (2013.01) |
| H01G 11/04 | (2013.01) |
| B01J 6/00 | (2006.01) |
| C01B 31/00 | (2006.01) |
| H01M 4/587 | (2010.01) |
| H01M 4/96 | (2006.01) |

(52) U.S. Cl.
CPC .......... *C01B 31/08* (2013.01); *B01J 6/00* (2013.01); *C01B 31/00* (2013.01); *C01B 31/02* (2013.01); *H01G 11/04* (2013.01); *H01G 11/34* (2013.01); *H01G 11/38* (2013.01); *H01M 4/583* (2013.01); *C01P 2004/51* (2013.01); *C01P 2006/12* (2013.01); *C01P 2006/14* (2013.01); *C01P 2006/16* (2013.01); *C01P 2006/17* (2013.01); *H01M 4/587* (2013.01); *H01M 4/96* (2013.01)

(58) Field of Classification Search
CPC ...................................................... C01B 31/02
See application file for complete search history.

(56) References Cited

U.S. PATENT DOCUMENTS

| | | |
|---|---|---|
| 5,908,896 A | 6/1999 | Mayer et al. |
| 2010/0092370 A1 | 4/2010 | Zhang et al. |
| 2011/0223494 A1 | 9/2011 | Feaver et al. |
| 2012/0328881 A1 | 12/2012 | Quitmann et al. |

FOREIGN PATENT DOCUMENTS

| | | |
|---|---|---|
| EP | 2117068 | 11/2009 |
| JP | 2004315283 | 11/2004 |

(Continued)

OTHER PUBLICATIONS

Feng et al., "Structure control of ordered mesoporous carbon spheres prepared from suspension assist evaporation induced self-assembly," Journal of Inorganic Materials, vol. 24, No. 3, pp. 571-576.

(Continued)

*Primary Examiner* — Stuart Hendrickson
(74) *Attorney, Agent, or Firm* — Ram W. Sabnis

(57) ABSTRACT

Methods for making carbon materials are provided. In at least one specific embodiment, the method can include combining one or more polymer precursors with one or more liquids to produce a mixture. The mixture can be an emulsion, dispersion, or a suspension. The liquid can include hexane, pentane, cyclopentane, benzene, toluene, o-xylene, m-xylene, p-xylene, diethyl ether, ethylmethylketone, dichloromethane, tetrahydrofuran, mineral oils, paraffin oils, vegetable derived oils, or any mixture thereof. The method can also include aging the mixture at a temperature and time sufficient for the polymer precursor to react and form polymer gel particles having a volume average particle size (Dv,50) of the polymer particles in gel form greater than or equal to 1 mm. The method can also include heating the polymer gel particles to produce a carbon material.

20 Claims, 35 Drawing Sheets

(56) References Cited

FOREIGN PATENT DOCUMENTS

| WO | 9501165 | 1/1995 |
|---|---|---|
| WO | 2008061212 | 5/2008 |

OTHER PUBLICATIONS

Yamamoto et al., "Preparation and characterization of carbon cryogel microspheres," Carbon, Elsevier, Oxford, GB, vol. 40, No. 8, Jul. 1, 2002, pp. 1345-1351.

Wu et al., "Fabrication and nano-structure control of carbon aerogels via a microemulsion-templated sol-gel polymerization method," Carbon, Elsevier, Oxford, GB, vol. 44, No. 4, Apr. 1, 2006, pp. 675-681.

Tonanon et al., "Influence of surfactants on porous properties of carbon cryogels prepared by sol-gel polycondensation of resorcinol and formaldehyde," Carbon, Elsevier, Oxford, GB, vol. 41, No. 15, Jan. 1, 2003, pp. 2981-2990.

Hasegawa et al., "Preparation of carbon gel microspheres containing silicon powder for lithium ion battery anodes," Carbon, Elsevier, Oxford, GB, vol. 42, No. 12-13, Jan. 1, 2004, pp. 2573-2579.

Yamamoto et al., "Porous properties of carbon gel microspheres as adsorbents for gas separation," Carbon, Elsevier, Oxford, GB, vol. 42, No. 8-9, Jan. 1, 2004, pp. 1671-1676.

PREPARATION OF POLYMERIC RESINS AND CARBON MATERIALS

CROSS-REFERENCE TO RELATED APPLICATIONS APPLICATION

This is a National Stage application under 35 U.S.C. §371 of PCT/US2013/072050, filed on Nov. 26, 2013, and published as WO 2014/082086, which claims priority to U.S. Provisional Patent Application No. 61/729,967, filed Nov. 26, 2012, which are both incorporated by reference herein.

BACKGROUND

Technical Field

Embodiments disclosed herein generally relate to methods for making polymeric resin materials and carbon materials from the same.

Description of the Related Art

Activated carbon is commonly employed in electrical storage and distribution devices. The surface area, conductivity, and porosity of activated carbon allows for the design of electrical devices having desirable electrochemical performance. Electric double-layer capacitors (EDLCs or "ultracapacitors") are an example of such devices. EDLCs often have electrodes prepared from an activated carbon material and a suitable electrolyte, and have an extremely high energy density compared to more common capacitors. Typical uses for EDLCs include energy storage and distribution in devices requiring short bursts of power for data transmissions, or peak-power functions such as wireless modems, mobile phones, digital cameras and other hand-held electronic devices. EDLCs are also commonly used in electric vehicles such as electric cars, trains, buses, and the like.

Batteries are another common energy storage and distribution device which often contain an activated carbon material (e.g., as anode material, current collector, or conductivity enhancer). For example, lithium/carbon batteries having a carbonaceous anode intercalated with lithium represent a promising energy storage device. Other types of carbon-containing batteries include lithium air batteries, which use porous carbon as the current collector for the air electrode, and lead acid batteries which often include carbon additives in either the anode or cathode. Batteries are employed in any number of electronic devices requiring low current density electrical power (as compared to an EDLC's high current density).

One known limitation of EDLCs and carbon-based batteries is decreased performance at high-temperature, high voltage operation, repeated charge/discharge cycles, and/or upon aging. This decreased performance has been attributed, at least in part, to electrolyte impurity or impurities in the carbon electrode itself, causing breakdown of the electrode at the electrolyte/electrode interface. Thus, it has been suggested that EDLCs and/or batteries comprising electrodes prepared from higher purity carbon materials could be operated at higher voltages and for longer periods of time at higher temperatures than existing devices.

In addition to purity, another known limitation of carbon-containing electrical devices is the pore structure of the activated carbon itself. While activated carbon materials typically comprise high porosity, the pore size distribution is not optimized for use in electrical energy storage and distribution devices. Such optimization may include a blend of both micropores and mesopores. Additionally in some applications a high surface area carbon material may be desirable, while in others a low surface area carbon material is preferred. Idealized pore size distributions can maximize performance attributes including, but not limited to, increased ion mobility (i.e., lower resistance), increased power density, improved volumetric capacitance, increased cycle life efficiency of devices prepared from the optimized carbon materials.

One common method for producing carbon materials is to pyrolyze an existing carbon-containing material (e.g., coconut fibers or tire rubber). This results in a char with relatively low surface area which can subsequently be over-activated to produce a material with the surface area and porosity necessary for the desired application. Such an approach is inherently limited by the existing structure of the precursor material, and typically results in a carbon material having an unoptimized pore structure and an ash content (e.g., metal impurities) of 1% or higher.

Activated carbon materials can also be prepared by chemical activation. For example, treatment of a carbon-containing material with an acid, base, or salt (e.g., phosphoric acid, potassium hydroxide, sodium hydroxide, zinc chloride, etc.) followed by heating results in an activated carbon material. However, such chemical activation results in relatively high levels of undesired non-carbon elements (even after washing procedures), that in turn impair the carbon performance in electrical devices.

Another approach for producing high surface area activated carbon materials is to prepare a synthetic polymer from carbon-containing organic building blocks (e.g., a polymer gel). As with the existing organic materials, the synthetically prepared polymers are pyrolyzed and activated to produce an activated carbon material. In contrast to the traditional approach described above, the intrinsic porosity of the synthetically prepared polymer results in higher process yields because less material is lost during the activation step. Although such methods may be applicable in laboratory or small-scale settings, preparation of large quantities of carbon materials via synthetic polymers may be limited at large scales. For example, the solid polymer gel monoliths generally obtained may be difficult to work with (e.g., transfer from one vessel to another, milling, grinding, etc.) at the scales needed for industrial applicability, and the exothermic nature of the polymerization may be difficult to control. Accordingly, methods for preparation of high grade carbon materials that are applicable to large scale-scale syntheses are needed.

While significant advances have been made in the field, there continues to be a need in the art for improved methods for preparation of carbon materials.

BRIEF SUMMARY

Methods for making carbon materials are provided. In at least one specific embodiment, the method can include combining one or more polymer precursors with one or more liquids to produce a mixture. The mixture can be an emulsion, dispersion, or a suspension. The liquid can include hexane, pentane, cyclopentane, benzene, toluene, o-xylene, m-xylene, p-xylene, diethyl ether, ethylmethylketone, dichloromethane, tetrahydrofuran, mineral oils, paraffin oils, vegetable derived oils, or any mixture thereof. The method can also include aging the mixture at a temperature and time sufficient for the polymer precursor to react and form polymer gel particles having a volume average particle size ($D_v$,50) of the polymer particles in gel form greater than or equal to 1 mm. The method can also include heating the polymer gel particles to produce a carbon material.

In at least one other specific embodiment, the method for making a carbon material can include heating polycondensation polymer gel particles to produce a carbon material. The polycondensation polymer gel particles can be prepared by a process that includes preparing a mixture comprising a continuous phase and a polymer phase. The polymer phase can include one or more polymer precursors. The continuous phase can include hexane, pentane, cyclopentane, benzene, toluene, o-xylene, m-xylene, p-xylene, diethyl ether, ethylmethylketone, dichloromethane, tetrahydrofuran, mineral oils, paraffin oils, vegetable derived oils, or any mixture thereof. The mixture can be aged at a temperature and for a time sufficient for the polymer precursor to react and form the polycondensation polymer gel particles. The polycondensation polymer gel particles can have a volume average particle size (Dv,50) greater than or equal to 1 mm.

In at least one other specific embodiment, the method for preparing a carbon material can include admixing a surfactant, one or more polymer precursors, water, and an organic solvent to produce an emulsion or suspension. A total weight of the surfactant and organic solvent can be less than 50 wt % cyclohexane. The method can also include aging the emulsion or suspension at a temperature and for a time sufficient for the one or more polymer precursors to react with one another and form condensation polymer gel particles having a volume average particle size (Dv,50) greater than or equal to 1 mm. The method can also include heating the condensation polymer gel particles to produce a carbon material.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
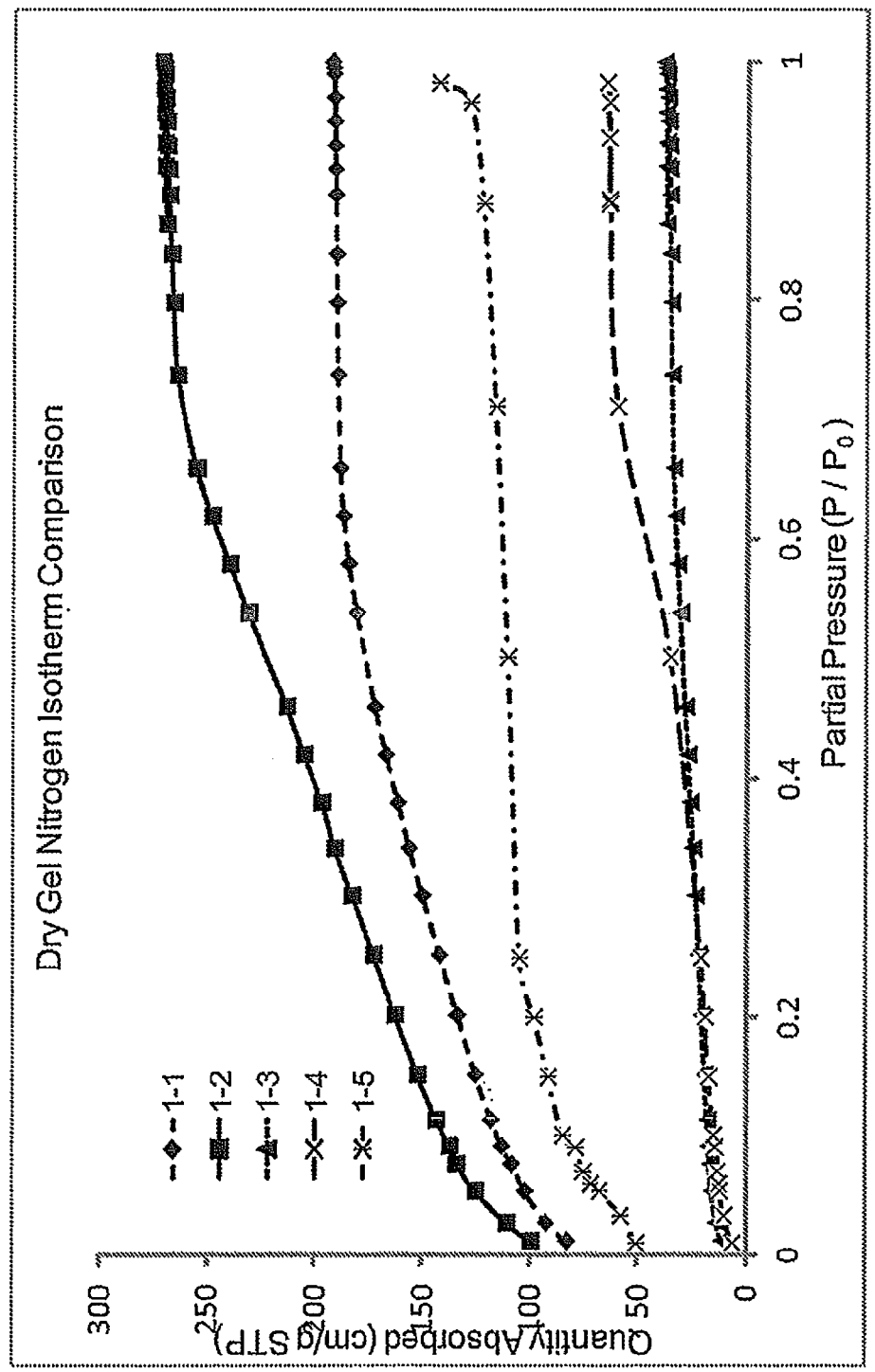
FIG. 1 shows $N_2$ absorption isotherms for freeze dried gels.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

DEFINITIONS

As used herein, and unless the context dictates otherwise, the following terms have the meanings as specified below.

"Carbon material" refers to a material or substance composed substantially of carbon (e.g., greater than 90%, greater than 95%, greater than 99%, or greater than 99.9% carbon on a weight basis). Carbon materials include ultrapure as well as amorphous and crystalline carbon materials. Some carbon materials can include electrochemical modifiers (e.g., Si or N) to modify (e.g., enhance) device performance as described in more detail below. Examples of carbon materials can include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels, and the like.

"Electrochemical modifier" refers to any chemical element, compound that includes a chemical element, or any combination of different chemical elements and/or compounds that modifies (e.g., enhances or decreases) the electrochemical performance of a carbon material. Electrochemical modifiers can change (increase or decrease) the resistance, capacity, power performance, stability, and other properties of a carbon material. Electrochemical modifiers generally impart a desired electrochemical effect. In contrast, an impurity in a carbon material is generally undesired and tends to degrade, rather than enhance, the electrochemical performance of the carbon material. Examples of electrochemical modifiers within the context of the present disclosure include, but are not limited to, elements, and compounds or oxides comprising elements, in groups 12-15 of the periodic table, other elements such as sulfur, tungsten and silver and combinations thereof. For example, electrochemical modifiers include, but are not limited to, lead, tin, antimony, bismuth, arsenic, tungsten, silver, zinc, cadmium, indium, silicon, and combinations thereof, as well as oxides of the same, and compounds that include the same.

"Group 12" elements include zinc (Zn), cadmium (Cd), mercury (Hg), and copernicium (Cn).

"Group 13" elements include boron (B), aluminum (Al), gallium (Ga), indium (In) and thallium (Tl).

"Group 14" elements include carbon (C), silicon (Si), germanium (Ge), tin (Sn) and lead (Pb).

"Group 15" elements include nitrogen (N), phosphorous (P), arsenic (As), antimony (Sb) and bismuth (Bi).

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphene.

"Synthetic" refers to a substance which has been prepared by chemical means rather than from a natural source. For example, a synthetic carbon material is one which is synthesized from precursor materials and is not isolated from natural sources.

"Impurity" or "impurity element" refers to a foreign substance (e.g., a chemical element) within a base material that differs from the chemical composition of the base material, where the foreign substance is not intentionally added. For example, an impurity in a carbon material refers to any element or combination of elements, other than carbon, which is present in the carbon material. Impurity levels are typically expressed in parts per million (ppm).

"PIXE impurity" or "PIXE element" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, a polymer gel or a carbon material. PIXE impurity concentrations and identities may be determined by proton induced x-ray emission (PIXE).

"Ultrapure" refers to a substance having a total PIXE impurity content of less than 0.050%. For example, an "ultrapure carbon material" is a carbon material having a total PIXE impurity content of less than 0.050% (i.e., 500 ppm).

"Ash content" refers to the nonvolatile inorganic matter which remains after subjecting a substance to a decomposition temperature. Herein, the ash content of a carbon material is calculated from the total PIXE impurity content as measured by proton induced x-ray emission, assuming that any elements detected by PIXE are completely converted to expected combustion products (i.e., oxides).

"Polymer" refers to a macromolecule comprised of one or more structural repeating units.

"Synthetic polymer precursor material" or "polymer precursor" refer to compounds used in the preparation of a synthetic polymer. Polymer precursors are generally compounds that may be combined (i.e., reacted) with other compounds to form a polymer, for example a condensation polymer. Polymer precursors include monomers, as well as monomers which have been partially polymerized (i.e., dimers, oligomers, etc.). Generally, the polymer precursors are selected from aromatic or aliphatic alcohols or amines and carbonyl containing compounds (e.g., carboxylic acids, ketones, aldehydes, isocyanates, ureas, amides, acid halides, esters, activated carbonyl-containing compounds and the like). Examples of polymer precursors that can be used in certain embodiments of the preparations disclosed herein can include, but are not limited to, aldehydes (i.e., HC(=O)R, where R is an organic group), such as for example, methanal (formaldehyde); ethanal (acetaldehyde); propanal (propionaldehyde); butanal (butyraldehyde); furfural (furfuraldehyde), glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Amines, such as melamine, and/or urea may also be used. Mixtures of two or more polyhydroxy benzenes are also contemplated within the meaning of polymer precursor. In one or more embodiments, the terms "polymer phase" and "prepolymer" mean the same thing as the term "polymer precursor" as defined herein.

"Condensation polymer" is a polymer that results from reaction of one or more polymer precursors with elimination of a small molecule (e.g., water). Exemplary condensation polymers include, but are not limited to, polymers formed from reaction of an alcohol or amine with a carbonyl containing compound.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel where the solvent for the synthetic precursors or monomers is water or mixtures of water and one or more water-miscible solvents.

"RF polymer hydrogel" refers to a sub-class of polymer gel where the polymer was formed from the catalyzed reaction of resorcinol and formaldehyde in water or mixtures of water and one or more water-miscible solvents.

"Continuous Phase" refers to the liquid phase in which the polymerization components (i.e., polymer precursors, catalyst, acid, etc.) are dissolved, suspended and/or emulsified. Continuous phases may be either hydrophilic or hydrophobic and have varying viscosities. Mixtures of two or more different continuous phases are also contemplated. Any number of different liquids (e.g., solvents) may be employed within the context of the invention as described in more detail herein.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields a basic solution when dissolved in a solvent. The term "basic" means having the properties of a base.

"Mixed solvent system" refers to a solvent system comprised of two or more solvents, for example, two or more miscible solvents. Examples of binary solvent systems (i.e., a mixed solvent containing two solvents) include, but are not limited to: water and acetic acid; water and formic acid; water and propionic acid; water and butyric acid and the like. Examples of ternary solvent systems (i.e., containing three solvents) include, but are not limited to: water, acetic acid, and ethanol; water, acetic acid and acetone; water, acetic acid, and formic acid; water, acetic acid, and propionic acid; and the like. The present invention contemplates all mixed solvent systems comprising two or more solvents.

"Miscible" refers to the property of a mixture where the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a polymer gel (e.g., an ultrapure polymer gel) as described herein can be any compound that facilitates the polymerization of the polymer precursors to form an ultrapure polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Solvent" refers to a substance which dissolves or suspends reactants (e.g., ultrapure polymer precursors) and provides a medium in which a reaction may occur. Examples of solvents useful in the preparation of the gels, ultrapure polymer gels, ultrapure synthetic carbon materials and ultrapure synthetic amorphous carbon materials disclosed herein include, but are not limited to, water, alcohols and mixtures thereof. Exemplary alcohols include ethanol, t-butanol, methanol and mixtures thereof. Such solvents are useful for dissolution of the synthetic ultrapure polymer precursor materials, for example dissolution of a phenolic or aldehyde compound. In addition, in some processes such solvents are employed for solvent exchange in a polymer hydrogel (prior to freezing and drying), where the solvent from the polymerization of the precursors, for example, resorcinol and formaldehyde, is exchanged for a pure alcohol. In one embodiment of the present application, a cryogel is prepared by a process that does not include solvent exchange.

"Percent solids" refers to the total amount of polymer forming agents (e.g., resorcinol, phenol, formaldehyde, urea, etc.) added to the system divided by the total amount of monomer forming agents and liquids (e.g., water, acetic acid, etc.). The calculation does not include any catalysts or otherwise.

"Added water" refers to water independently added to the system (either as a pre-mix or as part of the main solution) and does not include any water that is critical to the formation of a given monomer.

"Dried gel" or "dried polymer gel" refers to a gel or polymer gel, respectively, from which the solvent, generally water, or mixture of water and one or more water-miscible solvents, has been substantially removed, for example by methods known in the art such as freeze drying, spray drying, vacuum drying, solvent extraction, and the like.

"Pyrolyzed dried polymer gel" refers to a dried polymer gel which has been pyrolyzed but not yet activated, while an "activated dried polymer gel" refers to a dried polymer gel which has been activated.

"Cryogel" refers to a dried gel that has been dried by freeze drying.

"RF cryogel" refers to a dried gel that has been dried by freeze drying where the gel was formed from the catalyzed reaction of resorcinol and formaldehyde.

"Pyrolyzed cryogel" is a cryogel that has been pyrolyzed but not yet activated.

"Activated cryogel" is a cryogel which has been activated to obtain activated carbon material.

"Xerogel" refers to a dried gel that has been dried by air drying, for example, at or below atmospheric pressure.

"Pyrolyzed xerogel" is a xerogel that has been pyrolyzed but not yet activated.

"Activated xerogel" is a xerogel which has been activated to obtain activated carbon material.

"Aerogel" refers to a dried gel that has been dried by supercritical drying, for example, using supercritical carbon dioxide.

"Pyrolyzed aerogel" is an aerogel that has been pyrolyzed but not yet activated.

"Activated aerogel" is an aerogel which has been activated to obtain activated carbon material.

"Organic extraction solvent" refers to an organic solvent added to a polymer hydrogel after polymerization of the polymer precursors has begun, generally after polymerization of the polymer hydrogel is complete.

"Rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about $-10°$ C. Alternatively, the suitably cold medium can be a gas, liquid, or solid with a temperature below about $-20°$ C. Alternatively, the suitably cold medium can be a gas, liquid, or solid with a temperature below about $-30°$ C.

"Activate" and "activation" each refer to the process of heating a raw material or carbonized/pyrolyzed substance at an activation dwell temperature during exposure to oxidizing atmospheres (e.g., carbon dioxide, oxygen, steam or combinations thereof) to produce an "activated" substance (e.g., activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon, nitrogen or combinations thereof) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution and pore length. Generally the pore structure of an activated carbon material comprises micropores and mesopores. For example, in certain embodiments the ratio of micropores to mesopores is optimized for enhanced electrochemical performance.

"Mesopore" generally refers to a pore having a diameter ranging from 2 nanometers to 50 nanometers while the term "micropore" refers to a pore having a diameter less than 2 nanometers.

"Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Effective length" refers to the portion of the length of the pore that is of sufficient diameter such that it is available to accept salt ions from the electrolyte.

"Electrode" refers to a conductor through which electricity enters or leaves an object, substance or region.

"Binder" refers to a material capable of holding individual particles of a substance (e.g., a carbon material) together such that after mixing a binder and the particles together the resulting mixture can be formed into sheets, pellets, disks or other shapes. In certain embodiments, an electrode may comprise the disclosed carbon materials and a binder. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol, combinations thereof, and mixtures thereof.

"Inert" refers to a material that is not active in the electrolyte of an electrical energy storage device, that is it does not absorb a significant amount of ions or change chemically, e.g., degrade.

"Conductive" refers to the ability of a material to conduct electrons through transmission of loosely held valence electrons.

"Current collector" refers to a part of an electrical energy storage and/or distribution device which provides an electrical connection to facilitate the flow of electricity in to, or out of, the device. Current collectors often comprise metal and/or other conductive materials and may be used as a backing for electrodes to facilitate the flow of electricity to and from the electrode.

"Electrolyte" means a substance containing free ions such that the substance is electrically conductive. Electrolytes are commonly employed in electrical energy storage devices. Examples of electrolytes include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as tetralkylammonium salts such as TEA TFB (tetraethylammonium tetrafluoroborate), MTEATFB (methyltriethylammonium tetrafluoroborate), EMITFB (1-ethyl-3-methylimidazolium tetrafluoroborate), tetraethylammonium, triethylammonium based salts or mixtures thereof. In some embodiments, the electrolyte can be a water-based acid or water-based base electrolyte such as mild aqueous sulfuric acid or aqueous potassium hydroxide.

An "amine" is a compound including a nitrogen atom, such as —NH2.

An "alcohol" is a compound including a —OH moiety.

A "carbonyl" is a compound including a carbon double bonded to oxygen (C=O).

A "phenol" refers to an aromatic ring (e.g., benzene) having one or more alcohol moieties attached thereto. Phenol and resorcinol are both "phenols."

A "polyalcohol" refers to any compound having more than one alcohol moiety.

A "sugar" is a polyalcohol such as glucose, fructose, lactose and the like.

An "alkylamine" refers to an alkyl group (i.e., a saturated or unsaturated optionally substituted hydrocarbon compound) comprising an amine moiety (e.g., methyl amine and the like).

An "aromatic amine" refers to an aromatic group (i.e., a cyclic, unsaturated hydrocarbon having a cyclic array of conjugated pi bonds, such as benzene) comprising an amine group (e.g., aniline and the like).

An "aldehyde" is a compound comprising a —C(=O)H moiety.

A "ketone" refers to a compound comprising a —C(=O)— moiety.

A "carboxylic acid" is a compound containing a —C(=O)OH moiety.

An "ester" is a compound having a —C(=O)O— moiety.

An "acid halide" is any compound comprising a —C(=O)X moiety, where X is fluorine, chlorine, bromine, iodide or astatine.

"Isocyanate" refers to compounds comprising a —N=C=O moiety.

"Carrier fluid" can refer to a suspension fluid, solvent, diluent, dispersion fluid, emulsion fluid, and/or the continuous phase of the suspension and/or emulsion. In one or more embodiments, the term "continuous phase" has the same definition as "carrier fluid" as defined herein. In one or more embodiments, the term carrier fluid has the same definition as "continuous phase" as defined herein. In one or more embodiments, the term "carrier fluid" has the same definition as "solvent" as defined herein. In one or more embodiments, the term "solvent" has the same definition as "carrier fluid" as defined herein.

"Suspension process," "suspension polymerization process," "dispersion process," and "dispersion polymerization process" are used interchangeably and refer to a heterogeneous polymerization process that mixes the reactant mixture in the carrier or "continuous phase" fluid such as a hydrocarbon and/or water, where the reactant mixture phase and the carrier or continuous phase fluid are not miscible. In some embodiments, the reactant mixture can be suspended or dispersed in the carrier fluid or continuous phase as droplets, where the monomer component undergoes polymerization to form particles of polymer and/or curing to form cured particles of polymer. In some embodiments, the reaction mixture can be agitated. In some embodiments, the reaction mixture is not agitated.

"Emulsion process" and "emulsion polymerization process" refer to both "normal" emulsions and "inverse" emulsions. Emulsions differ from suspensions in one or more aspects. One difference is that an emulsion will usually include the use of a surfactant that creates or forms the emulsions (very small size droplets). When the carrier or continuous phase fluid is a hydrophilic fluid such as water and the reactant mixture phase is a hydrophobic compound(s), normal emulsions (e.g., oil-in-water) form, where droplets of monomers are emulsified with the aid of a surfactant in the carrier or continuous phase fluid. Monomers react in these small size droplets. These droplets are typically small in size as the particles are stopped from coagulating with each other because each particle is surrounded by the surfactant and the charge on the surfactant electrostatically repels other particles. Whereas suspension polymerization usually creates much larger particles than those made with emulsion polymerization. When the carrier or continuous phase fluid is a hydrophobic fluid such as oil and the reactant mixture phase is hydrophilic compounds, inverse-emulsions (e.g., water-in-oil) form.

As used herein, the terms "suspension and/or emulsion process" and "suspension and/or emulsion polymerization" are not limited to or necessarily refer to traditional polymerization. Instead, the terms "suspension and/or emulsion process" and "suspension and/or emulsion polymerization" may, but not necessarily, refer to a curing process or a combination of traditional polymerization and a curing process. As discussed and described herein, in one or more embodiments, the monomer component can be or include a prepolymer and/or a polymer in addition to or in lieu of the monomer mixture alone. The curing process refers to the further cross-linking or hardening of the polymer as compared to the polymerization of a monomer mixture. As such, if a pre-polymer is present, the suspension/emulsion process can, in addition to or in lieu of polymerization, also include the curing process. As used herein, the term "curing" refers to the toughening or hardening of polymers via an increased degree of cross-linking of polymer chains. Cross-linking refers to the structural and/or morphological change that occurs in the pre-polymer and/or polymer, such as by covalent chemical reaction, ionic interaction or clustering, phase transformation or inversion, and/or hydrogen bonding.

As used herein, the terms "polymer particulates in gel form" and "polymer particles in gel form" are used interchangeably and refer to a network of polymer chains that have one or more pores or voids therein, and a liquid at least partially occupies or fills the one or more pores or voids. As used herein, the terms "dried polymer particulates" and "dried polymer particles" are used interchangeably and refer to a network of polymer chains having one or more pores or voids therein, and a gas at least partially occupies or fills the one or more pores or voids. If the liquid that at least partially occupies or fills the voids is water, the polymer particles can be referred to as "hydrogel polymer particles."

"Monomer component" can include, but is not limited to, one or more phenolic compounds and/or one or more crosslinking compounds; and/or a prepolymer. If the phenolic compound can polymerize and crosslink with itself, the use of the crosslinking compound can be optional. In another example, the phenolic compound and all or a portion of the crosslinking compound can polymerize with one another to form the polymer particles in gel form. In another example, the phenolic compound and the crosslinking compound can react or crosslink with one another to produce the polymer particles in gel form. In another example, the phenolic compound and the crosslinking compound can polymerize with one another and/or crosslink with one another to produce the polymer particles in gel form. In one or more embodiments, the term "polymer precursor" means the same thing as the term "monomer component" as defined herein.

As used herein, "particle size" refers to the volume average particle size (Dv,50) as measured either by visual counting and measurement of individual particles or by laser light scattering of particles in a suspension fluid. The volume average particle size is determined by image capture using a digital camera and ImageJ freeware, for particles above 0.1 mm in diameter. Particles sizes below 0.1 mm are determined by dilute dispersions in water by light scattering using a Malvern MASTERSIZER® 3000. Samples below 0.1 mm are added to the Malvern analyzer until the recommended obscuration level is obtained.

As used herein, "span" is defined as $((Dv,90)-(Dv,10))/(Dv,50)$, where the Dv,10 and Dv,50 and the Dv,90 are the volume particle sizes measured at 10%, 50%, and 90% of the size distribution respectively, where the particle size distribution is measured either by visual counting and measurement of individual particles or by laser light scattering of particles in a suspension fluid.

As used herein, "normalized F/cc" or "maximum theoretical F/cc" is defined as the capacitance expressed per envelope volume of carbon particles (the sum of carbon skeletal volume and carbon pore volume); note that this envelope volume does not include any inter-particle volume.

A. Preparation of Polymer Gels and Carbon Materials

The disclosed preparation of carbon materials represents a number of advances over currently known methods for preparation of carbon materials. For example, similar carbon materials have traditionally been made by admixing polymer precursors and allowing them to polymerize into a polymer monolith. The monolith must then be isolated and ground or milled to small particles before it can be pyrolyzed and/or activated into carbon materials. Such procedures suffer from a number of drawbacks. For example, at large scales previously described monolith preparations present significant material handling problems and the possibility of heterogenous polymerizations and/or uncontrolled exothermic reactions. Furthermore, other considerations, such as the incompatibility of typical production equipment (e.g., ovens, etc.) with known monolith procedures, makes scale up of these procedures challenging and economically difficult.

The present methods overcome these limitations and represent a number of other improvements. For example, the described polymerizations provide the possibility to isolate the gel product by filtration or by decanting excess solvent, thus making the methods amendable to large scale production. Furthermore, heat transfer is more effective in the present methods compared to monolith procedures, thus the products are expected to be more homogeneous and the risk of uncontrolled exotherms is significantly reduced. Furthermore, by changing the gel formulation and/or processing parameters, carbon materials having certain desired characteristics (e.g., microporosity, mesoporosity, high density, low density, specific particle sizes, near monodisperse particle size distributions, etc.) can be obtained without additional processing steps (e.g., milling, etc.). Certain aspects of the disclosed methods are described in more detail in the following sections.

The various physical and chemical properties of the carbon materials and polymer gels can be as discussed and described in the following section and can also be as discussed and described in co-pending U.S. application Ser. Nos. 12/748,219; 12/897,969; 12/829,282; 13/046,572; 12/965,709; 13/336,975; and 61/585,611.

1. Preparation of Polymer Gels

As noted above, one embodiment of the present disclosure provides methods for preparation of polymer gels and carbon materials. For example, in one embodiment the present application provides a method for preparing a condensation polymer gel via an emulsion or suspension process, the method can include: a) preparing a mixture that includes a continuous phase and a polymer phase, where the polymer phase includes one or more polymer precursors and an optional solvent; and b) aging the mixture at a temperature and for a time sufficient for the one or more polymer precursors to react with each other and form a condensation polymer gel. The polymer phase can also be referred to as a discontinuous phase.

In another embodiment, the disclosed methods include preparing a dried condensation polymer gel, the method can include drying a condensation polymer gel, where the condensation polymer gel has been prepared by an emulsion or suspension process including: a) preparing a mixture that includes a continuous phase and a polymer phase, where the polymer phase includes one or more polymer precursors and an optional solvent; and b) aging the mixture at a temperature and for a time sufficient for the one or more polymer precursors to react with each other and form a condensation polymer gel.

In yet other embodiments, a method for preparing a pyrolyzed carbon material can include pyrolyzing condensation polymer gel particles to obtain a pyrolyzed carbon material, where the condensation polymer gel particles have been prepared by a process comprising: a) preparing a mixture that includes a continuous phase and a polymer phase, where the polymer phase includes one or more polymer precursors and an optional solvent; and b) aging the mixture at a temperature and for a time sufficient for the one or more polymer precursors to react with each other and form a condensation polymer gel.

In yet other embodiments, a method for preparing an activated carbon material can include activation of pyrolyzed carbon derived from condensation polymer gel particles, where the condensation polymer gel particles have been prepared by a process comprising: a) preparing a mixture that includes a continuous phase and a polymer phase, where the polymer phase includes one or more polymer precursors and an optional solvent; and b) aging the mixture at a temperature and for a time sufficient for the one or more polymer precursors to react with each other and form a condensation polymer gel.

The condensation polymer gel may be used without drying or the methods can further include drying the condensation polymer gel. In certain embodiments of the foregoing methods, the polymer gel can be dried by freeze drying to create a cryogel.

The methods can be useful for preparation of condensation polymer gels and/or carbon materials having any number of various pore structures. In this regard, the present Applicant has discovered that the pore structure can be controlled by variation of any number of process parameters such as continuous phase type, stir rate, temperature, aging time, etc. In some embodiments, the condensation polymer gel can be microporous, and in other embodiments the condensation polymer gel can be mesoporous. In certain other embodiments, the condensation polymer gel can have a pore structure having a mixture of microporous and mesoporous pores.

In related embodiments, the carbon material can be microporous or the carbon material can be mesoporous. In other embodiments, the carbon material can have a pore structure having a mixture of microporous (for example, pores with diameter less than about 2 nm) and mesoporous pores (for example, pores with diameter between about 2 nm and 50 nm).

In yet other embodiments, the carbon material can be macroporous. In other embodiments, the carbon material can have a pore structure having mixture of microporous (for example, pores with diameter less than about 2 nm) and macroporous pores (for example, pores with diameter greater than about 50 nm). In other embodiments, the carbon material can have a pore structure having mixture of mesoporous (for example, pores with diameter between about 2 nm and 50 nm) and macroporous pores (for example, pores with diameter greater than about 50 nm). In other embodiments, the carbon material can have a pore structure having mixture of microporous (for example, pores with diameter less than about 2 nm), and mesoporous (for example, pores with diameter between about 2 nm and 50 nm) and macroporous pores (for example, pores with diameter greater than about 50 nm).

The polymer phase can be prepared by admixing the one or more polymer precursors and the optional solvent, and in some examples the mixture can be prepared by admixing the continuous phase and the polymer phase. The method can include embodiments where the mixture is an emulsion, while in other embodiments the mixture is a suspension.

For example, in some embodiments the continuous phase and the polymer or discontinuous phase are not miscible with each other, and the mixture is an emulsion. While in other exemplary methods the continuous phase and the polymer phase are not soluble in each other, and the mixture is a suspension. In other examples, the polymer phase can be aged prior to preparation of the mixture, and the mixture can be an emulsion and/or a suspension upon combination of the continuous phase and the polymer phase.

In other different aspects, both the continuous phase and the polymer phase can be soluble in each other (i.e., miscible). In some variations of this embodiment, the continuous phase and polymer phase can be miscible initially, but the polymer phase can be aged such that it becomes immiscible with the continuous phase and the mixture becomes a suspension upon aging.

The polymer phase may be prepared by admixing the one or more polymer precursors and the optional solvent and/or optional catalyst to form a prepolymer composition. In some embodiments, the polymer phase can be "pre-reacted" prior to mixing with the continuous phase such the polymer precursors are at least partially polymerized. In other embodiments, the polymer precursors are not pre-reacted. In certain other embodiments, the method can be a continuous process. For example, the polymer precursors can be continuously mixed with a continuous phase and the final condensation polymer gel may be continuously isolated from the mixture.

In some embodiments, the conditions under which the polymer phase is pre-reacted can contribute to the properties of the final gel and/or carbon material. For example, the particle size of the resulting gel and/or carbon material can be varied by varying certain pre-reaction conditions, for example the pre-reaction temperature, the pre-reaction time and/or the composition of the prepolymer composition. Unexpectedly, in certain embodiments the variation of particle size does not result in a concomitant change in pore structure of the gel and/or carbon material. Accordingly, variation of these parameters provides flexibility to arrive at preferred or desired processing conditions while maintaining the desired pore structure of the ultimate products (e.g., gel, and/or carbon material).

The temperature at which the prepolymer phase is aged can be varied while still staying with the scope of the present methods. Certain particular embodiments of the method provide for preparing a prepolymer composition and allowing the prepolymer composition to react at temperatures ranging from about 20° C. to about 150° C. to about a temperature lower than the boiling point of reaction system compounds before the prepolymer composition is added to the continuous phase. Higher reaction temperature can be realized either using higher boiling point chemicals or preparing prepolymer under elevated pressure. More specific embodiments include aging the prepolymer composition at temperatures ranging from about 50° C. to about 90° C. or from about 60° C. to about 85° C. More specific embodiments include reacting the prepolymer composition at temperatures of about 65° C. or about 80° C. prior to admixture with the continuous phase. In some cases the pressure of the vessel can be increased or higher boiling point solvents can be used to enable reaction at higher temperatures without inducing a phase change in the reactants. In other cases an external condenser can be used to enable reactions at higher temperatures.

The time which the prepolymer phase is allowed to react prior to mixing with the continuous phase can be varied throughout different embodiments of the methods, and different temperatures can result in different particle sizes for the resulting gel and/or carbon materials. Exemplary reaction times in this regard include times ranging from about 5 minutes to 48 hours.

The exact composition of the prepolymer composition can be determinant of certain properties, such as particle size and/or pore structure, of the resultant gel and/or carbon material. Compositions useful for controlling the pore structure (e.g., mesoporosity, microporosity, etc.) and/or particle size of the gel and/or carbon materials are described in more detail below. With regard to particle size, the present inventors have discovered that a higher solids content may contribute to larger gel particle sizes as well as higher viscosity of either continuous or dispersed phase. Various embodiments of the prepolymer composition are described in more detail below.

A single polymer precursor can be used or the methods can include use of two or more different polymer precursors. The structure of the polymer precursors is not particularly limited, provided that the polymer precursor is capable of reacting with another polymer precursor or with a second polymer precursor to form a polymer. Polymer precursors include amine-containing compounds, alcohol-containing compounds, and carbonyl-containing compounds, for example in some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate. Some embodiments of using resorcinol and formaldehyde as the polymer precursor can have various formaldehyde to resorcinol mole ratios, ranging from 1 to 2.5. A more specific embodiment can have a formaldehyde to resorcinol mole ratio of 2. In another specific embodiment formaldehyde to resorcinol mole ratio can be 1.5.

In one embodiment, the method can include the use of a first and second polymer precursor, and in some embodiments the first or second polymer precursor can be a carbonyl containing compound and the other of the first or second polymer precursor can be an alcohol containing compound. In some embodiments, a first polymer precursor can be a phenolic compound and a second polymer precursor can be an aldehyde compound (e.g., formaldehyde).

In one embodiment, the phenolic compound can be phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound can be resorcinol, phenol or a combination thereof, and the aldehyde compound is formaldehyde. In yet further embodiments, the phenolic compound can be resorcinol and the aldehyde compound can be formaldehyde. In yet further embodiments, the phenolic compound can be phenol and the aldehyde is formaldehyde. In some embodiments, the polymer precursors can be alcohols and carbonyl compounds (e.g., resorcinol and aldehyde) and the polymer precursors can be present in a ratio of about 0.5:1.0, respectively.

The polymer precursor materials as disclosed herein can include, but are not limited to, (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds can include, but are not limited to, polyhydroxy benzene, such as a dihydroxy or trihydroxy benzene. Representative polyhydroxy benzenes can include, but are not limited to, resorcinol (i.e., 1,3-dihydroxy benzene), catechol, hydroquinone, and phloroglucinol. Mixtures of two or more polyhydroxy benzenes can also be used. Phenol (monohydroxy benzene) can also be used.

Representative polyhydroxy compounds can also include sugars, such as glucose, sucrose, chitin and other polyols, such as mannitol. Aldehydes in this context include: straight chain saturated aldehydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species, for example an aldehyde and a phenol. The relative amounts of alcohol-containing species (e.g., alcohols, phenolic compounds and mono- or polyhydroxy compounds or combinations thereof) reacted with the carbonyl containing species (e.g., aldehydes, ketones or combinations thereof) can vary substantially. In some embodiments, the ratio of alcohol-containing species to aldehyde species can be selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species can be approximately the same as the total moles of reactive carbonyl groups in the ketone species. The same general 1:1 molar ratio holds true when the carbonyl-containing species comprises a combination of an aldehyde species and a ketone species.

In certain embodiments, the polymer precursors comprise formaldehyde and resorcinol or formaldehyde and phenol, or formaldehyde in combination with a mixture of phenol and resorcinol. In other embodiments, the polymer precursors can include formaldehyde and urea.

In other embodiments, the polymer precursor can be a urea or an amine containing compound. For example, in some embodiments the polymer precursor can be urea or melamine. Other embodiments include polymer precursors selected from isocyanates or other activated carbonyl compounds such as acid halides and the like.

Some embodiments of the disclosed methods include preparation of polymer gels (and carbon materials) comprising electrochemical modifiers. Electrochemical modifiers include those known in the art and described in co-pending U.S. patent application having Ser. No. 12/965,709. Such electrochemical modifiers are generally selected from elements useful for modifying the electrochemical properties of the resulting carbon materials or polymer gels, and in some embodiments include nitrogen or silicon. In other embodiments, the electrochemical modifier comprises nitrogen, iron, tin, silicon, nickel, aluminum or manganese. The electrochemical modifier can be included in the preparation procedure at any step. For example, in some the electrochemical modifier is admixed with the mixture, the polymer phase or the continuous phase.

The total solids content in the gel formulation prior to polymer formation (i.e., prepolymer composition) can be varied. This total solids content is the weight fraction of components that are generally non-volatile (compared to the total weight of volatile and non-volatile components).

The weight ratio of resorcinol to solvent (e.g., water, acid, etc.) can be from about 0.05 to 3 to about 0.70 to 2. Alternatively, the ratio of resorcinol to solvents can be from about 0.15 to 1 to about 0.6 to 1.5. Alternatively, the ratio of resorcinol to solvent can be from about 0.15 to 1 to about 0.35 to 1. Alternatively, the ratio of resorcinol to solvent can be from about 0.25 to 1 to about 0.5 to 1. Alternatively, the ratio of resorcinol to solvent can be from about 0.3 to 1 to about 0.6 to 1.

In some embodiments, the solids content of the prepolymer composition varies from about 10% to about 90%. In other embodiments, the solids content of the prepolymer composition ranges from about 35% to about 70% or from about 40% to about 60%. In some more specific embodiments, the solids content of the prepolymer composition can be about 45% to about 55%.

In some embodiments, the gel polymerization process can be performed under catalytic conditions. Accordingly, in some embodiments, the method can include admixing one or more catalysts with the mixture, the polymer phase and/or the continuous phase. In some embodiments, the catalyst can include a basic volatile catalyst. For example, in one embodiment, the basic volatile catalyst can include ammonium carbonate, ammonium bicarbonate, ammonium acetate, ammonium hydroxide, or combinations thereof. In a further embodiment, the basic volatile catalyst can be ammonium carbonate. In another further embodiment, the basic volatile catalyst can be ammonium acetate.

The molar ratio of catalyst to polymer precursor (e.g., phenolic compound) may have an effect on the final properties of the polymer gel as well as the final properties of the carbon materials. Thus, in some embodiments such catalysts can be used in a molar ratio of 5:1 to 2,000:1 polymer precursor:catalyst. In some embodiments, such catalysts can be used in a molar ratio of 10:1 to 400:1 polymer precursor: catalyst. For example, in other embodiments, such catalysts can be used in a molar ratio of 5:1 to 100:1 polymer precursor:catalyst. For example, in some embodiments the molar ratio of catalyst to polymer precursor can be about 400:1. In other embodiments the molar ratio of catalyst to polymer precursor can be about 100:1. In other embodiments the molar ratio of catalyst to polymer precursor can be about 50:1. In other embodiments the molar ratio of catalyst to polymer precursor can be about 25:1. In other embodiments the molar ratio of catalyst to polymer precursor can be about 10:1. In certain of the foregoing embodiments, the polymer precursor can be a phenolic compound such as resorcinol and/or phenol.

In the specific embodiment where one of the polymer precursors is resorcinol and another polymer precursor is formaldehyde, the resorcinol to catalyst ratio can be varied to obtain the desired properties of the resultant polymer gel and carbon materials. In some embodiments of the methods described herein, the molar ratio of resorcinol to catalyst can be from about 5:1 to about 2,000:1 or the molar ratio of resorcinol to catalyst can be from about 10:1 to about 400:1. In further embodiments, the molar ratio of resorcinol to catalyst can be from about 5:1 to about 100:1. In further embodiments, the molar ratio of resorcinol to catalyst can be from about 25:1 to about 50:1. In further embodiments, the molar ratio of resorcinol to catalyst can be from about 25:1 to about 50:1. In further embodiments, the molar ratio of resorcinol to catalyst can be from about 100:1 to about 5:1. In some embodiments of the foregoing, the catalyst is ammonium acetate.

In still other embodiments, the method comprises admixing an acid with the mixture, the polymer phase and/or the continuous phase. The acid can be selected from any number of acids suitable for the polymerization process. For example, in some embodiments the acid can be acetic acid and in other embodiments the acid can be oxalic acid. In further embodiments, the acid can be mixed with the first or second solvent in a ratio of acid to solvent of 99:1, 90:10, 75:25, 50:50, 25:75, 20:80, 10:90 or 1:90. In other embodiments, the acid can be acetic acid and the first or second solvent can be water. In other embodiments, acidity can be provided by adding a solid acid to the emulsion, suspension or gel formulation.

The total content of acid in the mixture can be varied to alter the properties of the final product. In some embodiments, the acid can be present from about 1% to about 75% by weight of polymer solution. In other embodiments, the acid can be present from about 5% to about 50%, for example about 5%, about 15% or about 45%. In other embodiments, the acid can be present from about 10% to about 40%, for example about 10%, about 15% or about 35%. Although a surfactant is not required (and is not present in certain embodiments), some embodiments include the use of a surfactant. The surfactant can be admixed with the mixture, the polymer phase and/or the continuous phase or included in the process in any other appropriate manner. In some embodiments which include a surfactant, the polymer phase can be pre-reacted prior to mixing with the continuous phase such the polymer precursors are at least partially polymerized.

The surfactant can be selected from any number of surfactants which are useful for emulsifying two immiscible solutions. For example, in some embodiments the surfactant can include a sorbitan surfactant such as SPAN™ 80, SPAN™ 85, SPAN™ 65, SPAN™ 60, SPAN™ 40, SPAN™ 20, TWEEN® 80, TWEEN® 40, TWEEN® 20, TWEEN® 21, TWEEN® 60, Triton-X® 100 or combinations thereof. In certain embodiments, the surfactant can include SPAN™ 80. In other embodiments, the surfactant can include SPAN™ 20. In other embodiments polyfunctional alcohols such as ethyl cellulose, glycol, alkyl ethers can be used as stabilizers and/or surfactants.

Such surfactants are well known in the art and are available commercially from a number of sources, including Sigma-Aldrich, St. Louis Mo. While not wishing to be bound by theory, it is believed that the amount of surfactant present in the mixture may be a parameter that can be modified to control the physical properties of the resulting gel and/or carbon materials. For example, surfactant concentrations less than or equal to about 2% may be associated with mesoporous carbons, while higher surfactant concentrations may be associated with microporous carbons. However, high concentrations of surfactant (e.g., greater than about 30%) are not as effective. While surfactant may be desirable in some embodiments, it is not required in all embodiments of the disclosed methods.

In some embodiments when surfactant is present, the mixture can include from about 0.01% to about 20% surfactant (w/w), for example about 0.1% to about 20% surfactant (w/w), for example about 10% surfactant. In other embodiments, the mixture can include from about 0.1% to about 10% surfactant, for example about 5% surfactant. In other embodiments, the mixture can include from about 0.1% to about 2% surfactant, for example about 0.5% or about 1% surfactant. In other embodiments, the mixture can include from about 0.01% to about 1.0% surfactant, for example about 0.1% to about 1.0% surfactant. In other embodiments, the mixture can include from about 1.0% to about 2.0% surfactant. In other embodiments, the mixture can include from about 2.0% to about 5.0% surfactant. In other embodiments, the mixture can include from about 5.0% to about 10% surfactant. In some certain embodiments, the mixture can include about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9% or about 2.0% surfactant. In other embodiments, the emulsions, suspension or combination thereof can include from about 9.0% to about 11.0%, from about 0.05% to about 1.1% surfactant or from about 0.9% to about 1.1% surfactant.

The continuous phase is another process parameter that can be varied to obtain the desired properties (e.g., surface area, porosity, purity, particle size etc.) of the polymer gels and carbon materials. For example, the present inventors have surprisingly discovered that by careful selection of the continuous phase, the porosity of the final polymer gel and carbon materials can be controlled (see data provided in Examples). Thus, the present methods provide the ability to prepare carbon materials (and the precursor gels) having any desired porosity. A further advantage of careful selection of the continuous phase is in the scaleability of the process. For example, when continuous phases are selected which have low toxicity, flammability, etc., the process is more amenable to scale up than other known polymer processes.

A further advantage of certain embodiments of the present methods is that the continuous phase can be selected to obtain a desired particle size of the resulting gel particles. Experiments performed in support of the present invention unexpectedly revealed that the particle size of the gel particles can vary significantly while the pore structure remains substantially the same. Accordingly, the methods allow a great deal of flexibility to tailor the particle size to obtain optimum processing properties (e.g., filtration, pyrolysis, and the like) without sacrificing control over the pore structure of the final gel or carbon product. Further, in certain embodiments the particle size of the ultimate carbon material can be tailored by choice of continuous phase (or other process parameters described herein) without the need for milling or other physical means of particle sizing.

Continuous phase properties which have been shown to affect the particle size of the gel particles include viscosity and molecular weight (e.g., hydrocarbon chain length). Continuous phases having various viscosities are useful for implementation of the methods, and the viscosity of the continuous phase is not particularly limited. In certain embodiments of the methods a continuous phase can be selected that has a room temperature viscosity ranging from about 1.0 cP to about 250 cP. For example, certain embodiments can employ a continuous phase having a viscosity ranging from about 2.5 cP to about 200 cP or about 5 cp to about 100 cP. In other embodiments, the continuous phase viscosity can be about 10 cP, about 20 cP, about 30 cP, or about 40 cP. In various embodiments, the viscosity of the continuous phase can be determined at 80° C. and have a viscosity ranging from less than 1.0 cP to about 100 cP. For example, certain embodiments can employ a continuous phase having a viscosity of about 1 cP to about 75 cP or about 2.5 cp to about 50 cP. In other embodiments, the continuous phase viscosity can be about 5 cP, about 10 cP, about 20 cP or about 30 cP. In other embodiments it can be desirable to have the viscosity of the continuous phase change throughout the process. For example a higher viscosity may be desirable during the particle formation step and a lower viscosity could be beneficial during the separation step. In other embodiments the desired viscosity targets may be reversed.

The hydrocarbon chain length of certain continuous phases (e.g., paraffinic oils) can also be varied to obtain gels and carbon materials having desired properties, such as particle size. The hydrocarbon chain length can vary from about 10 carbons to about 100 carbons, for example from about 15 carbons to about 40 carbons. In certain embodiments, the hydrocarbon chain length can be about 20 carbons, about 25 carbons, about 30 carbons, about 35 carbons or about 40 carbons.

The continuous phase not only affects particle formation (size) as mentioned above; it can also affect fouling. Some important criteria for proper continuous phase selection can include, but are not limited to, a) type and amount of functional groups present in continuous phase chemical structure; b) saturated or unsaturated chemical structure; c) specific gravity; d) viscosity; and/or e) surface tension In some embodiments, the shear rate can affect particle size and fouling. Low shear rate is believed to create larger particles. Combining proper continuous phase with low shear rate may provide benefits for both particle formation and fouling reduction.

Particle formation temperature has also been shown to affect particle size and fouling. In one embodiment, particle formation at lower temperature (e.g., 65° C.) can help to reduce fouling and produce slightly larger particles.

In some embodiments of the method, the polymer phase and the continuous phase are not miscible with each other and an emulsion or suspension can be formed. In other embodiments the polymer phase and continuous phase are miscible or partially miscible with each other. In these cases the polymer phase may become less miscible with the continuous phase over the course of the reaction. In this respect, certain embodiments are directed to methods where the optional solvent is an aqueous and/or polar solvent and the continuous phase is an organic and/or nonpolar solvent. Suitable aqueous and/or polar solvents can include, but are not limited to, water, water/acetic acid, alcohols (e.g., ethanol, methanol, etc.), polar ethers (e.g., PEG, etc.), organic acids (e.g., acetic) and mixtures thereof. In certain embodiments, the optional solvent can be present. In certain embodiments, the optional solvent can be present and comprises water. For example, in some embodiments, the polymer phase can be water or an acetic acid/water mix.

Suitable organic and/or nonpolar solvents for use as a continuous phase include hydrocarbon solvents, aromatic solvents, oils, nonpolar ethers, ketones and the like. For example, suitable organic and/or nonpolar solvents can include, but are not limited to hexane, cyclohexane, pentane, cyclopentane, benzene, toluene, xylenes, diethyl ether, ethylmethylketone, dichlormethane, tetrahydrofuran, mineral oils, paraffin oils, isoparifinic fluids, vegetable derived oils, and any and all water insoluble fluids could be used by those knowledgeable in the art. In some embodiments, the continuous phase can be an organic solvent, for example a hydrocarbon solvent. In more specific embodiments, the continuous phase can be cyclohexane, mineral oil, paraffinic oil, o-xylene, m-xylene, p-xylene, isoparaffinic oils or combinations thereof. In other embodiments, the continuous phase can be cyclohexane, paraffinic oil, xylene, isoparaffinic oil or combinations thereof. In some specific embodiments, the continuous phase can include paraffinic oil. In other specific embodiments, the optional solvent can be present and can include water and the continuous phase can include cyclohexane, mineral oil, o-xylene, m-xylene, p-xylene, water or combinations thereof. In certain embodiments, the viscosity of the continuous phase can be selected such that certain properties (e.g., particle size) of the polymer gel are controlled.

In some embodiments the continuous phase can be selected to be amenable for large scale production. In this regard, continuous phase properties important for large scale production include low toxicity, low flammability, price, and/or ease of removal from final product and the like. The continuous phase can also be selected to have high purity, which in turn may contribute to high purity of the final polymer gel and/or carbon material. In this regard, continuous phases having purities greater than 99%, greater than 99.5%, greater than 99.9%, greater than 99.99% or even greater than 99.999% can be used. In certain embodiments, the polymer precursor components can be mixed together in a single aqueous phase and subsequently emulsified or suspended with an outer non-aqueous phase using techniques known in the art, and subsequently held for a time and at a temperature sufficient to achieve complete or substantially complete polymerization of precursors within the aqueous phase. In other embodiments, the precursor components can be mixed together in a single aqueous phase, held for a time and at a temperature sufficient to achieve partial polymerization, and subsequently suspended in an outer non-aqueous phase using techniques known in the art, and subsequently held for a time to achieve complete or substantially complete polymerization of precursors within the aqueous phase. In this embodiment, the partial polymerization step can result in increased viscosity, allowing for control of polymer resin particle size depending on the emulsification/suspension energy conditions and viscosities of the partially polymerized aqueous phase and the non-aqueous phase. In other embodiments, the precursor components can be mixed together in a single aqueous phase, held for a time and at a temperature sufficient to achieve partial polymerization, and subsequently suspended in an outer aqueous phase using techniques known in the art, and subsequently held for a time and at a temperature sufficient to achieve complete polymerization of precursors within the aqueous phase. In this embodiment, the partial polymerization step can result in increased viscosity, allowing for control of polymer resin particle size depending on the emulsification energy conditions, viscosities and immiscibility of the partially polymerized aqueous phase and the continuous aqueous phase. In other embodiments specific control of the viscosity of the polymer phase and the viscosity of the continuous phase might be chosen to enable suitable particle formation.

Reaction parameters include aging the mixture at a temperature and for a time sufficient for the one or more polymer precursors to react with each other and form a polymer. In this respect, suitable aging temperature ranges from about room temperature to temperatures at or near the boiling point of the continuous phase. Higher reaction temperature can be realized either using higher boiling point chemicals or preparing prepolymer under elevated pressure. For example, in some embodiments the emulsion, suspension or combination thereof is aged at temperatures from about 20° C. to about 120° C., for example about 20° C. to about 100° C. Other embodiments include temperature ranging from about 30° C. to about 99° C., for example about 45° C. or about 99° C. In other embodiments, the temperature ranges from about 65° C. to about 99° C., while other embodiments include aging at two or more temperatures, for example about 45° C. and about 70° C. to about 99° C. or about 80° C. to about 99° C. Aging can include stirring in certain embodiments. In some cases the pressure of the vessel can be increased or higher boiling point solvents can be used to enable reaction at higher temperatures without inducing a phase change in the reactants. In other cases an external condenser can be used to enable reactions at higher temperatures.

The reaction duration can generally be sufficient to allow the polymer precursors to react and form a polymer, for example the mixture can be aged anywhere from 1 hour to 48 hours, or more or less depending on the desired result. Typical embodiments include aging for a period of time of about 2 hours to about 48 hours, for example in some embodiments aging can include about 12 hours and in other embodiments aging can include about 4 hours to about 8 hours (e.g., about 6 hours). Aging conditions can optionally include stirring, shaking or other means of agitating the mixture. While not wishing to be bound by theory, it is thought that stirring is a parameter that can be controlled to produce gels and/or carbon materials having a desired particle size distribution (e.g., near monodisperse, etc.). For example, the stirring RPMs may be adjusted to obtain the desired result. Such methods have the added advantage that an additional step of milling or grinding to obtain the desired particle size may not be needed.

Generally, the methods can also include isolating the polymer gel particles and/or carbon materials. Suitable means for isolating include filtering, decanting a solvent or continuous phase or combinations thereof. The isolated product may be further processed by methods including drying the isolated polymer gel particles to remove volatile content, for example, freeze drying.

In some embodiments, the particle size distribution of the polymer particles exhibit a polydispersity index (Dv,90-Dv,10)/Dv,50, where Dv,10, Dv,50, and Dv,90 are the particle size at 10%, 50%, and 90%, respectively of the particle size distribution by volume) of less than 1,000, less than 900, less than 800, less than 700, less than 600, less than 500, less than 400, less than 300, less than 200, less than 100, less than 10, less than 5, less than 3, less than 2, less than 1.5, or less than 1. In some embodiments, introduction of aqueous phase to organic phase can be staged such that two or more populations of polymer particle size distribution may be achieved.

For example, the final polymer particle distribution achieved can include two or more modes, where the ratio between the highest and lowest node is about 1,000 or lower, about 900 or lower, about 800 or lower, about 700 or lower, about 600 or lower, about 500 or lower, about 400 or lower, about 300 or lower, about 200 or lower, about 100 or lower, about 50 or lower, about 10 or lower, about 5 or lower, or about 2 or lower.

Furthermore, the methods can include freeze drying the polymer gel particles prior to pyrolyzing and/or activating, however such drying is not required and the polymer gel can be pyrolyzed without drying. In some embodiments, the polymer gel particles can be frozen via immersion in a medium having a temperature of below about −10° C., for example, below about −20° C., or alternatively below about −30° C. For example, the medium can be liquid nitrogen or ethanol (or other organic solvent) in dry ice or ethanol cooled by another means. In some embodiments, freeze drying can include subjecting the frozen particles to a vacuum pressure of below about 3,000 mTorr. Alternatively, drying under vacuum can include subjecting the frozen particles to a vacuum pressure of below about 1,000 mTorr. Alternatively, drying under vacuum can include subjecting the frozen particles to a vacuum pressure of below about 300 mTorr. Alternatively, drying under vacuum can include subjecting the frozen particles to a vacuum pressure of below about 100 mTorr.

Other methods of rapidly freezing the polymer gel particles are also envisioned. For example, in another embodiment the polymer gel can be rapidly frozen by co-mingling or physical mixing of polymer gel particles with a suitable cold solid, for example, dry ice (solid carbon dioxide). Another envisioned method can include using a blast freezer with a metal plate at −60° C. to rapidly remove heat from the polymer gel particles scattered over its surface.

Another method of rapidly cooling water in a polymer gel particle can be to snap freeze the particle by pulling a high vacuum very rapidly (the degree of vacuum is such that the temperature corresponding to the equilibrium vapor pressure allows for freezing). Yet another method for rapid freezing can include admixing a polymer gel with a suitably cold gas. In some embodiments the cold gas may have a temperature below about −10° C. In some embodiments the cold gas can have a temperature below about −20° C. In some embodiments the cold gas can have a temperature below about −30° C. In yet other embodiments, the gas can have a temperature of about −196° C. For example, in some embodiments, the gas can be nitrogen. In yet other embodiments, the gas can have a temperature of about −78° C. For example, in some embodiments, the gas can be carbon dioxide.

In other embodiments, the polymer gel particles can be frozen on a lyophilizer shelf at a temperature of −20° C. or lower. For example, in some embodiments the polymer gel particles can be frozen on the lyophilizer shelf at a temperature of −30° C. or lower. In some other embodiments, a polymer gel monolith can be subjected to a freeze thaw cycle (from room temperature to −20° C. or lower and back to room temperature), physical disruption of the freeze-thawed gel can create particles, and then further lyophilization processing. For example, in some embodiments, a polymer gel monolith can be subjected to a freeze thaw cycle (from room temperature to −30° C. or lower and back to room temperature), physical disruption of the freeze-thawed gel to create particles, and then further lyophilization processing.

The disclosed methods can be useful for preparation of a wide variety of carbon materials. In one example, carbon materials having high density and microporosity can be prepared. Gel formulations useful in this regard include formulations comprising from about 30 wt % to about 60 wt % solids, about 5 wt % to about 30 wt % acetic acid, 5-50 R:C, 0.5 wt % to about 15 wt % surfactant, and ≥20 wt % RF solution, for example about 46 wt to about 50 wt % solids, about 10 wt % acetic acid, about 10 R:C, about 10 wt % surfactant, and ≥30 wt % RF solution.

Mesoporous carbon materials can also be prepared by the disclosed methods. Formulations useful in this regard include, but are not limited to, from 25%-50% solids, 10-25% acetic acid, 50 to 400 R:C, about 0.1 wt % to about 15% surfactant, and about 15 wt % 35 wt % RF solution, for example about 33 wt % solids, about 20 wt % acetic acid, either 100 or 400 R:C, about 10 wt % surfactant, and about 20 wt % RF solution. Other formulations useful for preparation of mesoporous carbons include, but are not limited to, a formulation comprised of from about 25 wt % to about 40 wt % solids, about 5 wt % to about 15 wt % acid, 25-75 R:C, 0.5 wt % to about 1.5 wt % surfactant, and about 15 wt % to about 25 wt % RF, for example about 33 wt % solids, about 10 wt % acid, about 50 R:C, about 1 wt % surfactant and about 20 wt % RF solution.

As used herein, % solids is calculated as the mass of polymer precursors (excluding water) divided by the total mass of polymer precursors (including water), additional water and acid. Catalyst is not included in the calculation of % solids. Surfactant loading is based on the mass of the continuous phase. % RF solution is the mass of (Resorcinol, Formaldehyde (including water), additional water and acid) over the total mass of (Resorcinol, Formaldehyde (including water), additional water, acid and continuous phase).

Other more specific methods according to the instant disclosure include a method for preparing a condensation polymer, the method including: a) preparing an emulsion, suspension or combination thereof by admixing a surfactant, one or more polymer precursors and a first and a second solvent, where the first and second solvents are not miscible with each other; and b) aging the emulsion at a temperature and for a time sufficient for the one or more polymer precursors to react with each other and form a condensation polymer.

In certain embodiments of the foregoing, the polymer precursors can be selected from an alcohol, a phenol, a polyalcohol, a sugar, an alkyl amine, an aromatic amine, an aldehyde, a ketone, a carboxylic acid, an ester, a urea, an acid halide, an isocyanate, and any mixture thereof.

In some embodiments, at least one polymer precursor can be a phenolic compound. For example, in some embodiments at least one polymer precursor can be resorcinol. In still other embodiments at least one polymer precursor can be phenol. In other examples, at least one polymer precursor can be an aldehyde compound, for example, at least one polymer precursor can be formaldehyde. In some more specific embodiments, at least one polymer precursor can be formaldehyde, at least one polymer precursor can be resorcinol and the condensation polymer can be a resorcinol-formaldehyde polymer. In some embodiments at least one polymer precursor can be urea, and in other embodiments at least one polymer precursor can be melamine. In some embodiments, the polymer precursor can include phenol, resorcinol, formaldehyde, urea, or combination or mixture thereof.

The foregoing methods can also include the addition of one or more electrochemical modifiers, such as silicon and/or nitrogen, in the emulsion.

The various reaction parameters, including choice of polymer precursor, solvent, etc., of the method for preparing a condensation polymer can be modified as described in the above section to obtain condensation polymers having various properties.

2. Creation of Polymer Gel Particles

In contrast to prior monolith techniques, the presently disclosed methods generally do not require milling or grinding prior to further processing. Instead, the polymer gel particles are generally filtered and/or the solvent removed by decanting and the gel particles are optionally dried (e.g., freeze drying) prior to further processing.

3. Rapid Freezing of Polymer Gels

As noted above, certain embodiments of the method can include freeze drying prior to pyrolysis and/or activation; however such drying is optional and is not included in some of the disclosed embodiments. Freezing of the polymer gel particles can be accomplished rapidly and in a multi-directional fashion as described in more detail above. Freezing slowly and in a unidirectional fashion, for example by shelf freezing in a lyophilizer, results in dried material having a very low surface area. Similarly, snap freezing (i.e., freezing that is accomplished by rapidly cooling the polymer gel particles by pulling a deep vacuum) also results in a dried material having a low surface area. As disclosed herein rapid freezing in a multidirectional fashion can be accomplished by rapidly lowering the material temperature to at least about −10° C. or lower, for example, −20° C. or lower, or for example, to at least about −30° C. or lower. Rapid freezing of the polymer gel particles can create a fine ice crystal structure within the particles due to widespread nucleation of ice crystals, but leaves little time for ice crystal growth. This can provide a high specific surface area between the ice crystals and the hydrocarbon matrix, which is necessarily excluded from the ice matrix.

The concept of extremely rapid freezing to promote nucleation over crystal growth can also be applied to mixed solvent systems. In one embodiment, as the mixed solvent system is rapidly cooled, the solvent component that predominates can undergo crystallization at its equilibrium melting temperature, with increased concentration of the co-solvent(s) and concomitant further freezing point depression. As the temperature is further lowered, there can be increased crystallization of the predominant solvent and concentration of co-solvent(s) until the eutectic composition is reached, at which point the eutectic composition can undergo the transition from liquid to solid without further component concentration or product cooling until complete freezing is achieved. In the specific case of water and acetic acid (which as pure substances exhibit freezing points of 0° C. and 17° C., respectively), the eutectic composition can include approximately 59 wt % acetic acid and 41 wt % water and freezes at about −27° C. Accordingly, in one embodiment, the mixed solvent system can be the eutectic composition, for example, in one embodiment the mixed solvent system comprises 59 wt % acetic acid and 41 wt % water.

4. Drying of Polymer Gels

Some embodiments include an optional drying step. In one embodiment, the frozen polymer gel particles containing a fine ice matrix are lyophilized under conditions designed to avoid collapse of the material and to maintain fine surface structure and porosity in the dried product. Generally drying is accomplished under conditions where the temperature of the product is kept below a temperature that would otherwise result in collapse of the product pores, thereby enabling the dried material to retain the desired surface area.

The structure of the final carbon material is reflected in the structure of the dried polymer gel which in turn is established by the polymer gel properties. These features can be created in the polymer gel using a sol-gel processing approach as described herein, but if care is not taken in removal of the solvent, then the structure is not preserved. It is of interest to both retain the original structure of the polymer gel and modify its structure with ice crystal formation based on control of the freezing process. In some embodiments prior to drying, the aqueous content of the polymer gel can be about 50 wt % to about 99 wt %. In certain embodiments upon drying, the aqueous content of the polymer gel can be about 10 wt %, alternately less than 5 wt % or less than 2.5 wt %.

A lyophilizer chamber pressure of about 2,250 microns can result in a primary drying temperature in the drying product of about −10° C. Drying at about 2,250 micron chamber pressure or lower can provide a product temperature during primary drying that is no greater than −10° C. As a further illustration, a chamber pressure of about 1,500 microns can result in a primary drying temperature in the drying product of about −15° C. Drying at about 1,500 micron chamber pressure or lower provides a product temperature during primary drying that is no greater than −15° C. As yet a further illustration, a chamber pressure of about 750 microns can result in a primary drying temperature in the drying product of about −20° C. Drying at 750 micron chamber pressure or lower can provide a product temperature during primary drying that is no greater than about −20° C. As yet a further illustration, a chamber pressure of about 300 microns can result in a primary drying temperature in the drying product of about −30° C. Drying at 300 micron chamber pressure or lower can provide a product temperature during primary drying that is no greater than about −30° C.

5. Pyrolysis and Activation of Polymer Gels

The polymer gels described above can be processed to obtain carbon materials. Such processing includes, for example, pyrolysis and/or activation. Generally, in the pyrolysis process, dried polymer gels are weighed and placed in a rotary kiln. The temperature ramp can be set at 5° C. per minute, the dwell time and dwell temperature can be set; cool down can be determined by the natural cooling rate of the furnace. The entire process can be run under an inert atmosphere, such as a nitrogen environment. Pyrolyzed samples can be removed and weighed. Other pyrolysis processes are well known to those of skill in the art.

In some embodiments, pyrolysis dwell time (the period of time during which the sample is at the desired temperature) can be from about 0 minutes to about 120 minutes, from about 20 minutes to about 150 minutes, from about 30 minutes to about 100 minutes, from about 50 minutes to about 60 minutes or from about 55 minutes to about 60 minutes.

Pyrolysis can also be carried out more slowly than described above. For example, in one embodiment the pyrolysis can be carried out in about 120 to 480 minutes. In other embodiments, the pyrolysis can be carried out in about 120 to 240 minutes.

In some embodiments, the pyrolysis dwell temperature can be about 500° C. to about 2,400° C. In some embodiments, the pyrolysis dwell temperature can be about 600° C. to about 1,800° C. In other embodiments the pyrolysis dwell temperature can be about 700° C. to about 1,200° C. In other embodiments the pyrolysis dwell temperature can be about 850° C. to about 1,050° C. In other embodiments the pyrolysis dwell temperature can be about 800° C. to about 900° C. In some embodiments, the pyrolysis dwell temperature can be about 600° C. or 900° C. In some other specific embodiments, the pyrolysis dwell temperature can be about 550° C. to about 900° C.

In some embodiments, the pyrolysis dwell temperature can be varied during the course of pyrolysis. In one embodiment, the pyrolysis can be carried out in a rotary kiln with separate, distinct heating zones. The temperature for each zone can be sequentially decreased from the entrance to the exit end of the rotary kiln tube. In one embodiment, the pyrolysis can be carried out in a rotary kiln with separate distinct heating zones, and the temperature for each zone can be sequentially increased from entrance to exit end of the rotary kiln tube.

Activation time and/or activation temperature can have an impact on the performance of the resulting activated carbon material, as well as the manufacturing cost thereof. Increasing the activation temperature and the activation dwell time can result in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This can be the result of the activation gas diffusion limited reaction that occurs at higher temperatures and reaction kinetic driven reactions that occur at lower temperature. Higher activation percentage often increase performance of the final activated carbon, but it also increases cost by reducing overall yield. Improving the level of activation corresponds to achieving a higher performance product at a lower cost.

Pyrolyzed polymer gels can be activated by contacting the pyrolyzed polymer gel with an activating agent. Many gases are suitable for activating, for example gases which contain oxygen. Non-limiting examples of activating gases can include, but are not limited to, carbon dioxide, carbon monoxide, steam, oxygen, and any mixture thereof. Activating agents can also include corrosive chemicals such as acids, bases or salts (e.g., phosphoric acid, acetic acid, citric acid, formic acid, oxalic acid, uric acid, lactic acid, potassium hydroxide, sodium hydroxide, zinc chloride, etc.). Other activating agents are known to those skilled in the art.

In some embodiments, the activation time can be between 1 minute and 48 hours. In other embodiments, the activation time can be between 10 minute and 24 hours. In other embodiments, the activation time can be between 60 minutes and 24 hours. In other embodiments, the activation time can be between 2 hour and 24 hours. In further embodiments, the activation time can be between 12 hours and 24 hours. In certain other embodiments, the activation time can be between 30 min and 8 hours. In some further embodiments, the activation time can be between 3 hour and 6 hours.

Pyrolyzed polymer gels can be activated using any number of suitable apparatuses known to those skilled in the art, for example, fluidized beds, rotary kilns, elevator kilns, roller hearth kilns, pusher kilns, etc. In one embodiment of the activation process, samples are weighed and placed in a rotary kiln, for which the automated gas control manifold is set to ramp at a 20° C. per minute rate. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures can be 800° C. to 1,300° C. In another embodiment, activation temperatures can be 800° C. to 1,050° C. In another embodiment, activation temperatures can be about 850° C. to about 950° C. In another embodiment, the activation temperature can be about 900° C. In some embodiments, the carbon materials are activated to achieve a specific surface area ranging from 1,700 $m^2/g$ to 1,900 $m^2/g$. One skilled in the art will recognize that other activation temperatures, either lower or higher, may be employed.

The degree of activation is measured in terms of the mass percent of the pyrolyzed dried polymer gel that is lost during the activation step. In one embodiment of the methods described herein, activating can include a degree of activation from 5% to 90%; or a degree of activation from 10% to 80%; in some cases activating comprises a degree of activation from 40% to 70%, or a degree of activation from 45% to 65%.

B. Properties of Polymer Gels

One embodiment of the present disclosure provides a polymer gel prepared by any of the methods disclosure herein. The polymer gels produced by the disclosed methods are unique in many respects. In some embodiments, the method produces polymer gels having monodisperse or near monodisperse particle size distributions. As discussed above, the particle size of the polymer gels (and carbon materials) can be controlled by a number of process parameters, including the stirring rate. For example, in some embodiments the present disclosure provides a polymer gel having a particle size distribution such that (Dv,90–Dv,10)/Dv,50 is less than 3, where Dv,10, Dv,50, and Dv,90 are the particle size at 10%, 50%, and 90%, respectively of the particle size distribution by volume. In some embodiments, (Dv,90–Dv,10)/Dv,50 is less than 2 and in other embodiments (Dv90–Dv10)/Dv50 is less than 1.

Figure 14:
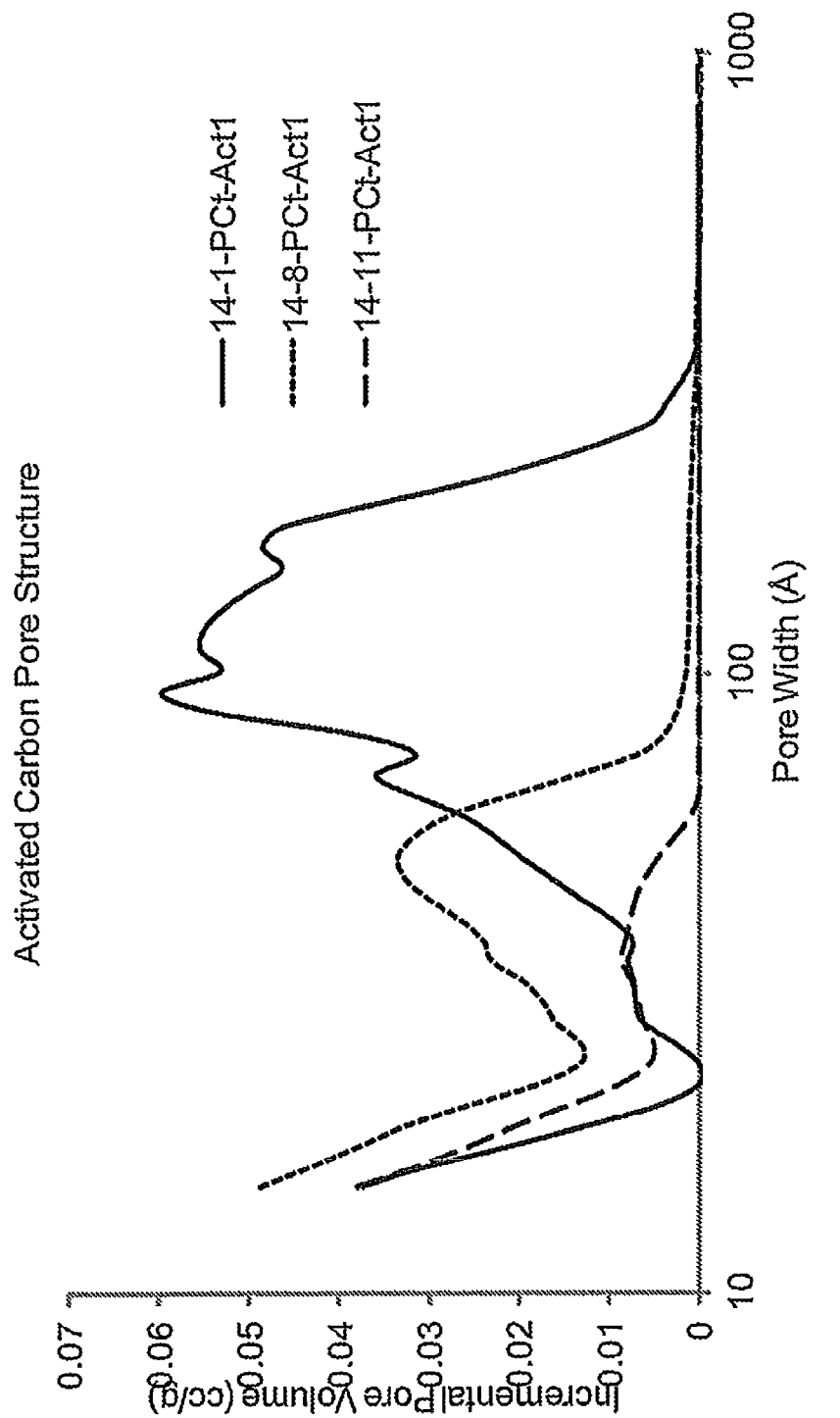
FIG. 14 is pore size data for activated carbon samples.
Figure 15:
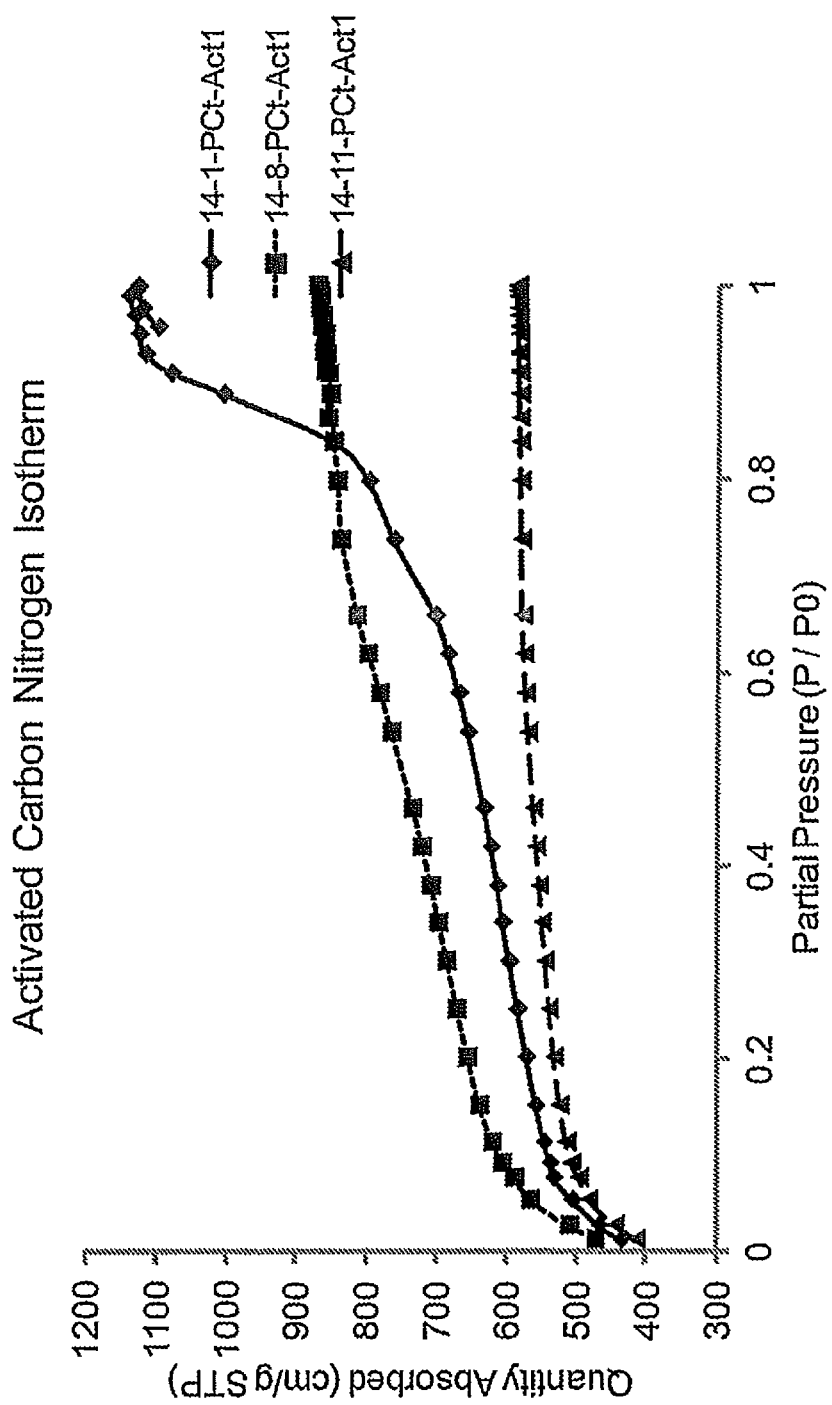
FIG. 15 presents nitrogen absorption isotherms for activated carbon samples.

The polymer gel particles can be substantially spherical in shape (see e.g., FIG. 14A). The spherical nature of the gels results in spherical carbon materials which in turn can contribute to desirable electrochemical properties. For example, the polymer gels can include a plurality of polymer particles, where greater than 75%, greater than 80%, greater than 85%, greater than 90%, greater than 91%, greater than 92%, greater than 93%, greater than 94%, greater than 95%, greater than 96%, greater than 97%, greater than 98%, or greater than 99% of the polymer gel particles can have a spherical geometry. In some embodiments, the polymer gels can include a plurality of polymer gel particles, where greater than 90% of the polymer gel particles have a spherical geometry. In other embodiments, greater than 95% of the polymer gel particles have a spherical geometry.

The specific surface area of the polymer gels as determined by BET analysis can be about 50 $m^2/g$ to about 1,000 $m^2/g$. In some embodiments, the specific surface area can be about 50 $m^2/g$ to about 100 $m^2/g$. In other embodiments, the specific surface area can be about 300 $m^2/g$ to about 700 $m^2/g$. In some other embodiments, the specific surface can be from about 300 $m^2/g$ to about 400 $m^2/g$. In some other embodiments, the specific surface can be from about 400 $m^2/g$ to about 500 $m^2/g$. In some other embodiments, the specific surface area can be about 500 $m^2/g$ to about 600 $m^2/g$. In some other embodiments, the specific surface area can be about 600 $m^2/g$ to about 700 $m^2/g$. In another embodiment, the specific surface area of the polymer gels can be from a low of about 50 $m^2/g$, about 75 $m^2/g$, about 100 $m^2/g$, about 150 $m^2/g$, about 200 $m^2/g$, about 250 $m^2/g$, or about 300 $m^2/g$ to a high of about 400 $m^2/g$, about 450 $m^2/g$, about 500 $m^2/g$, about 550 $m^2/g$, about 600 $m^2/g$, about 650 $m^2/g$, about 700 $m^2/g$, about 750 $m^2/g$, about 800 $m^2/g$, about 850 $m^2/g$, about 900 $m^2/g$, about 950 $m^2/g$, or about 1,000 $m^2/g$.

The total pore volume of the polymer gels can be about 0.01 $cm^3/g$ to about 1.5 $cm^3/g$. For example, the total pore volume of the polymer gel can be from a low of about 0.01 $cm^3/g$, about 0.05 $cm^3/g$, about 0.1 $cm^3/g$, about 0.15 $cm^3/g$, about 0.2 $cm^3/g$, about 0.3 $cm^3/g$, about 0.4 $cm^3/g$, about 0.5 $cm^3/g$, or about 0.6 $cm^3/g$ to a high of about 0.9 $cm^3/g$, about 1 $cm^3/g$, about 1.1 $cm^3/g$, about 1.2 $cm^3/g$, about 1.3 $cm^3/g$, about 1.4 $cm^3/g$, or about 1.5 $cm^3/g$. In another example, in some embodiments the total pore volume can be about 0.1 $cm^3/g$ to about 0.9 $cm^3/g$. In other embodiments the total pore volume can be about 0.2 $cm^3/g$ to about 0.8 $cm^3/g$. In other embodiments the total pore volume can be about 0.3 $cm^3/g$ to about 0.6 $cm^3/g$. In other embodiments the total pore volume can be about 0.6 $cm^3/g$ to about 0.9 $cm^3/g$.

In other embodiments, the polymer gel can include a total of less than 500 ppm of all other elements having atomic numbers ranging from 11 to 92. For example, in some other embodiments the polymer gel can include less than 450 ppm, less than 400 ppm, less than 350 ppm, less than 300 ppm, less than 250 ppm, less than 200 ppm, less than 150 ppm, less than 100 ppm, less than 75 ppm, less than 50 ppm, less than 25 ppm, less than 10 ppm, less than 5 ppm or less than 1 ppm of all other elements having atomic numbers ranging from 11 to 92. In some embodiments, the electrochemical modifier content and impurity content of the polymer gels can be determined by proton induced x-ray emission (PIXE) analysis.

In some embodiments, the polymer gel can be a dried polymer gel, for example, a polymer cryogel. In other embodiments, the dried polymer gel is a polymer xerogel or a polymer aerogel. In some embodiments, the polymer precursors can be selected from aliphatic and aromatic alcohols, aliphatic and aromatic amines and carbonyl-containing compounds. For example, the polymer precursors can be selected from an alcohol, a phenol, a polyalcohol, a sugar, an alkyl amine, an aromatic amine, an aldehyde, a ketone, a carboxylic acid, an ester, a urea, an acid halide and an isocyanate. In some specific embodiments, the polymer gels are prepared from phenolic compounds and aldehyde compounds, for example, in one embodiment, the polymer gels can be produced from resorcinol and formaldehyde. In some embodiments, acidity can be provided by dissolution of a solid acid compound, by employing an acid as the reaction solvent or by employing a mixed solvent system where one of the solvents is an acid.

Some embodiments of the disclosed process can include polymerization to form a polymer gel in the presence of a basic volatile catalyst. Accordingly, in some embodiments, the polymer gel can include one or more salts, for example, in some embodiments the one or more salts are basic volatile salts. Examples of basic volatile salts can include, but are not limited to, ammonium carbonate, ammonium bicarbonate, ammonium acetate, ammonium hydroxide, and any combination or mixture thereof. Accordingly, in some embodiments, the polymer gel can include ammonium carbonate, ammonium bicarbonate, ammonium acetate, ammonium hydroxide, or combinations thereof. In further embodiments, the polymer gel can include ammonium carbonate. In other further embodiments, the polymer gel can include ammonium acetate.

The disclosed methods can be useful for preparation of polymer gels having high purity as determined by PIXE analysis and/or ash content. As described herein, any intentionally added electrochemical modifier is not considered an impurity and thus excluded from the specifically described PIXE and ash content values. In some embodiments, the polymer gels can have low ash content that can contribute to the low ash content of a carbon material prepared therefrom. Thus, in some embodiments, the ash content of the polymer gel can be from 0.1% to 0.001%. In other embodiments, the ash content of the polymer gel can be less than 0.1%, less than 0.08%, less than 0.05%, less than 0.03%, less than 0.025%, less than 0.01%, less than 0.0075%, less than 0.005% or less than 0.001%.

In other embodiments, the polymer gel can have a total PIXE impurity content of less than 500 ppm and an ash content of less than 0.08%. In a further embodiment, the polymer gel has a total PIXE impurity content of less than 300 ppm and an ash content of less than 0.05%. In another further embodiment, the polymer gel has a total PIXE impurity content of less than 200 ppm and an ash content of less than 0.02%. In another further embodiment, the polymer gel has a total PIXE impurity content of less than 200 ppm and an ash content of less than 0.01%.

Polymer gels that include impurities generally yield carbon materials which also include impurities, and thus potentially undesired electrochemical properties. Accordingly, one aspect of the present disclosure is a polymer gel prepared via the disclosed methods and having low levels of residual undesired impurities. The amount of individual PIXE impurities present in the polymer gel can be determined by proton induced x-ray emission. In some embodiments, the level of sodium present in the polymer gel can be less than 1,000 ppm, less than 500 ppm, less than 100 ppm, less than 50 ppm, less than 10 ppm, or less than 1 ppm. In some embodiments, the level of magnesium present in the polymer gel can be less than 1,000 ppm, less than 100 ppm, less than 50 ppm, less than 10 ppm, or less than 1 ppm. As noted above, in some embodiments other impurities such as hydrogen, oxygen and/or nitrogen can be present in levels ranging from less than 10% to less than 0.01%.

In some specific embodiments, the polymer gel can include less than 100 ppm sodium, less than 300 ppm silicon, less than 50 ppm sulfur, less than 100 ppm calcium, less than 20 ppm iron, less than 10 ppm nickel, less than 40 ppm copper, less than 5 ppm chromium and less than 5 ppm zinc. In other specific embodiments, the polymer gel can include less than 50 ppm sodium, less than 100 ppm silicon, less than 30 ppm sulfur, less than 50 ppm calcium, less than 10 ppm iron, less than 5 ppm nickel, less than 20 ppm copper, less than 2 ppm chromium and less than 2 ppm zinc.

In other specific embodiments, the polymer gel can include less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the polymer gel can include less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed method yields a polymer gel that can have various specific surface areas depending, at least in part, on the exact reaction parameters. Without being bound by theory, it is believed that the surface area of the polymer gel contributes, at least in part, to the surface area properties of the carbon materials. The surface area can be measured using the BET technique well-known to those of skill in the art. In one embodiment of any of the aspects disclosed herein the polymer gel can have a BET specific surface area of at least 150 $m^2/g$, at least 250 $m^2/g$, at least 400 $m^2/g$, at least 500 $m^2/g$, at least 600 $m^2/g$, at least 700 $m^2/g$, at least 800 $m^2/g$, or at least 900 $m^2/g$, or at least 1,000 $m^2/g$, or at least 1,100 $m^2/g$.

In one embodiment, the polymer gel can have a BET specific surface area of 100 $m^2/g$ to 1,000 $m^2/g$. Alternatively, the polymer gel can have a BET specific surface area of between 150 $m^2/g$ and 900 $m^2/g$. Alternatively, the polymer gel can have a BET specific surface area of between 400 $m^2/g$ and 800 $m^2/g$.

In one embodiment, the polymer gel can have a tap density of from 0.10 $cm^3/g$ to 0.60 $cm^3/g$. In one embodiment, the polymer gel can have a tap density of from 0.15 $cm^3/g$ to 0.25 $cm^3/g$. In one embodiment of the present disclosure, the polymer gel can have a BET specific surface area of at least 150 $m^2/g$ and a tap density of less than 0.60 $cm^3/g$. Alternately, the polymer gel can have a BET specific surface area of at least 250 $m^2/g$ and a tap density of less than 0.4 $cm^3/g$. In another embodiment, the polymer gel can have a BET specific surface area of at least 500 $m^2/g$ and a tap density of less than 0.30 $cm^3/g$.

In another embodiment of any of the aspects or variations disclosed herein the polymer gel can have a residual water content of less than 15%, less than 13%, less than 10%, less than 5% or less than 1%.

In one embodiment, the polymer gel can have a fractional pore volume of pores at or below 500 angstroms that make up at least 25% of the total pore volume, 50% of the total pore volume, at least 75% of the total pore volume, at least 90% of the total pore volume or at least 99% of the total pore volume. In another embodiment, the polymer gel can have a fractional pore volume of pores at or below 20 nm that make up at least 50% of the total pore volume, at least 75% of the total pore volume, at least 90% of the total pore volume or at least 99% of the total pore volume.

In some embodiments, the amount of nitrogen adsorbed per mass of polymer gel at 0.05 relative pressure can be at least 10% of the total nitrogen adsorbed up to 0.99 relative pressure or at least 20% of the total nitrogen adsorbed up to 0.99 relative pressure. In another embodiment, the amount of nitrogen adsorbed per mass of polymer gel at 0.05 relative pressure can be between 10% and 50% of the total nitrogen adsorbed up to 0.99 relative pressure, can be between 20% and 60% of the total nitrogen adsorbed up to 0.99 relative pressure or can be between 20% and 30% of the total nitrogen adsorbed up to 0.99 relative pressure.

In one embodiment, the polymer gel can have a fractional pore surface area of pores at or below 100 nm that make up at least 50% of the total pore surface area, at least 75% of the total pore surface area, at least 90% of the total pore surface area or at least 99% of the total pore surface area. In another embodiment, the polymer gel can have a fractional pore surface area of pores at or below 20 nm that make up at least 50% of the total pore surface area, at least 75% of the total pore surface area, at least 90% of the total pore surface or at least 99% of the total pore surface area.

As described in more detail above, methods for preparing the disclosed carbon materials can include pyrolysis of a polymer gel. In some embodiments, the pyrolyzed polymer gels can have a surface area of about 100 $m^2/g$ to about 1,200 $m^2/g$. For example, the pyrolyzed polymer gels can have a surface are from a low of about 100 $m^2/g$, about 150 $m^2/g$, about 200 $m^2/g$, about 250 $m^2/g$, about 300 $m^2/g$, about 350 m$^2$/g, about 400 m$^2$/g, about 450 m$^2$/g, or about 500 m$^2$/g to a high of about 600 m$^2$/g, about 650 m$^2$/g, about 700 m$^2$/g, about 750 m$^2$/g, about 800 m$^2$/g, about 850 m$^2$/g, about 900 m$^2$/g, about 950 m$^2$/g, about 1,000 m$^2$/g, about 1,050 m$^2$/g, about 1,100 m$^2$/g, about 1,150 m$^2$/g, or about 1,200 m$^2$/g. In another embodiment, the pyrolized polymer gel can have a specific surface area from a low of about 100 m$^2$/g, about 200 m$^2$/g, about 300 m$^2$/g, about 400 m$^2$/g, about 500 m$^2$/g, about 600 m$^2$/g, about 700 m$^2$/g, about 800 m$^2$/g, about 900 m$^2$/g, or about 1,000 m$^2$/g to high of about 1,200 m$^2$/g, about 1,400 m$^2$/g, about 1,600 m$^2$/g, about 1,800 m$^2$/g, about 2,000 m$^2$/g, about 2,200 m$^2$/g, about 2,400 m$^2$/g, about 2,600 m$^2$/g, about 2,800 m$^2$/g, or about 3,000 m$^2$/g. In other embodiments, the pyrolyzed polymer gels can have a surface area of about 500 m$^2$/g to about 800 m$^2$/g. In other embodiments, the pyrolyzed polymer gels can have a surface area of about 500 m$^2$/g to about 700 m$^2$/g.

In other embodiments, the pyrolyzed polymer gels have a tap density from about 0.1 cm$^3$/g to about 1.0 cm$^3$/g. For example, the pyrolized polymer gel can have a tap density from a low of about 0.1 cm$^3$/g, about 0.15 cm$^3$/g, about 0.2 cm$^3$/g, about 0.25 cm$^3$/g, about 0.3 cm$^3$/g, about 0.35 cm$^3$/g, or about 0.4 cm$^3$/g to a high of about 0.6 cm$^3$/g, about 0.65 cm$^3$/g, about 0.7 cm$^3$/g, about 0.75 cm$^3$/g, about 0.8 cm$^3$/g, about 0.85 cm$^3$/g, about 0.9 cm$^3$/g, about 0.95 cm$^3$/g, or about 1 cm$^3$/g. In other embodiments, the pyrolyzed polymer gels can have a tap density from about 0.3 cm$^3$/g to about 0.6 cm$^3$/g. In other embodiments, the pyrolyzed polymer gels can have a tap density from about 0.3 cm$^3$/g to about 0.5 cm$^3$/g.

In some embodiments, the polymer gels can have a mean particle diameter ranging from about 4 μm to about 10 mm. In other embodiments, the mean particle diameter of the polymer gel can be from about 1 μm to about 4 mm. In other embodiments, the mean particle diameter of the polymer gel can be from about 10 μm to about 1 mm. Yet in other embodiments, the mean particle diameter of the polymer gel can be from about 20 μm to about 500 μm. Still in other embodiments, the mean particle diameter of the polymer gel can be from about 500 μm to about 4 mm. Yet still in other embodiments, the mean particle diameter of the polymer gel can be from about 2 μm to about 300 μm. In other embodiments, the mean particle diameter of the polymer gel can be from about 100 μm to about 10 μm. In some embodiments, the mean particle diameter of the polymer gel can be about 0.9 mm, about 0.8 mm or about 0.5 mm. In other embodiments, the mean particle diameter of the polymer gel can be about 100 μm, about 50 μm or about 10 μm.

In still other embodiments, the polymer gels can have a monodisperse, or near monodisperse particle size distribution. For example, in some embodiments the polymer gels can have a particle size distribution such that (Dv,90–Dv,10)/Dv,50 is less than 3, where Dv,10, Dv,50, and Dv,90 are the particle size at 10%, 50%, and 90%, respectively of the particle size distribution by volume. In further embodiments, (Dv,90–Dv,10)/Dv,50 can be less than 2, or less than 1. In still other embodiments, (Dv,90–Dv,10)/Dv,50 can be less than 1,000, less than 900, less than 800, less than 700, less than 600, less than 500, less than 400, less than 300, less than 200, less than 100, less than 10, less than 5, less than 3, less than 2, less than 1.5, or less than 1.

Figure 23A:
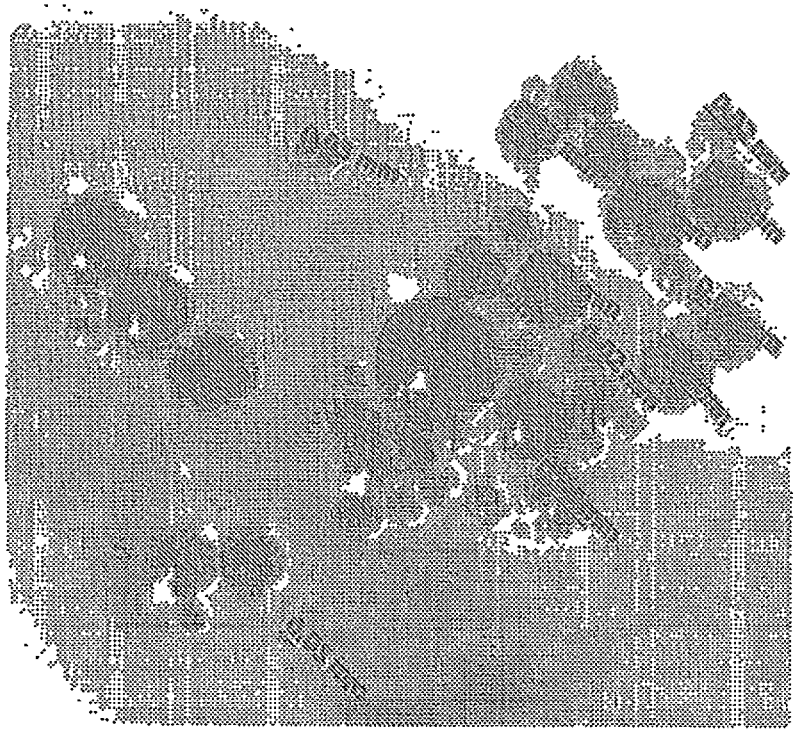
FIGS. 23A and 23B are pictures showing spherical gel particles and spherical carbon material particles, respectively.

In yet other embodiments, the polymer gel particles can have a substantially spherical geometry (see e.g., FIG. 23A). Such geometry contributes to a spherical geometry in some embodiments of the resulting carbon particles as discussed in more detail below. In some embodiments, the polymer gels can be a plurality of polymer gel particles, where greater than 90% of the polymer gel particles have a spherical geometry. For example, in some embodiments, greater than 95% of the polymer gel particles have a spherical geometry.

Since the polymer gels can include electrochemical modifiers, the elemental content of the gels can vary. In some embodiments, the polymer gels can include greater than about 100 ppm of an electrochemical modifier. In certain embodiments, the electrochemical modifier can be selected from nitrogen, iron, tin, silicon, nickel, aluminum and manganese. In some embodiments, the electrochemical modifier can be silicon and in other embodiments the electrochemical modifier can be nitrogen.

The amount of electrochemical modifier in the polymer gels can be controlled to a level desirable for the final carbon material. Accordingly, in some embodiments, the polymer gel can include at least 0.10 wt %, at least 0.25 wt %, at least 0.50 wt %, at least 1.0 wt %, at least 5.0%, at least 10 wt %, at least 25 wt %, at least 50 wt %, at least 75 wt %, at least 90 wt %, at least 95 wt %, at least 99 wt % or at least 99.5 wt % of the electrochemical modifier. For example, in some embodiments, the polymer gels can include between 0.5 wt % and 99.5 wt % carbon and between 0.5 wt % and 99.5 wt % electrochemical modifier. The percent of the electrochemical modifier is calculated on weight percent basis (wt %).

C. Properties of Carbon Materials

One embodiment of the present disclosure provides a carbon material prepared by any of the methods disclosed herein. The pore size distribution of the carbon materials can contribute to the superior performance of electrical devices comprising the carbon materials relative to devices comprising other known carbon materials. For example, in some embodiments, the carbon material can include an optimized blend of both micropores and mesopores and may also include low surface functionality upon pyrolysis and/or activation. In other embodiments, the carbon material can include a total of less than 500 ppm of all elements having atomic numbers ranging from 11 to 92, as measured by proton induced x-ray emission. For example, the carbon material can include a total of less than 475 ppm, less than 450 ppm, less than 400 ppm, less than 350 ppm, less than 300 ppm, less than 250 ppm, less than 200 ppm, less than 150 ppm, less than 100 ppm, less than 75 ppm, or less than 50 ppm of all elements having atomic numbers ranging from 11 to 92, as measured by proton induced x-ray emission. The high purity and optimized micropore and/or mesopore distribution make the carbon materials ideal for use in electrical storage and distribution devices, for example ultracapacitors.

While not wishing to be bound by theory, Applicants believe the optimized pore size distributions, as well as the high purity, of the disclosed carbon materials can be attributed, at least in part, to the disclosed emulsion/suspension polymerization methods. The properties of the disclosed carbon materials, as well as methods for their preparation are discussed in more detail below.

While not wishing to be bound by theory, it is believed that, in addition to the pore structure, the purity profile, surface area and other properties of the carbon materials are a function of its preparation method, and variation of the preparation parameters may yield carbon materials having different properties. Accordingly, in some embodiments, the carbon material can be a pyrolyzed dried polymer gel, for example a pyrolyzed polymer cryogel, a pyrolyzed polymer xerogel or a pyrolyzed polymer aerogel. In other embodiments, the carbon material can be pyrolyzed and activated (e.g., a synthetic activated carbon material). For example, in further embodiments the carbon material can be an activated dried polymer gel, an activated polymer cryogel, an activated polymer xerogel, or an activated polymer aerogel.

As noted above, activated carbon particles are widely employed as an energy storage material. In this regard, a critically important characteristic is high power density, which is possible with electrodes that have low ionic resistance that yield high frequency response. It is important to achieve a low ionic resistance, for instance in situations with device ability to respond to cyclic performance is a constraint. The disclosed methods are useful for preparing carbon material that solves the problem of how to optimize an electrode formulation and maximize the power performance of electrical energy storage and distribution devices. Devices comprising the carbon materials exhibit long-term stability, fast response time and high pulse power performance.

In some embodiments, the disclosed methods produce carbon materials that can include a micropore and/or mesopore structure, which is typically described in terms of fraction (percent) of total pore volume residing in either micropores or mesopores or both. Accordingly, in some embodiments the pore structure of the carbon materials can be from 20% to 90% micropores. In other embodiments, the pore structure of the carbon materials can be from 30% to 70% micropores. In other embodiments, the pore structure of the carbon materials can be from 40% to 60% micropores. In other embodiments, the pore structure of the carbon materials can be from 40% to 50% micropores. In other embodiments, the pore structure of the carbon materials can be from 43% to 47% micropores. In certain embodiments, the pore structure of the carbon materials can be about 45% micropores. In another embodiment, the pore structure of the carbon materials can be from a low of about 20%, about 25%, about 30%, about 35%, about 37%, about 40%, or about 43% to a high of about 47%, about 50%, about 55%, about 60%, about 65%, about 70%, about 75%, about 80%, about 85%, or about 90% micropores.

The mesoporosity of the carbon materials may contribute to high ion mobility and low resistance. In some embodiments, the pore structure of the carbon materials can be from 20% to 80% mesopores. In other embodiments, the pore structure of the carbon materials can be from 30% to 70% mesopores. In other embodiments, the pore structure of the carbon materials can be from 40% to 60% mesopores. In other embodiments, the pore structure of the carbon materials can be from 50% to 60% mesopores. In other embodiments, the pore structure of the carbon materials can be from 53% to 57% mesopores. In other embodiments, the pore structure of the carbon materials can be about 55% mesopores. In another embodiment, the pore structure of the carbon materials can be from a low of about 20%, about 25%, about 30%, about 35%, about 37%, about 40%, or about 43% to a high of about 47%, about 50%, about 55%, about 60%, about 65%, about 70%, about 75%, about 80%, about 85%, or about 90% mesopores.

An optimized blend of micropores and mesopores within the carbon materials may contribute to the enhanced electrochemical performance of the same. Thus, in some embodiments the pore structure of the carbon materials can be from 20% to 80% micropores and from 20% to 80% mesopores. In other embodiments, the pore structure of the carbon materials can be from 30% to 70% micropores and from 30% to 70% mesopores. In other embodiments, the pore structure of the carbon materials comprises from 40% to 60% micropores and from 40% to 60% mesopores. In other embodiments, the pore structure of the carbon materials can be from 40% to 50% micropores and from 50% to 60% mesopores. In other embodiments, the pore structure of the carbon materials can be from 43% to 47% micropores and from 53% to 57% mesopores. In other embodiments, the pore structure of the carbon materials can be about 45% micropores and about 55% mesopores.

In other variations, the carbon materials do not have a substantial volume of pores greater than 20 nm. For example, in certain embodiments the carbon materials can have less than 25%, less than 20%, less than 15%, less than 10%, less than 5%, less than 2.5%, or less than 1% of the total pore volume in pores greater than 20 nm.

The porosity of the carbon materials can contribute to their enhanced electrochemical performance. Accordingly, in one embodiment the carbon material can have a pore volume residing in pores less than 20 angstroms of at least 1.8 $cm^3/g$, at least 1.2 $cm^3/g$, at least 0.6 $cm^3/g$, at least 0.30 $cm^3/g$, at least 0.25 $cm^3/g$, at least 0.20 $cm^3/g$ or at least 0.15 $cm^3/g$. In other embodiments, the carbon material can have a pore volume residing in pores greater than 20 angstroms of at least 7 $cm^3/g$, at least 5 $cm^3/g$, at least 4.00 $cm^3/g$, at least 3.75 $cm^3/g$, at least 3.50 $cm^3/g$, at least 3.25 $cm^3/g$, at least 3.00 $cm^3/g$, at least 2.75 $cm^3/g$, at least 2.50 $cm^3/g$, at least 2.25 $cm^3/g$, at least 2.00 $cm^3/g$, at least 1.90 $cm^3/g$, 1.80 $cm^3/g$, 1.70 $cm^3/g$, 1.60 $cm^3/g$, 1.50 $cm^3/g$, 1.40 $cm^3/g$, at least 1.30 $cm^3/g$, at least 1.20 $cm^3/g$, at least 1.10 $cm^3/g$, at least 1.00 $cm^3/g$, at least 0.85 $cm^3/g$, at least 0.80 $cm^3/g$, at least 0.75 $cm^3/g$, at least 0.70 $cm^3/g$, at least 0.65 $cm^3/g$, at least 0.50 $cm^3/g$, at least 0.4 $cm^3/g$, at least 0.2 $cm^3/g$ or at least 0.1 $cm^3/g$.

In other embodiments, the carbon material can have a pore volume of at least 7.00 $cm^3/g$, at least 5.00 $cm^3/g$, at least 4.00 $cm^3/g$, at least 3.75 $cm^3/g$, at least 3.50 $cm^3/g$, at least 3.25 $cm^3/g$, at least 3.00 $cm^3/g$, at least 2.75 $cm^3/g$, at least 2.50 $cm^3/g$, at least 2.25 $cm^3/g$, at least 2.00 $cm^3/g$, at least 1.90 $cm^3/g$, 1.80 $cm^3/g$, 1.70 $cm^3/g$, 1.60 $cm^3/g$, 1.50 $cm^3/g$, at least 1.40 $cm^3/g$, at least 1.30 $cm^3/g$, at least 1.20 $cm^3/g$, at least 1.0 $cm^3/g$, at least 0.8 $cm^3/g$, at least 0.6 $cm^3/g$, at least 0.4 $cm^3/g$, at least 0.2 $cm^3/g$ or at least 0.1 $cm^3/g$ for pores ranging from 20 angstroms to 500 angstroms.

In other embodiments, the carbon material can have a pore volume of at least at least 7.00 $cm^3/g$, at least 5.00 $cm^3/g$, 4.00 $cm^3/g$, at least 3.75 $cm^3/g$, at least 3.50 $cm^3/g$, at least 3.25 $cm^3/g$, at least 3.00 $cm^3/g$, at least 2.75 $cm^3/g$, at least 2.50 $cm^3/g$, at least 2.25 $cm^3/g$, at least 2.00 $cm^3/g$, at least 1.90 $cm^3/g$, 1.80 $cm^3/g$, 1.70 $cm^3/g$, 1.60 $cm^3/g$, 1.50 $cm^3/g$, 1.40 $cm^3/g$, at least 1.30 $cm^3/g$, at least 1.20 $cm^3/g$, at least 1.10 $cm^3/g$, at least 1.00 $cm^3/g$, at least 0.85 $cm^3/g$, at least 0.80 $cm^3/g$, at least 0.75 $cm^3/g$, at least 0.70 $cm^3/g$, at least 0.65 $cm^3/g$, at least 0.50 $cm^3/g$, at least 1.40 $cm^3/g$, at least 1.30 $cm^3/g$, at least 1.20 $cm^3/g$, at least 1.0 $cm^3/g$, at least 0.8 $cm^3/g$, at least 0.6 $cm^3/g$, at least 0.4 $cm^3/g$, at least 0.2 $cm^3/g$ or at least 0.1 $cm^3/g$ for pores ranging from 20 angstroms to 300 angstroms.

In other embodiments, the carbon material can have a pore volume of at least 7 $cm^3/g$, at least 5 $cm^3/g$, at least 4.00 $cm^3/g$, at least 3.75 $cm^3/g$, at least 3.50 $cm^3/g$, at least 3.25 $cm^3/g$, at least 3.00 $cm^3/g$, at least 2.75 $cm^3/g$, at least 2.50 $cm^3/g$, at least 2.25 $cm^3/g$, at least 2.00 $cm^3/g$, at least 1.90 $cm^3/g$, 1.80 $cm^3/g$, 1.70 $cm^3/g$, 1.60 $cm^3/g$, 1.50 $cm^3/g$, 1.40 $cm^3/g$, at least 1.30 $cm^3/g$, at least 1.20 $cm^3/g$, at least 1.0 $cm^3/g$, at least 0.8 $cm^3/g$, at least 0.6 $cm^3/g$, at least 0.4 $cm^3/g$, at least 0.2 $cm^3/g$, at least 0.1 $cm^3/g$ for pores ranging from 20 angstroms to 1,000 angstroms.

In other embodiments, the carbon material can have a pore volume of at least 7 cm$^3$/g, at least 5 cm$^3$/g, at least 4.00 cm$^3$/g, at least 3.75 cm$^3$/g, at least 3.50 cm$^3$/g, at least 3.25 cm$^3$/g, at least 3.00 cm$^3$/g, at least 2.75 cm$^3$/g, at least 2.50 cm$^3$/g, at least 2.25 cm$^3$/g, at least 2.00 cm$^3$/g, at least 1.90 cm$^3$/g, 1.80 cm$^3$/g, 1.70 cm$^3$/g, 1.60 cm$^3$/g, 1.50 cm$^3$/g, 1.40 cm$^3$/g, at least 1.30 cm$^3$/g, at least 1.20 cm$^3$/g, at least 1.0 cm$^3$/g, at least 0.8 cm$^3$/g, at least 0.6 cm$^3$/g, at least 0.4 cm$^3$/g, at least 0.2 cm$^3$/g, at least 0.1 cm$^3$/g for pores ranging from 20 angstroms to 2,000 angstroms.

In other embodiments, the carbon material can have a pore volume of at least 7 cm$^3$/g, at least 5 cm$^3$/g, at least 4.00 cm$^3$/g, at least 3.75 cm$^3$/g, at least 3.50 cm$^3$/g, at least 3.25 cm$^3$/g, at least 3.00 cm$^3$/g, at least 2.75 cm$^3$/g, at least 2.50 cm$^3$/g, at least 2.25 cm$^3$/g, at least 2.00 cm$^3$/g, at least 1.90 cm$^3$/g, 1.80 cm$^3$/g, 1.70 cm$^3$/g, 1.60 cm$^3$/g, 1.50 cm$^3$/g, 1.40 cm$^3$/g, at least 1.30 cm$^3$/g, at least 1.20 cm$^3$/g, at least 1.0 cm$^3$/g, at least 0.8 cm$^3$/g, at least 0.6 cm$^3$/g, at least 0.4 cm$^3$/g, at least 0.2 cm$^3$/g, at least 0.1 cm$^3$/g for pores ranging from 20 angstroms to 5,000 angstroms.

In other embodiments, the carbon material can have a pore volume of at least 7 cm$^3$/g, at least 5 cm$^3$/g, at least 4.00 cm$^3$/g, at least 3.75 cm$^3$/g, at least 3.50 cm$^3$/g, at least 3.25 cm$^3$/g, at least 3.00 cm$^3$/g, at least 2.75 cm$^3$/g, at least 2.50 cm$^3$/g, at least 2.25 cm$^3$/g, at least 2.00 cm$^3$/g, at least 1.90 cm$^3$/g, 1.80 cm$^3$/g, 1.70 cm$^3$/g, 1.60 cm$^3$/g, 1.50 cm$^3$/g, 1.40 cm$^3$/g, at least 1.30 cm$^3$/g, at least 1.20 cm$^3$/g, at least 1.0 cm$^3$/g, at least 0.8 cm$^3$/g, at least 0.6 cm$^3$/g, at least 0.4 cm$^3$/g, at least 0.2 cm$^3$/g, at least 0.1 cm$^3$/g for pores ranging from 20 angstroms to 1 micron.

In other embodiments, the carbon material can have a pore volume of at least 7 cm$^3$/g, at least 5 cm$^3$/g, at least 4.00 cm$^3$/g, at least 3.75 cm$^3$/g, at least 3.50 cm$^3$/g, at least 3.25 cm$^3$/g, at least 3.00 cm$^3$/g, at least 2.75 cm$^3$/g, at least 2.50 cm$^3$/g, at least 2.25 cm$^3$/g, at least 2.00 cm$^3$/g, at least 1.90 cm$^3$/g, 1.80 cm$^3$/g, 1.70 cm$^3$/g, 1.60 cm$^3$/g, 1.50 cm$^3$/g, 1.40 cm$^3$/g, at least 1.30 cm$^3$/g, at least 1.20 cm$^3$/g, at least 1.0 cm$^3$/g, at least 0.8 cm$^3$/g, at least 0.6 cm$^3$/g, at least 0.4 cm$^3$/g, at least 0.2 cm$^3$/g, at least 0.1 cm$^3$/g for pores ranging from 20 angstroms to 2 microns.

In other embodiments, the carbon material can have a pore volume of at least 7 cm$^3$/g, at least 5 cm$^3$/g, at least 4.00 cm$^3$/g, at least 3.75 cm$^3$/g, at least 3.50 cm$^3$/g, at least 3.25 cm$^3$/g, at least 3.00 cm$^3$/g, at least 2.75 cm$^3$/g, at least 2.50 cm$^3$/g, at least 2.25 cm$^3$/g, at least 2.00 cm$^3$/g, at least 1.90 cm$^3$/g, 1.80 cm$^3$/g, 1.70 cm$^3$/g, 1.60 cm$^3$/g, 1.50 cm$^3$/g, 1.40 cm$^3$/g, at least 1.30 cm$^3$/g, at least 1.20 cm$^3$/g, at least 1.0 cm$^3$/g, at least 0.8 cm$^3$/g, at least 0.6 cm$^3$/g, at least 0.4 cm$^3$/g, at least 0.2 cm$^3$/g, at least 0.1 cm$^3$/g for pores ranging from 20 angstroms to 3 microns.

In other embodiments, the carbon material can have a pore volume of at least 7 cm$^3$/g, at least 5 cm$^3$/g, at least 4.00 cm$^3$/g, at least 3.75 cm$^3$/g, at least 3.50 cm$^3$/g, at least 3.25 cm$^3$/g, at least 3.00 cm$^3$/g, at least 2.75 cm$^3$/g, at least 2.50 cm$^3$/g, at least 2.25 cm$^3$/g, at least 2.00 cm$^3$/g, at least 1.90 cm$^3$/g, 1.80 cm$^3$/g, 1.70 cm$^3$/g, 1.60 cm$^3$/g, 1.50 cm$^3$/g, 1.40 cm$^3$/g, at least 1.30 cm$^3$/g, at least 1.20 cm$^3$/g, at least 1.0 cm$^3$/g, at least 0.8 cm$^3$/g, at least 0.6 cm$^3$/g, at least 0.4 cm$^3$/g, at least 0.2 cm$^3$/g, at least 0.1 cm$^3$/g for pores ranging from 20 angstroms to 4 microns.

In other embodiments, the carbon material can have a pore volume of at least 7 cm$^3$/g, at least 5 cm$^3$/g, at least 4.00 cm$^3$/g, at least 3.75 cm$^3$/g, at least 3.50 cm$^3$/g, at least 3.25 cm$^3$/g, at least 3.00 cm$^3$/g, at least 2.75 cm$^3$/g, at least 2.50 cm$^3$/g, at least 2.25 cm$^3$/g, at least 2.00 cm$^3$/g, at least 1.90 cm$^3$/g, 1.80 cm$^3$/g, 1.70 cm$^3$/g, 1.60 cm$^3$/g, 1.50 cm$^3$/g, 1.40 cm$^3$/g, at least 1.30 cm$^3$/g, at least 1.20 cm$^3$/g, at least 1.0 cm$^3$/g, at least 0.8 cm$^3$/g, at least 0.6 cm$^3$/g, at least 0.4 cm$^3$/g, at least 0.2 cm$^3$/g, at least 0.1 cm$^3$/g for pores ranging from 20 angstroms to 5 microns.

In yet other embodiments, the carbon materials can have a total pore volume of at least 4.00 cm$^3$/g, at least 3.75 cm$^3$/g, at least 3.50 cm$^3$/g, at least 3.25 cm$^3$/g, at least 3.00 cm$^3$/g, at least 2.75 cm$^3$/g, at least 2.50 cm$^3$/g, at least 2.25 cm$^3$/g, at least 2.00 cm$^3$/g, at least 1.90 cm$^3$/g, 1.80 cm$^3$/g, 1.70 cm$^3$/g, 1.60 cm$^3$/g, 1.50 cm$^3$/g, 1.40 cm$^3$/g, at least 1.30 cm$^3$/g, at least 1.20 cm$^3$/g, at least 1.10 cm$^3$/g, at least 1.00 cm$^3$/g, at least 0.85 cm$^3$/g, at least 0.80 cm$^3$/g, at least 0.75 cm$^3$/g, at least 0.70 cm$^3$/g, at least 0.65 cm$^3$/g, at least 0.60 cm$^3$/g, at least 0.55 cm$^3$/g, at least 0.50 cm$^3$/g, at least 0.45 cm$^3$/g, at least 0.40 cm$^3$/g, at least 0.35 cm$^3$/g, at least 0.30 cm$^3$/g, at least 0.25 cm$^3$/g, at least 0.20 cm$^3$/g or at least 0.10 cm$^3$/g. In another embodiment, the carbon material can have a total pore volume from a low of about 0.1 cm$^3$/g, about 0.2 cm$^3$/g, about 0.25 cm$^3$/g, about 0.3 cm$^3$/g, about 0.4 cm$^3$/g, about 0.5 cm$^3$/g, about 0.6 cm$^3$/g, about 0.7 cm$^3$/g, about 0.8 cm$^3$/g, about 0.9 cm$^3$/g, or about 1 cm$^3$/g to a high of about 1.5 cm$^3$/g, about 2 cm$^3$/g, about 2.5 cm$^3$/g, about 3 cm$^3$/g, about 3.5 cm$^3$/g, about 4 cm$^3$/g, about 4.5 cm$^3$/g, about 5 cm$^3$/g, about 5.5 cm$^3$/g, about 6 cm$^3$/g, about 6.5 cm$^3$/g, about 7 cm$^3$/g, about 7.5 cm$^3$/g, or about 8 cm$^3$/g.

In yet other embodiments, the carbon materials can have a pore volume residing in pores of less than 20 angstroms of at least 0.2 cm$^3$/g and a pore volume residing in pores of between 20 and 300 angstroms of at least 0.8 cm$^3$/g. In yet other embodiments, the carbon materials can have a pore volume residing in pores of less than 20 angstroms of at least 0.5 cm$^3$/g and a pore volume residing in pores of between 20 and 300 angstroms of at least 0.5 cm$^3$/g. In yet other embodiments, the carbon can have comprise a pore volume residing in pores of less than 20 angstroms of at least 0.6 cm$^3$/g and a pore volume residing in pores of between 20 and 300 angstroms of at least 2.4 cm$^3$/g. In yet other embodiments, the carbon materials can have a pore volume residing in pores of less than 20 angstroms of at least 1.5 cm$^3$/g and a pore volume residing in pores of between 20 and 300 angstroms of at least 1.5 cm$^3$/g.

In some embodiments, the pores of the carbon material can have a peak pore volume of 2 nm to 10 nm. In other embodiments, the peak pore volume can be from 10 nm to 20 nm. Yet in other embodiments, the peak pore volume can be from 20 nm to 30 nm. Still in other embodiments, the peak pore volume can be from 30 nm to 40 nm. Yet still in other embodiments, the peak pore volume can be from 40 nm to 50 nm. In other embodiments, the peak pore volume can be from 50 nm to 100 nm. In another embodiment, the pores of the carbon material can have a peak pore volume from a low of about 2 nm, about 5 nm, about 10 nm, about 15 nm, about 20 nm, about 25 nm, about 30 nm, about 35 nm, about 40 nm, about 45 nm, or about 50 nm to a high of about 60 nm, about 65 nm, about 70 nm, about 75 nm, about 80 nm, about 85 nm, about 90 nm, about 95 nm, or about 100 nm.

In certain embodiments a mesoporous carbon material having a low pore volume in the micropore region (e.g., less than 60%, less than 50%, less than 40%, less than 30%, less than 20% microporosity) can be prepared by the disclosed methods. For example, the mesoporous carbon material can be a polymer gel that has been pyrolyzed, but not activated. In some embodiments, the pyrolyzed mesoporous carbon can have a specific surface area of at least 400 m$^2$/g, at least 500 m$^2$/g, at least 600 m$^2$/g, at least 675 m$^2$/g or at least 750 m$^2$/g. In other embodiments, the mesoporous carbon material can have a total pore volume of at least 0.50 cm$^3$/g, at least 0.60 cm³/g, at least 0.70 cm³/g, at least 0.80 cm³/g or at least 0.90 cm³/g. In yet other embodiments, the mesoporous carbon material can have a tap density of at least 0.30 cm³/g, at least 0.35 cm³/g, at least 0.40 cm³/g, at least 0.45 cm³/g, at least 0.50 cm³/g or at least 0.55 cm³/g.

In other embodiments, the carbon materials can have a total pore volume ranging greater than or equal to 0.1 cm³/g, and in other embodiments the carbon materials can have a total pore volume less than or equal to 0.6 cm³/g. In other embodiments, the carbon materials can have a total pore volume ranging from about 0.1 cm³/g to about 0.6 cm³/g. In some other embodiments, the total pore volume of the carbon materials can be about 0.1 cm³/g to about 0.2 cm³/g. In some other embodiments, the total pore volume of the carbon materials can be about 0.2 cm³/g to about 0.3 cm³/g. In some other embodiments, the total pore volume of the carbon materials can be about 0.3 cm³/g to about 0.4 cm³/g. In some other embodiments, the total pore volume of the carbon materials can be about 0.4 cm³/g to about 0.5 cm³/g. In some other embodiments, the total pore volume of the carbon materials can be about 0.5 cm³/g to about 0.6 cm³/g. In another embodiment, the total pore volume of the carbon materials can be from a low of about 0.1 cm³/g, about 0.15 cm³/g, about 0.2 cm³/g, about 0.25 cm³/g, or about 0.3 cm³/g to a high of about 0.35 cm³/g, about 0.4 cm³/g, about 0.45 cm³/g, about 0.5 cm³/g, about 0.55 cm³/g, or about 0.6 cm³/g.

The carbon material comprises low total PIXE impurities. Thus, in some embodiments the total PIXE impurity content of all other PIXE elements in the carbon material (as measured by proton induced x-ray emission) can be less than 1,000 ppm. In other embodiments, the total PIXE impurity content of all other PIXE elements in the carbon material can be less than 800 ppm, less than 700 ppm, less than 600 ppm, less than 500 ppm, less than 400 ppm, less than 300 ppm, less than 200 ppm, less than 150 ppm, less than 100 ppm, less than 50 ppm, less than 25 ppm, less than 10 ppm, less than 5 ppm or less than 1 ppm. In further embodiments of the foregoing, the carbon material can be a pyrolyzed dried polymer gel, a pyrolyzed polymer cryogel, a pyrolyzed polymer xerogel, a pyrolyzed polymer aerogel, an activated dried polymer gel, an activated polymer cryogel, an activated polymer xerogel or an activated polymer aerogel.

In addition to low content of undesired PIXE impurities, the disclosed carbon materials can have high total carbon content. In addition to carbon, the carbon material can also include oxygen, hydrogen, nitrogen and the electrochemical modifier. In some embodiments, the carbon material can be at least 75% carbon, at least 80% carbon, at least 85% carbon, at least 90% carbon, at least 95% carbon, at least 96% carbon, at least 97% carbon, at least 98% carbon, at least 99% carbon, at least 99.5% carbon, at least 99.7% carbon, at least 99.9% carbon, or at least 99.95% carbon on a weight/weight basis. In some other embodiments, the carbon material can include less than 10% oxygen, less than 5% oxygen, less than 3% oxygen, less than 2.5% oxygen, less than 1% oxygen or less than 0.5% oxygen on a weight/weight basis. In other embodiments, the carbon material can include less than 10% hydrogen, less than 5% hydrogen, less than 2.5% hydrogen, less than 1% hydrogen, less than 0.5% hydrogen or less than 0.1% hydrogen on a weight/weight basis. In other embodiments, the carbon material can include less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

In other embodiments, the carbon content can be greater than 98 wt % as measured by CHNO analysis. In another embodiment, the carbon content can be 50 wt % to 98 wt % of the total mass. In yet other embodiments, the carbon content can be 90 wt % to 98 wt % of the total mass. In yet other embodiments, the carbon content can be 80 wt % to 90 wt % of the total mass. In yet other embodiments, the carbon content can be 70 wt % to 80 wt % of the total mass. In yet other embodiments, the carbon content can be 60 wt % to 70 wt % of the total mass.

In another embodiment, the nitrogen content can be 0 wt % to about 30 wt % as measured by CHNO analysis. In another embodiment, the nitrogen content can be 1 wt % to 10 wt % of the total mass. In yet other embodiments, the nitrogen content can be 10 wt % to 20 wt % of the total mass. In yet other embodiments, the nitrogen content can be 20 wt % to 30 wt % of the total mass. In another embodiment, the nitrogen content can be greater than 30 wt %.

The carbon and nitrogen content may also be measured as a ratio of C:N. In one embodiment, the C:N ratio can be 1:0.001 to 1:1. In another embodiment, the C:N ratio can be 1:0.001 to 0.01. In yet another embodiment, the C:N ratio can be 1:0.01 to 1:1. In yet another embodiment, the content of nitrogen exceeds the content of carbon.

The carbon materials can also include one or more electrochemical modifiers (i.e., a dopant) selected to optimize the electrochemical performance of the carbon materials. The electrochemical modifier can be added during the polymerization step as described above. For example, the electrochemical modifier can added to the above described mixture, continuous phase or polymer phase, or included within the polymerization process in any other manner.

The electrochemical modifier can be incorporated within the pore structure and/or on the surface of the carbon material or incorporated in any number of other ways. For example, in some embodiments, the carbon materials can include a coating of the electrochemical modifier (e.g., $Al_2O_3$) on the surface of the carbon materials. In some embodiments, the carbon materials can include greater than about 100 ppm of an electrochemical modifier. In certain embodiments, the electrochemical modifier can be selected from iron, tin, silicon, nickel, aluminum, manganese, and any mixture thereof. In some embodiments, the electrochemical modifier can be silicon and in other embodiments the electrochemical modifier can be nitrogen.

In certain embodiments the electrochemical modifier can be an element with the ability to lithiate from 3 to 0 V versus lithium metal (e.g., silicon, tin, sulfur). In other embodiments, the electrochemical modifier can be or include metal oxides with the ability to lithiate from 3 to 0 V versus lithium metal (e.g., iron oxide, molybdenum oxide, titanium oxide). In still other embodiments, the electrochemical modifier can be or include elements which do not lithiate from 3 to 0 V versus lithium metal (e.g., aluminum, manganese, nickel, metal-phosphates). In yet other embodiments, the electrochemical modifier can be or include a non-metal element (e.g., fluorine, nitrogen, hydrogen). In still other embodiments, the electrochemical modifier can be or include any of the foregoing electrochemical modifiers or any combination thereof (e.g., tin-silicon, nickel-titanium oxide).

The electrochemical modifier can be provided in any number of forms. For example, in some embodiments the electrochemical modifier can be or include a salt. In other embodiments, the electrochemical modifier can be or include one or more elements in elemental form, for example elemental iron, tin, silicon, nickel, or manganese. In other embodiments, the electrochemical modifier can be or include one or more elements in oxidized form, for example iron oxides, tin oxides, silicon oxides, nickel oxides, aluminum oxides, or manganese oxides.

In other embodiments, the electrochemical modifier can be or include iron. In other embodiments, the electrochemical modifier can be or include tin. In other embodiments, the electrochemical modifier can be or include silicon. In some other embodiments, the electrochemical modifier can be or include nickel. In yet other embodiments, the electrochemical modifier can be or include aluminum. In yet other embodiments, the electrochemical modifier can be or include manganese. In yet other embodiments, the electrochemical modifier can be or include $Al_2O_3$.

The electrochemical properties of the carbon materials can be modified, at least in part, by the amount of the electrochemical modifier in the carbon material. Accordingly, in some embodiments, the carbon material can be at least 0.10 wt %, at least 0.25 wt %, at least 0.50 wt %, at least 1.0 wt %, at least 5.0 wt %, at least 10 wt %, at least 25 wt %, at least 50 wt %, at least 75 wt %, at least 90 wt %, at least 95 wt %, at least 99 wt % or at least 99.5 wt % of the electrochemical modifier. For example, in some embodiments, the carbon materials can include between 0.5 wt % and 99.5 wt % carbon and between 0.5 wt % and 99.5 wt % electrochemical modifier. The percent of the electrochemical modifier is calculated on weight percent basis (wt %). In some other more specific embodiments, the electrochemical modifier is selected from iron, tin, silicon, nickel and manganese.

The total ash content of the carbon material can, in some instances, have an effect on the electrochemical performance of the carbon material. Accordingly, in some embodiments, the ash content of the carbon material can be about 0.1 wt % to 0.001 wt % ash, for example in some specific embodiments the ash content of the carbon material can be less than 0.1 wt %, less than 0.08 wt %, less than 0.05 wt %, less than 0.03 wt %, than 0.025 wt %, less than 0.01 wt %, less than 0.0075 wt %, less than 0.005 wt % or less than 0.001 wt %.

In other embodiments, the carbon material can have a total PIXE impurity content of less than 500 ppm and an ash content of less than 0.08 wt %. In further embodiments, the carbon material can have a total PIXE impurity content of less than 300 ppm and an ash content of less than 0.05 wt %. In other further embodiments, the carbon material can have a total PIXE impurity content of less than 200 ppm and an ash content of less than 0.05 wt %. In other further embodiments, the carbon material can have a total PIXE impurity content of less than 200 ppm and an ash content of less than 0.025 wt %. In other further embodiments, the carbon material can have a total PIXE impurity content of less than 100 ppm and an ash content of less than 0.02 wt %. In other further embodiments, the carbon material can have a total PIXE impurity content of less than 50 ppm and an ash content of less than 0.01 wt %.

The amount of individual PIXE impurities present in the disclosed carbon materials can be determined by proton induced x-ray emission. Individual PIXE impurities may contribute in different ways to the overall electrochemical performance of the disclosed carbon materials. Thus, in some embodiments, the level of sodium present in the carbon material can be less than 1,000 ppm, less than 900 ppm, less than 800 ppm, less than 700 ppm, less than 600 ppm, less than 500 ppm, less than 400 ppm, less than 300 ppm, less than 200 ppm, less than 100 ppm, less than 50 ppm, less than 10 ppm, or less than 1 ppm. As noted above, in some embodiments other impurities such as hydrogen, oxygen and/or nitrogen may be present in levels less than 10 wt % to less than 0.01 wt %.

In some embodiments, the carbon material can have undesired PIXE impurities near or below the detection limit of the proton induced x-ray emission analysis. For example, in some embodiments the carbon material can include less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the carbon material can include less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the carbon material can include less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the carbon material can include less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the carbon material can include less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed carbon materials may also include a high surface area. While not wishing to be bound by theory, it is thought that the high surface area may contribute, at least in part, to their superior electrochemical performance. Accordingly, in some embodiments, the carbon material can have a BET specific surface area of at least 100 m²/g, at least 300 m²/g, at least 500 m²/g, at least 1,000 m²/g, at least 1,500 m²/g, at least 2,000 m²/g, at least 2,400 m²/g, at least 2,500 m²/g, at least 2,750 m²/g or at least 3,000 m²/g. In other embodiments, the BET specific surface area can be about 100 m²/g to about 3,000 m²/g, for example about 500 m²/g to about 1,000 m²/g, about 1,000 m²/g to about 1,500 m²/g, about 1,500 m²/g to about 2,000 m²/g, about 2,000 m²/g to about 2,500 m²/g, or about 2,500 m²/g to about 3,000 m²/g. In another example, the carbon material can have a BET specific surface area from a low of about 100 m²/g, about 150 m²/g, about 200 m²/g, about 250 m²/g, about 300 m²/g, about 350 m²/g, about 400 m²/g, about 450 m²/g, or about 500 m²/g to a high of about 1,000 m²/g, about 1,500 m²/g, about 2,000 m²/g, about 2,400 m²/g, about 2,500 m²/g, about 2,750 m²/g, about 3,000 m²/g, about 3,500 m²/g, about 4,000 m²/g, about 4,500 m²/g, or about 5,000 m²/g. In some embodiments of the foregoing, the carbon material can be activated.

In some specific embodiments the surface area can be from about 50 m²/g to about 1,200 m²/g, for example from about 50 m²/g to about 400 m²/g. In other particular embodiments, the surface area can be from about 200 m²/g to about 300 m²/g, for example the surface area can be about 250 m²/g.

In another embodiment, the carbon material can have a tap density between 0.1 cm³/g and 1.0 cm³/g, between 0.2 cm³/g and 0.8 cm³/g, between 0.3 cm³/g and 0.5 cm³/g or between 0.4 cm³/g and 0.5 cm³/g. In another embodiment, the carbon material can have a total pore volume of at least 0.1 cm³/g, at least 0.2 cm³/g, at least 0.3 cm³/g, at least 0.4 cm³/g, at least 0.5 cm³/g, at least 0.7 cm³/g, at least 0.75 cm³/g, at least 0.9 cm³/g, at least 1.0 cm³/g, at least 1.1 cm³/g, at least 1.2 cm³/g, at least 1.3 cm³/g, at least 1.4 cm³/g, at least 1.5 cm³/g or at least 1.6 cm³/g. In another embodiment, the carbon material can have a tap density from a low of about 0.1 cm³/g, about 0.15 cm³/g, about 0.2 cm³/g, about 0.25 cm³/g, about 0.3 cm³/g, about 0.35 cm³/g, about 0.4 cm³/g, about 0.45 cm³/g, or about 0.5 cm³/g to a high of about 0.6 cm³/g, about 0.7 cm³/g, about 0.8 cm³/g, about 0.9 cm³/g, about 1 cm³/g, about 1.1 cm³/g, about 1.2 cm³/g, about 1.3 cm³/g, about 1.4 cm³/g, about 1.5 cm³/g, about 1.6 cm³/g, about 1.7 cm³/g, about 1.8 cm³/g, about 1.9 cm³/g, or about 2 cm³/g.

The pore size distribution of the disclosed carbon materials can be one parameter that can have an effect on the electrochemical performance of the carbon materials. For example, the carbon materials can include mesopores with a short effective length (i.e., less than 10 nm, less than 5, nm or less than 3 nm as measured by TEM) which decreases ion diffusion distance and may be useful to enhance ion transport and maximize power. Accordingly, in one embodiment, the carbon material can have a fractional pore volume of pores at or below 100 nm that make up at least 50% of the total pore volume, at least 75% of the total pore volume, at least 90% of the total pore volume or at least 99% of the total pore volume. In other embodiments, the carbon material can have a fractional pore volume of pores at or below 20 nm that make up at least 50% of the total pore volume, at least 75% of the total pore volume, at least 90% of the total pore volume or at least 99% of the total pore volume.

In another embodiment, the carbon material can have a fractional pore surface area of pores between 20 and 300 angstroms that make up at least 40% of the total pore surface area, at least 50% of the total pore surface area, at least 70% of the total pore surface area or at least 80% of the total pore surface area. In another embodiment, the carbon material can have a fractional pore surface area of pores at or below 20 nm that make up at least 20% of the total pore surface area, at least 30% of the total pore surface area, at least 40% of the total pore surface area or at least 50% of the total pore surface area.

In another embodiment, the carbon material can have a fractional pore surface area of pores at or below 100 nm that make up at least 50% of the total pore surface area, at least 55% of the total pore surface area, at least 60% of the total pore surface area, at least 65% of the total pore surface area, at least 70% of the total pore surface area, at least 75% of the total pore surface area, at least 80% of the total pore surface area, at least 85% of the total pore surface area, at least 90% of the total pore surface area, at least 95% of the total pore surface are, or at least 99% of the total pore surface area. In another embodiment, the carbon material can have a fractional pore surface area of pores at or below 20 nm that make up at least 50% of the total pore surface area, at least 55% of the total pore surface area, at least 60% of the total pore surface area, at least 65% of the total pore surface area, at least 70% of the total pore surface area, at least 75% of the total pore surface area, at least 80% of the total pore surface area, at least 85% of the total pore surface area, at least 90% of the total pore surface area, at least 95% of the total pore surface area, or at least 99% of the total pore surface area.

In another embodiment, the carbon material can have pores predominantly in the range of 1,000 angstroms or lower, 900 angstroms or lower, 800 angstroms or lower, 700 angstroms or lower, 600 angstroms or lower, 500 angstroms or lower, 400 angstroms or lower, 300 angstroms or lower, 200 angstroms or lower, 100 angstroms or lower, or 50 angstroms or lower. Alternatively, the carbon material can have micropores in the range of 0 angstroms to 20 angstroms and mesopores in the range of 20 angstroms to 300 angstroms. The ratio of pore volume or pore surface in the micropore range compared to the mesopore range can be 95:5 to 5:95. Alternatively, the ratio of pore volume or pore surface in the micropore range compared to the mesopore range can be 20:80 to 60:40. In another embodiment, the ratio of pore volume or pore surface in the micropore range to the mesopore range can be about 90:10 to 10:90, about 85:15 to 15:85, about 80:20 to about 20:80, about 70:30 to 30:70, or about 60:40 to about 40:60.

In other embodiments, the carbon materials can be mesoporous and include monodisperse mesopores. As used herein, the term "monodisperse" when used in reference to a pore size refers generally to a span (further defined as (Dv,90−Dv,10)/Dv, 50 where Dv,10, Dv,50, and Dv,90 refer to the pore size at 10%, 50%, and 90% of the distribution by volume of about 3 or less, about 2 or less, or about 1.5 or less.

Yet in other embodiments, the carbons materials can have a pore volume of at least 1 cm³/g, at least 2 cm³/g, at least 3 cm³/g, at least 4 cm³/g or at least 7 cm³/g. In one particular embodiment, the carbon materials can have a pore volume of from 1 cm³/g to 7 cm³/g. The carbon materials can have a pore volume from a low of about 0.5 cm³/g, about 1 cm³/g, about 1.5 cm³/g, about 2 cm³/g, about 2.5 cm³/g, about 3 cm³/g, about 3.5 cm³/g, or about 4 cm³/g to a high of about 5 cm³/g, about 5.5 cm³/g, about 6 cm³/g, about 6.5 cm³/g, about 7 cm³/g, about 8 cm³/g, about 9 cm³/g, or about 10 cm³/g.

In other embodiments, the carbon materials can have at least 50% of the total pore volume residing in pores with a diameter ranging from 50 Å to 5,000 Å. In some instances, the carbon materials can have at least 50% of the total pore volume residing in pores with a diameter ranging from 50 Å to 500 Å. Still in other instances, the carbon materials can have at least 50% of the total pore volume residing in pores with a diameter ranging from 500 Å to 1,000 Å. Yet in other instances, the carbon materials can have at least 50% of the total pore volume residing in pores with a diameter ranging from 1,000 Å to 5,000 Å. In another embodiment, the carbon materials can have at least 50% of the total pore volume residing in pores with a diameter ranging from a low of about 50 Å, about 100 Å, about 250 Å, about 500 Å, about 750 Å, or about 1,000 Å to a high of about 2,000 Å, about 2,500 Å, about 3,000 Å, about 3,500 Å, about 4,000 Å, about 4,500 Å, or about 5,000 Å.

In some embodiments, the mean particle diameter of the carbon materials can be 1 micron to 1,000 microns. In other embodiments the mean particle diameter of the carbon materials can be 1 to 100 microns. Still in other embodiments the mean particle diameter of the carbon materials can be 1 to 50 microns. Yet in other embodiments, the mean particle diameter of the carbon materials can be 5 to 15 microns or 1 to 5 microns. Still in other embodiments, the mean particle diameter of the carbon materials can be about 10 microns. Still in other embodiments, the mean particle diameter of the carbon materials can be less than 4, less than 3, less than 2, or less than 1 microns. In another embodiment, the carbon material can have a mean particle diameter from a low of about 1 micron, about 5 microns, about 10 microns, about 25 microns, about 50 microns, about 100 microns, about 150 microns, about 200 microns, or about 250 microns to a high of about 400 microns, about 500 microns, about 600 microns, about 700 microns, about 800 microns, about 900 microns, or about 1,000 microns.

In some embodiments, the carbon materials can have a mean particle diameter of 1 nm to 10 nm. In other embodiments, the mean particle diameter can be 10 nm to 20 nm. Yet in other embodiments, the mean particle diameter can be 20 nm to 30 nm. Still in other embodiments, the mean particle diameter can be 30 nm to 40 nm. Yet still in other embodiments, the mean particle diameter can be 40 nm to 50 nm. In other embodiments, the mean particle diameter can be 50 nm to 100 nm. In other embodiments, the mean particle diameter ranges from about 1 μm to about 1 mm. In other embodiments, the mean particle diameter ranges from about 100 μm to about 10 μm. In other embodiments, the mean particle diameter can be about 100 μm, about 50 μm, or about 10 μm. In another embodiment, the carbon material can have a mean particle diameter from a low of about 1 nm, about 3 nm, about 5 nm, about 10 nm, about 15 nm, about 20 nm, about 30 nm, about 40 nm, about 50 nm, about 60 nm, about 70 nm, about 80 nm, about 90 nm, or about 100 nm to a high of about 200 nm, about 300 nm, about 400 nm, about 500 nm, about 600 nm, about 700 nm, about 800 nm, about 900 nm, or about 1,000 nm.

In some embodiments, the mean particle diameter for the carbons can be 1 to 1,000 microns. In other embodiments the mean particle diameter for the carbon can be 1 to 100 microns. Still in other embodiments the mean particle diameter for the carbon can be 5 to 50 microns. Yet in other embodiments, the mean particle diameter for the carbon can be 5 to 15 microns. Still in other embodiments, the mean particle diameter for the carbon can be about 10 microns.

In some embodiments, the carbon materials exhibit a mean particle diameter of 1 micron to 5 microns. In other embodiments, the mean particle diameter can be 5 microns to 10 microns. In yet other embodiments, the mean particle diameter can be 10 nm to 20 microns. Still in other embodiments, the mean particle diameter can be 20 nm to 30 microns. Yet still in other embodiments, the mean particle diameter can be 30 microns to 40 microns. Yet still in other embodiments, the mean particle diameter can be 40 microns to 50 microns. In other embodiments, the mean particle diameter can be 50 microns to 100 microns. In other embodiments, the mean particle diameter can be in the submicron range<1 micron.

In related embodiments, the carbon materials can have a mean particle diameter of 0.1 mm to 4 mm. In other embodiments, the mean particle diameter can be 0.5 mm to 4 mm. In yet other embodiments, the mean particle diameter ranges can be 0.5 mm to 3 mm. Still in other embodiments, the mean particle diameter can be 0.5 mm to 2 mm. In other embodiments, the mean particle diameter can be 0.5 mm to 1 mm. In certain embodiments, the mean particle diameter can be about 0.9 mm, about 0.8 mm, or about 0.5 mm. In another embodiment, the carbon material can have a mean particle diameter from a low of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, or about 1.5 mm to a high of about 1.6 mm, about 1.8 mm, about 2 mm, about 2.3 mm, about 2.5 mm, about 2.8 mm, about 3 mm, about 3.3 mm, about 3.5 mm, about 3.7 mm, or about 4 mm.

In still other embodiments, the carbon materials can have a monodisperse, or near monodisperse particle size distribution. For example, in some embodiments the carbon material can have a particle size distribution such that $(Dv,90-Dv,10)/Dv,50$ can be less than 3, where $Dv,10$, $Dv,50$, and $Dv,90$ are the particle size at 10%, 50%, and 90%, respectively of the particle size distribution by volume. In further embodiments, $(Dv,90-Dv,10)/Dv,50$ can be less than 2 or less than 1. In still other embodiments, $(Dv,90-Dv,10)/Dv,50$ can be less than 1,000, less than 900, less than 800, less than 700, less than 600, less than 500, less than 400, less than 300, less than 200, less than 100, less than 10, less than 5, less than 3, less than 2, less than 1.5 or even less than 1.

Figure 23B:
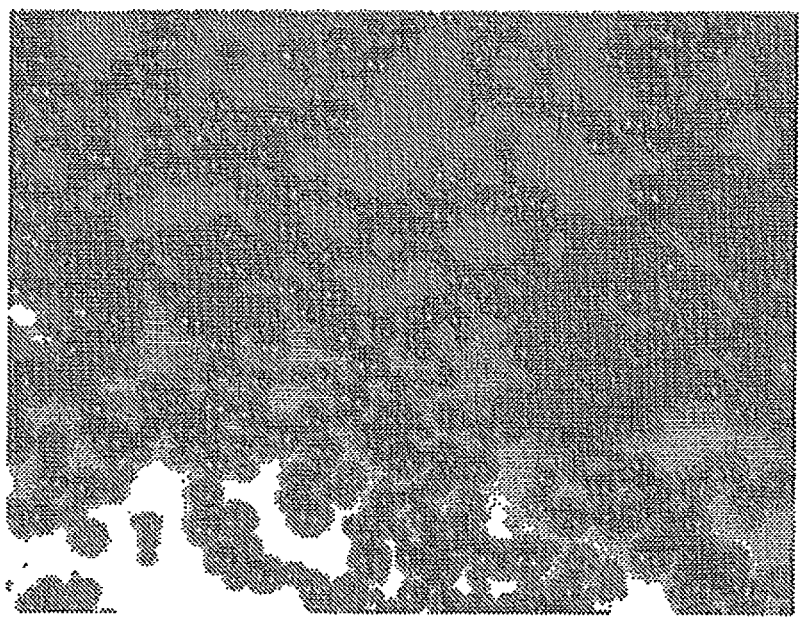

In yet other embodiments, the carbon materials can be or include carbon particles having a substantially spherical geometry as determined by optical microscopy and image analysis (see e.g., FIG. 23B). For example, greater than 75%, greater than 80%, greater than 85%, greater than 90%, greater than 91%, greater than 92%, greater than 93%, greater than 94%, greater than 95%, greater than 96%, greater than 97%, greater than 98%, or greater than 99% of the carbon particles can have a spherical geometry. Such geometry may improve the performance of any number of electrical devices comprising the carbon materials since the geometry is known to affect particle packing (and thus energy density). In some embodiments, the carbon material can be or include a plurality of carbon particles, where greater than 90% of the carbon particles have a spherical geometry. For example, in some embodiments, greater than 95% of the carbon materials can have a spherical geometry.

As noted above, the presently disclosed methods advantageously provide polymer gels and/or carbon materials having improved particle size distributions. In some embodiments, the particle size distribution can contribute to enhanced packing of the individual polymer or carbon particles. Enhanced packing of energy storage particles, for example carbon particles, can be beneficial for a variety of applications. For example, activated carbon materials having high surface areas are routinely used in energy storage devices such as capacitors, particularly supercapacitors. Typically such high-surface area carbon materials tend to have low densities, and thus their capacitance on a volume basis (i.e., volumetric capacitance) is relatively low. For practical applications, capacitors require both high gravimetric and high volumetric capacitance. For devices that are constrained with respect to size, volumetric capacitance can be increased by more densely packing the activated carbon particles. Traditional milling of activated carbon materials yields powders having a distribution of particle sizes and a wide and random range of structures (i.e., non-spherical particle shapes). These characteristics limit the ability of activated carbon powders to be densely packed, thus limiting the volumetric capacitance that can be achieved by the same. Carbon materials having enhanced packing properties are described herein and in co-pending U.S. patent application having Ser. No. 13/250,430.

The particle size distribution of the carbon materials can be an important factor in their electrochemical performance. In some embodiments, carbon materials prepared according to the disclosed methods can be or include a plurality of carbon particles having particle sizes of about 0.01 µm to about 50 µm. In other embodiments, the particle size distribution can include particle sizes of about 0.01 µm to about 20 µm. For example, in some embodiments the particle size distribution can include particle sizes of about 0.03 µm to about 17 µm or from about 0.04 µm to about 12 µm. In certain embodiments of the foregoing, at least 90%, at least 95% or at least 99% of the carbon particles can have particles sizes of about 0.01 µm to about 50 µm, about 0.01 µm to about 20 µm, about 0.03 µm to about 17 µm or about 0.04 µm to about 12 µm.

In some embodiments, the disclosed carbon material can have a tap density between about 0.1 cm$^3$/g and about 0.8 cm$^3$/g, for example between about 0.2 cm$^3$/g and about 0.6 cm$^3$/g. In some embodiments where the carbon material includes predominantly micropores, the tap density can be between about between 0.3 cm$^3$/g and 0.6 cm$^3$/g, or between 0.4 cm$^3$/g and 0.5 cm$^3$/g. In some embodiments where the carbon material includes mesopores and/or macropores, the tap density can be between about between 0.1 and 0.4 cm$^3$/g, or between 0.2 and 0.3 cm$^3$/g.

In another embodiment, the carbon material can have a total pore volume of at least 0.5 cm$^3$/g, at least 0.7 cm$^3$/g, at least 0.75 cm$^3$/g, at least 0.9 cm$^3$/g, at least 1.0 cm$^3$/g, at least 1.1 cm$^3$/g, at least 1.2 cm$^3$/g, at least 1.3 cm$^3$/g, at least 1.4 cm$^3$/g, at least 1.5 cm$^3$/g, at least 1.6 cm$^3$/g, at least 1.7 cm$^3$/g, at least 1.8 cm$^3$/g, at least 1.9 cm$^3$/g or at least 2.0 cm$^3$/g.

D. Characterization of Polymer Gels and Carbon Materials

The structural properties of the final carbon material and intermediate polymer gels may be measured using Nitrogen sorption at 77K, a method known to those of skill in the art. The final performance and characteristics of the finished carbon material is important, but the intermediate products (both dried polymer gel and pyrolyzed, but not activated, polymer gel), can also be evaluated, particularly from a quality control standpoint, as known to those of skill in the art. The Micromeretics ASAP 2020 is used to perform detailed micropore and mesopore analysis, which reveals a pore size distribution from 0.35 nm to 50 nm in some embodiments. The system produces a nitrogen isotherm starting at a pressure of 10$^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

The impurity content of the carbon materials can be determined by any number of analytical techniques known to those of skill in the art. One particular analytical method useful within the context of the present disclosure is proton induced x-ray emission (PIXE). This technique is capable of measuring the concentration of elements having atomic numbers ranging from 11 to 92 at low ppm levels. Accordingly, in one embodiment the concentration of impurities present in the carbon materials is determined by PIXE analysis.

E. Devices Comprising the Carbon Materials

One embodiment of the present invention is an electrode, or a device comprising the same, which comprises the disclosed carbon materials. Useful devices in this regard include, but are not limited to, the devices described below and in co-pending U.S. patent applications having Ser. Nos. 12/748,219; 12/897,969; 12/829,282; 13/046,572; 12/965,709; 13/336,975; and 61/585,611.

1. EDLCs

The disclosed carbon materials can be used as electrode material in any number of electrical energy storage and distribution devices. One such device can be an ultracapacitor. Ultracapacitors that include carbon materials are discussed and described in detail in co-owned U.S. Pat. No. 7,835,136.

EDLCs use electrodes immersed in an electrolyte solution as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow through the electrolyte between the electrodes in both directions thus forming double layers of charges at the interfaces between the electrodes and the electrolyte.

When electric potential is applied between a pair of electrodes of an EDLC, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the EDLCS through orientation and alignment of molecules of the electrolytic solution under influence of the electric field induced by the potential. This mode of energy storage, however, is secondary.

EDLCS comprising the disclosed carbon material can be employed in various electronic devices where high power is desired. Accordingly, in one embodiment an electrode comprising the carbon materials is provided. In another embodiment, the electrode comprises activated carbon material. In a further embodiment, an ultracapacitor comprising an electrode comprising the carbon materials is provided. In a further embodiment of the foregoing, the ultrapure synthetic carbon material comprises an optimized balance of micropores and mesopores and described above.

The disclosed carbon materials find utility in any number of electronic devices, for example wireless consumer and commercial devices such as digital still cameras, notebook PCs, medical devices, location tracking devices, automotive devices, compact flash devices, mobiles phones, PCMCIA cards, handheld devices, and digital music players. Ultracapacitors are also employed in heavy equipment such as: excavators and other earth moving equipment, forklifts, garbage trucks, cranes for ports and construction and transportation systems such as buses, automobiles and trains.

In one embodiment, the present disclosure is directed to a device comprising the carbon materials described herein, where the device is an electric double layer capacitor (EDLC) device comprising: a) a positive electrode and a negative electrode where each of the positive and the negative electrodes comprise the carbon material; b) an inert porous separator; and c) an electrolyte; where the positive electrode and the negative electrode are separated by the inert porous separator.

In one embodiment, an ultracapacitor device that includes the carbon material can have a gravimetric power of at least 5 W/g, at least 10 W/g, at least 15 W/g, at least 20 W/g, at least 25 W/g, at least 30 W/g, at least 35 W/g, at least 50 W/g. In another embodiment, an ultracapacitor device that includes the carbon material can have a volumetric power of at least 2 W/g, at least 4 W/cc, at least 5 W/cc, at least 10 W/cc, at least 15 W/cc or at least 20 W/cc. In another embodiment, an ultracapacitor device that includes the carbon material can have a gravimetric energy of at least 2.5 Wh/kg, at least 5.0 Wh/kg, at least 7.5 Wh/kg, at least 10 Wh/kg, at least 12.5 Wh/kg, at least 15.0 Wh/kg, at least 17.5. Wh/kg, at least 20.0 Wh/kg, at least 22.5 wh/kg or at least 25.0 Wh/kg. In another embodiment, an ultracapacitor device that includes the carbon material can have a volumetric energy of at least 1.5 Wh/liter, at least 3.0 Wh/liter, at least 5.0 Wh/liter, at least 7.5 Wh/liter, at least 10.0 Wh/liter, at least 12.5 Wh/liter, at least 15 Wh/liter, at least 17.5 Wh/liter or at least 20.0 Wh/liter.

In some embodiments of the foregoing, the gravimetric power, volumetric power, gravimetric energy and volumetric energy of an ultracapacitor device that includes the carbon material can be measured by constant current discharge from 2.7 V to 1.89 V employing a 1.0 M solution of tetraethylammonium-tetrafluoroborate in acetonitrile (1.0 M TEATFB in AN) electrolyte and a 0.5 second time constant.

In one embodiment, an ultracapacitor device that includes the carbon material can have a gravimetric power of at least 10 W/g, a volumetric power of at least 5 W/cc, a gravimetric capacitance of at least 100 F/g (@0.5 A/g) and a volumetric capacitance of at least 10 F/cc (@0.5 A/g). In one embodiment, the aforementioned ultracapacitor device can be a coin cell double layer ultracapacitor that includes the carbon material, a conductivity enhancer, a binder, an electrolyte solvent, and an electrolyte salt. In further embodiments, the aforementioned conductivity enhancer can be a carbon black and/or other conductivity enhancer known in the art. In further embodiments, the aforementioned binder can be Teflon and/or other binder known in the art. In further aforementioned embodiments, the electrolyte solvent can be acetonitrile or propylene carbonate, or other electrolyte solvent(s) known in the art. In further aforementioned embodiments, the electrolyte salt can be tetraethylaminotetrafluroborate or triethylmethyl aminotetrafluroborate or other electrolyte salt known in the art, or liquid electrolyte known in the art.

In one embodiment, an ultracapacitor device that includes the carbon material can have a gravimetric power of at least 15 W/g, a volumetric power of at least 10 W/cc, a gravimetric capacitance of at least 110 F/g (@0.5 A/g) and a volumetric capacitance of at least 15 F/cc (@0.5 A/g). In one embodiment, the aforementioned ultracapacitor device can be a coin cell double layer ultracapacitor that includes the carbon material, a conductivity enhancer, a binder, an electrolyte solvent, and an electrolyte salt. In further embodiments, the aforementioned conductivity enhancer can be a carbon black and/or other conductivity enhancer known in the art. In further embodiments, the aforementioned binder can be Teflon and or other binder known in the art. In further aforementioned embodiments, the electrolyte solvent can be acetonitrile or propylene carbonate, or other electrolyte solvent(s) known in the art. In further aforementioned embodiments, the electrolyte salt can be tetraethylaminotetrafluroborate or triethylmethyl aminotetrafluroborate or other electrolyte salt known in the art, or liquid electrolyte known in the art.

In one embodiment, an ultracapacitor device that includes the carbon material can have a gravimetric capacitance of at least 90 F/g, at least 95 F/g, at least 100 F/g, at least 105 F/g, at least 110 F/g, at least 115 F/g, at least 120 F/g, at least 125 F/g, or at least 130 F/g. In another embodiment, an ultracapacitor device that includes the carbon material can have a volumetric capacitance of at least 5 F/cc, at least 10 F/cc, at least 15 F/cc, at least 20 F/cc, at least 25 F/cc, or at least 30 F/cc. In some embodiments of the foregoing, the gravimetric capacitance and volumetric capacitance can be measured by constant current discharge from 2.7 V to 0.1 V with a 5-second time constant and employing a 1.8 M solution of tetraethylammonium-tetrafluoroborate in acetonitrile (1.8 M TEATFB in AN) electrolyte and a current density of 0.5 A/g, 1.0 A/g, 4.0 A/g or 8.0 A/g.

In one embodiment, the present disclosure provides ultracapacitors that can include a carbon material as disclosed herein, where the percent decrease in original capacitance (i.e., capacitance before being subjected to voltage hold) of the ultracapacitor that includes the carbon material after a voltage hold period is less than the percent decrease in original capacitance of an ultracapacitor comprising known carbon materials. In one embodiment, the percent of original capacitance remaining for an ultracapacitor comprising the carbon material after a voltage hold at 2.7 V for 24 hours at 65° C. can be at least 90%, at least 80%, at least 70%, at least 60%, at least 50%, at least 40%, at least 30% at least 20% or at least 10%. In further embodiments of the foregoing, the percent of original capacitance remaining after the voltage hold period can be measured at a current density of 0.5 A/g, 1 A/g, 4 A/g or 8 A/g.

In another embodiment, the present disclosure provides ultracapacitors that can include a carbon material as disclosed herein, where the percent decrease in original capacitance of the ultracapacitor comprising the carbon material after repeated voltage cycling is less than the percent decrease in original capacitance of an ultracapacitor comprising known carbon materials subjected to the same conditions. For example, in one embodiment, the percent of original capacitance remaining for an ultracapacitor that includes the carbon material can be more than the percent of original capacitance remaining for an ultracapacitor that includes known carbon materials after 1,000, 2,000, 4,000, 6,000, 8,000, or 10,000 voltage cycling events comprising cycling between 2 V and 1V at a current density of 4 A/g. In another embodiment, the percent of original capacitance remaining for an ultracapacitor that includes the carbon material after 1,000, 2,000, 4,000, 6,000, 8,000, or 10,000 voltage cycling events comprising cycling between 2 V and 1V at a current density of 4 A/g, is at least 90%, at least 80%, at least 70%, at least 60%, at least 50%, at least 40%, at least 30% at least 20% or at least 10%.

As noted above, the carbon material can be incorporated into ultracapacitor devices. In some embodiments, the carbon material can be milled to an average particle size of about 10 microns using a jet mill according to the art. While not wishing to be bound by theory, it is believed that this fine particle size enhances particle-to-particle conductivity, as well as enabling the production of very thin sheet electrodes. The jet mill essentially grinds the carbon material against itself by spinning the carbon material inside a disc shaped chamber propelled by high-pressure nitrogen. As the larger particles are fed in, the centrifugal force pushes them to the outside of the chamber; as they grind against each other, the particles migrate towards the center where they eventually exit the grinding chamber once they have reached the appropriate dimensions.

In further embodiments, after jet milling, the carbon material can be blended with a fibrous Teflon binder (3% by weight) to hold the particles together in a sheet. The carbon Teflon mixture can be kneaded until a uniform consistency is reached. Then the mixture can be rolled into sheets using a high-pressure roller-former that results in a final thickness of 50 microns. These electrodes can be punched into discs and heated to 195° C. under a dry argon atmosphere to remove water and/or other airborne contaminants. The electrodes can be weighed and their dimensions measured using calipers.

The carbon electrodes of the EDLCs can be wetted with an appropriate electrolyte solution. Examples of solvents for use in electrolyte solutions for use in the devices of the present application can include, but are not limited to, propylene carbonate, ethylene carbonate, butylene carbonate, dimethyl carbonate, methyl ethyl carbonate, diethyl carbonate, sulfolane, methylsulfolane, acetonitrile, or any mixture thereof. Such solvents are generally mixed with solute, including, tetralkylammonium salts such as TEATFB (tetraethylammonium tetrafluoroborate); TEMATFB (triethyl,methylammonium tetrafluoroborate); EMITFB (1-ethyl-3-methylimidazolium tetrafluoroborate), tetramethylammonium or triethylammonium based salts. Further the electrolyte can be a water based acid or base electrolyte such as mild sulfuric acid or potassium hydroxide.

In some embodiments, the electrodes can be wetted with a 1.0 M solution of tetraethylammonium-tetrafluroroborate in acetonitrile (1.0 M TEATFB in AN) electrolyte. In other embodiments, the electrodes can be wetted with a 1.0 M solution of tetraethylammonium-tetrafluroroborate in propylene carbonate (1.0 M TEATFB in PC) electrolyte. These are common electrolytes used in both research and industry and are considered standards for assessing device performance. In other embodiments, the symmetric carbon-carbon (C—C) capacitors are assembled under an inert atmosphere, for example, in an Argon glove box, and a NKK porous membrane 30 micron thick serves as the separator. Once assembled, the samples may be soaked in the electrolyte for about 20 minutes or more depending on the porosity of the sample.

In some embodiments, the capacitance and power output can be measured using cyclic voltametry (CV), chronopotentiometry (CP) and impedance spectroscopy at various voltages (ranging from 1.0-2.5 V maximum voltage) and current levels (from 1-10 mA) on a Biologic VMP3 electrochemical workstation. In this embodiment, the capacitance can be calculated from the discharge curve of the potentiogram using the formula:

$$C = \frac{I \times \Delta t}{\Delta V} \quad \text{Equation 1}$$

where I is the current (A) and $\Delta V$ is the voltage drop, $\Delta t$ is the time difference. Because in this embodiment the test capacitor is a symmetric carbon-carbon (C—C) electrode, the specific capacitance is determined from:

$$C_s = 2C/m_e \quad \text{Equation 2}$$

where $m_e$ is the mass of a single electrode. The specific energy and power may be determined using:

$$E_s = \frac{1}{4}\frac{CV_{max}^2}{m_e} \quad \text{Equation 3}$$

$$P_s = E_s/4ESR \quad \text{Equation 4}$$

where C is the measured capacitance $V_{max}$ is the maximum test voltage and ESR is the equivalent series resistance obtained from the voltage drop at the beginning of the discharge. ESR can alternately be derived from impedance spectroscopy.

2. Batteries

The disclosed carbon materials also find utility as electrodes in any number of types of batteries. For example, one embodiment is directed to an electrical energy storage device that includes: a) at least one anode comprising a carbon material; b) at least cathode comprising a metal oxide; and c) an electrolyte comprising lithium ions; where the carbon material is any of the carbon materials described herein.

Another embodiment is directed to a metal air battery, for example lithium air batteries. Lithium air batteries generally include an electrolyte interposed between positive electrode and negative electrodes. The positive electrode generally comprises a lithium compound such as lithium oxide or lithium peroxide and serves to oxidize or reduce oxygen. The negative electrode generally comprises a carbonaceous substance which absorbs and releases lithium ions. As with supercapacitors, batteries such as lithium air batteries which comprise the disclosed carbon materials are expected to be superior to batteries comprising known carbon materials. Accordingly, in one embodiment the present invention provides a metal air battery, for example a lithium air battery, comprising a carbon material as disclosed herein.

Any number of other batteries, for example, zinc-carbon batteries, lithium/carbon batteries, lead acid batteries and the like are also expected to perform better with the carbon materials described herein. One skilled in the art will recognize other specific types of carbon containing batteries which will benefit from the disclosed carbon materials. Accordingly, in another embodiment the present invention provides a battery, in particular a zinc/carbon, a lithium/carbon batteries or a lead acid battery comprising a carbon material as disclosed herein.

EXAMPLES

The carbon materials disclosed in the following Examples were prepared according to the methods disclosed herein. Chemicals were obtained from commercial sources at reagent grade purity or better and were used as received from the supplier without further purification.

In some examples, the polymer phase may be prepared by admixing polymer precursors and the optional solvent and/or optional catalyst to form a prepolymer composition. The polymer phase is then added to continuous phase with optional addition of surfactants. In some embodiments, the polymer phase may be reacted to a certain degree of polymerization (prepolymer) and then mixing with the continuous phase, with optional surfactant addition. The polymerization of the prepolymer can be carried out to an endpoint based on the refractive index of the liquid prepolymer. For example, the prepolymer can be polymerized until the prepolymer has a refractive index ranging from a low of about 1.1000, about 1.2000, about 1.3000, or about 1.3200 to a high of about 1.4500, about 1.4800, about 1.5000, or about 1.5500. In another example, the polymerization of the monomer mixture to produce the prepolymer can be carried out to a refractive index of about 1.3500 to about 1.4500, about 1.3800 to about 1.4400, about 1.3900 to about 1.4350, of about 1.3900 to about 1.4500. The monomer component can be pre-polymerized at a temperature of about 20° C., about 30° C., about 40° C., about 50° C., about 60° C., or about 70° C. prior to forming the suspension or emulsion. The prepolymer can be added to the carrier fluid, the carrier fluid can be added to the prepolymer, or the prepolymer and the carrier fluid can be simultaneously combined with one another.

The prepolymer solution can be combined with an external phase. The temperature of the external phase can be varied from 60° C. to 200° C. The external phase temperature can be about 60° C., 70° C., 80° C., 90° C., 95° C., 100° C. In some embodiments the temperature of the external phase can be above the boiling point at atmospheric pressure. The curing time that the prepolymer phase is in contact with the hot external phase can be varied. The curing time can be varied from 30 seconds to 100 hours. The curing time can be 1 minute, 5 minutes, 30 minutes, 1 hour. In other embodiments the curing time can be 1 hour, 2 hours, 3 hours, 6 hours, and 12 hours.

In some examples, the polymer gel particles were freeze dried prior to pyrolysis and/or activation. In these examples, the lyophilizer shelf was generally pre-cooled to −30° C. before loading a tray containing the frozen polymer hydrogel particles on the lyophilizer shelf. The chamber pressure for lyophilization was typically in the range of 50 to 1,000 mTorr and the shelf temperature was in the range of +10° C. to +25° C. Alternatively, the shelf temperature can be set lower, for example in the range of 0° C. to +10° C. Alternatively, the shelf temperature can be set higher, for example in the range of 25° C. to +100° C. Chamber pressure can be held in the range of 50 to 3,000 mTorr. For instance, the chamber pressure can be controlled in the range of 150 to 300 mTorr.

Unless noted otherwise, the polymer was pyrolyzed by heating in a nitrogen atmosphere at temperatures ranging from 700° C. to 1,200° C. for a period of time as specified in the examples, for example 850° C. with a nitrogen gas flow of 200 L/h. Activation conditions generally comprised heating a pyrolyzed polymer hydrogel in a $CO_2$ atmosphere at temperatures ranging from 800° C. to 1,000° C. for a period of time as specified in the examples, for example 900° C. under a $CO_2$ atmosphere for 660 min. Specific pyrolysis and activation conditions were as described in the following examples.

TGA studies were performed using a Mettler Toledo TGA/DSC1 707 N2/CO2 MX5 system. Pyrolysis and activation was performed using a Thermo Scientific, Economy Solid Tube furnace. Surface area and pore volume measurements were obtained using a Micromeritics Tristar II BET system.

Unless stated otherwise, percent values throughout the examples and specification are on a weight (w/w) basis.

Example 1—Emulsion Preparation of Dried Polymer Gel

For each sample, two separate solutions were prepared. Five different gel solutions were made by admixing a resorcinol and formaldehyde (molar ratio of resorcinol:formaldehyde=0.5:1) solution with a water/acetic acid solvent (75:25) and adding an ammonium acetate catalyst. The ratios of the various gel reagents are indicated in Table 1 for the five samples.

A cyclohexane/SPAN 80 solution was also prepared. The gel solution was allowed to mix for 10 minutes before it was poured into the cyclohexane/SPAN80 solution and the temperature was set to 45° C. After 4 hours at 45° C., the temperature was increased to 65° C. to 70° C. and held for 24 hours before the excess cyclohexane was decanted and the resin was placed in a 45° C. oven for 10-20 minutes to dry. Sample conditions are summarized in Table 1.

TABLE 1

Polymerization Conditions

| Sample | Gel Formulation (Solids/Acid/R:C)* | RF Solution (mL) | Cyclohexane (mL) | SPAN80 (mL) | % SPAN80 | % Gel** |
|---|---|---|---|---|---|---|
| 1-1 | 41/20/25 | 10 | 100 | 0.5 | 0.5% | 10% |
| 1-2 | 33/20/10 | 10 | 100 | 0.5 | 0.5% | 10% |
| 1-3 | 33/20/25 | 20 | 150 | 1.0 | 0.7% | 13% |
| 1-4 | 41/20/10 | 50 | 400 | 20.0 | 5.0% | 13% |
| 1-5 | 33/20/25 | 30 | 150 | 2.0 | 1.3% | 20% |

*(Solids/Acid/R:C) refers to the solids content in percent (e.g., mass resorcinol and formaldehyde to total mass), percent acid of total liquid (e.g., acid plus water) and R:C is mass ratio of resorcinol to catalyst, respectively.
**% Gel = Percent loading of RF (i.e., resorcinol/formaldehyde) solution in total emulsions/suspension polymerization solution (e.g., RF solution and continuous phase)

Example 2—Dried Polymer Gel Data

Nitrogen isotherm, surface area and pore volume data for the dried gel samples from Example 1 are presented in FIG. 1 and in Table 2. For comparative purposes, two carbon samples were prepare as controls via the general "monolith" approach described in Example 15. Comparative Sample 1 was prepared from a gel formulation that produces a microporous polymer gel and Comparative Sample 2 was prepared from a gel formulation that produces a mesoporous polymer gel. All samples showed a lower surface area and pore volume compared to the comparative samples. While not wishing to be bound by theory, it is thought that this decrease is likely due to surfactant and/or residual non-aqueous solvent in the pores and on the surface of the gel material, and was expected to be burned off during pyrolysis. This theory was supported by the ability to activate the pyrolyzed material to a target surface area, while achieving pore volume and P95/P5 (i.e., ratio of nitrogen sorbed at 95% partial pressure to that sorbed at 5% partial pressure) commensurate with microporous carbon. Therefore certain properties of the dried gel may not be predictive of the properties of the final carbon materials.

TABLE 2

Properties of Dried Polymer Gel Samples

| Sample | SSA ($m^2/g$) | PV ($cm^3/g$) | P95/P5 | Max Pore Width (Å) |
|---|---|---|---|---|
| 1-1 | 481 | 0.299 | 1.77 | 63 |
| 1-2 | 583 | 0.419 | 2.15 | 172 |

TABLE 2-continued

Properties of Dried Polymer Gel Samples

| Sample | SSA (m²/g) | PV (cm³/g) | P95/P5 | Max Pore Width (Å) |
|---|---|---|---|---|
| 1-3 | 75 | 0.059 | 2.40 | 100 |
| 1-4 | 72 | 0.101 | 5.29 | 86 |
| 1-5 | 325 | 0.297 | 2.75 | 108 |
| Comparative Sample 1 | 545 | 0.327 | 1.80 | 59 |
| Comparative Sample 2 | 625-725 | 0.98-1.20 | 4.4-5.5 | 250 |

Example 3—Activated Carbon Data

Figure 2:
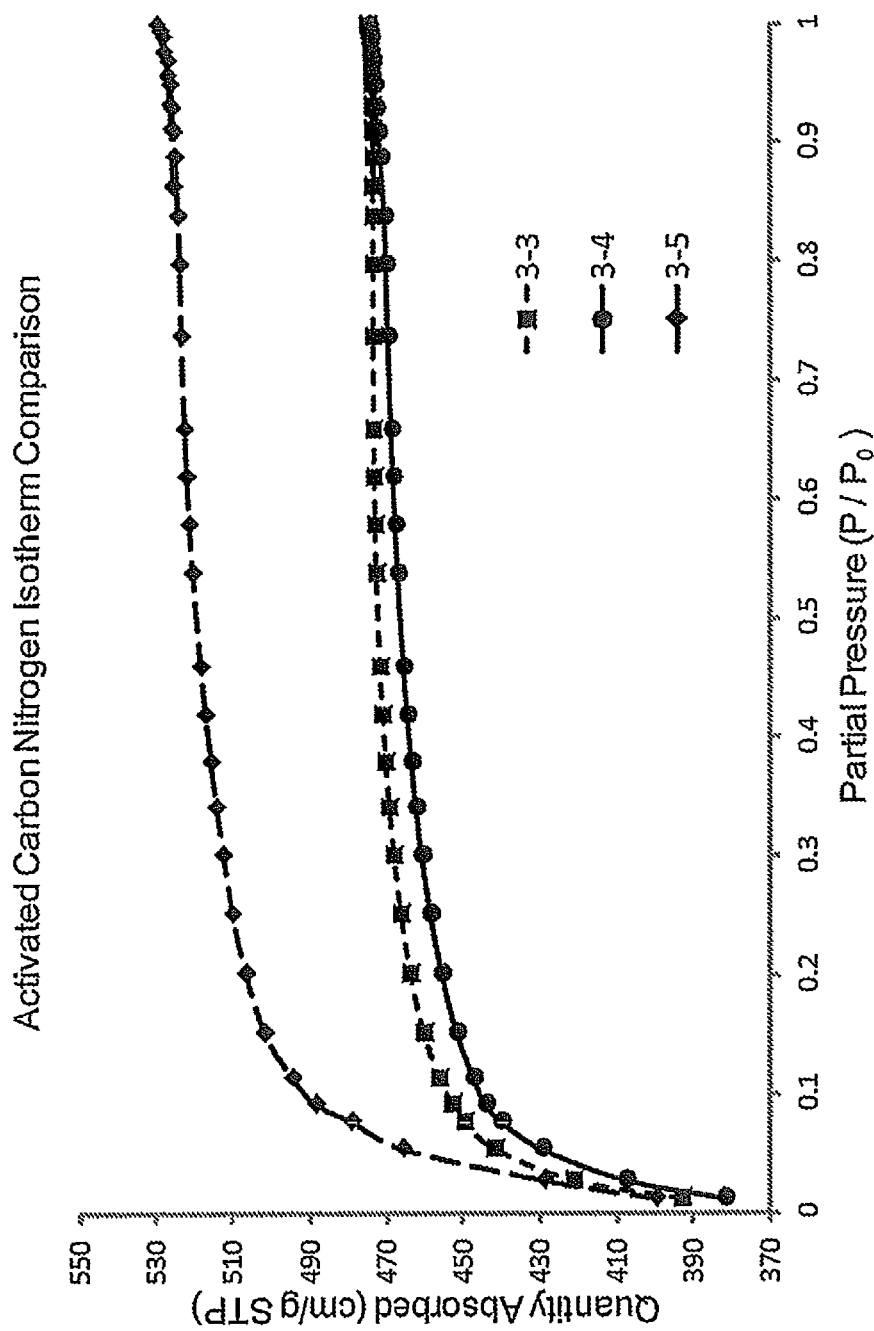
FIG. 2 presents $N_2$ absorption isotherms for activated carbon samples.

Nitrogen isotherm, surface area, pore volume, and electrochemical testing (ECT) data for activated carbon samples (3-3, 3-4, 3-5) are presented in FIG. 2 and in Tables 3 & 4. Samples 3-3 through 3-5 were pyrolyzed at high temperatures under an inert atmosphere while sample 4 was pyrolyzed without any drying step prior to pyrolysis. All three samples were activated at high temperature in a tube furnace ($CO_2$ atmosphere) to achieve a surface area of 1,700-1,900 m²/g. The isotherm data (FIG. 2) shows that all three samples exhibited a very microporous pore structure and had a surface area to pore volume development comparable or superior to a control carbon material prepared via monolith techniques. For example, the P95/P5 (ratio of nitrogen sorbed at 0.95 partial pressure relative to 0.05 partial pressure) was 1.08 to 1.14 for the carbon samples derived from polymer gel prepared by an emulsion process relative to 1.20 for carbon derived from monolithic polymer gel. The lower P95/P5 is reflective of increased microporosity, which in turn is beneficial for improving volumetric capacitance in the activated carbon.

All samples also demonstrate a normalized electrochemical performance the same or better than the comparative carbon prepared via monolith techniques (Comparative Sample 3 with a normalized volumetric capacitance of 24 F/cc). Although the gel formulations employed (3-3, 3-5) were expected to produce mesoporous carbons based on known monolith preparations, all carbon samples surprisingly showed no mesoporosity in the dried gel or activated carbon.

TABLE 3

Activated Carbon Surface Area and Pore Volume

| Sample | Gel (Solid/Acid/RC) | SSA (m²/g) | PV (cm³/g) | P95/P5 |
|---|---|---|---|---|
| Comparative Sample 3 | — | 1,847 | 0.809 | 1.20 |
| 3-3 | 33/20/10 | 1,760 | 0.734 | 1.08 |
| 3-4 | 41/20/10 | 1,731 | 0.733 | 1.10 |
| 3-5 | 33/20/25 | 1,928 | 0.818 | 1.14 |

TABLE 4

Activated Carbon Electrochemical Testing Performance

| Sample | Gel (Solid/Acid/RC) | Electrode Wt | F/cc | F/g | Normalized F/cc | −45* (Hz) | Normalized F/cc |
|---|---|---|---|---|---|---|---|
| 3-3 | 33/20/10 | 22.09 | 22.0 | 120.0 | 24.0 | 0.09 | 24.0 |
| 3-4 | 41/20/10 | 15.69 | 23.5 | 120.0 | 25.6 | 0.14 | 25.6 |
| 3-5 | 33/20/25 | 16.17 | 23.8 | 118.2 | 23.5 | 0.16 | 23.5 |

*Frequency response = Frequency as calculated from the Bode plot at a 45° phase angle

Example 4—Preparation of Dried Polymer Gel

To explore the ability of the present method for preparing carbon materials having different pore structure (e.g., mesoporosity), five polymerizations were carried out using the general procedures described in Example 1, except the formulations were as set forth in Table 5. As a control, the gel formulation for each for each polymerization was also allowed to polymerize under monolith conditions (i.e., as described in Example 15). The control sample for each gel formulation is designated with a "C" in Table 6.

TABLE 5

Polymerization Conditions

| Sample | Gel Formulation | Gel Solution (mL) | Cyclohexane (mL) | SPAN80 (mL) | % SPAN80 | % RF Gel |
|---|---|---|---|---|---|---|
| 5-1 | 33/20/100 | 40 | 200 | 20 | 10% | 20% |
| 5-2 | 33/10/100 | 40 | 200 | 20 | 10% | 20% |
| 5-3 | 33/20/400 | 40 | 200 | 20 | 10% | 20% |
| 5-4 | 33/10/400 | 40 | 200 | 20 | 10% | 20% |
| 5-5 | 33/10/50 | 40 | 200 | 2 | 1% | 20% |

Example 5—Dried Polymer Gel Data

Figure 3:
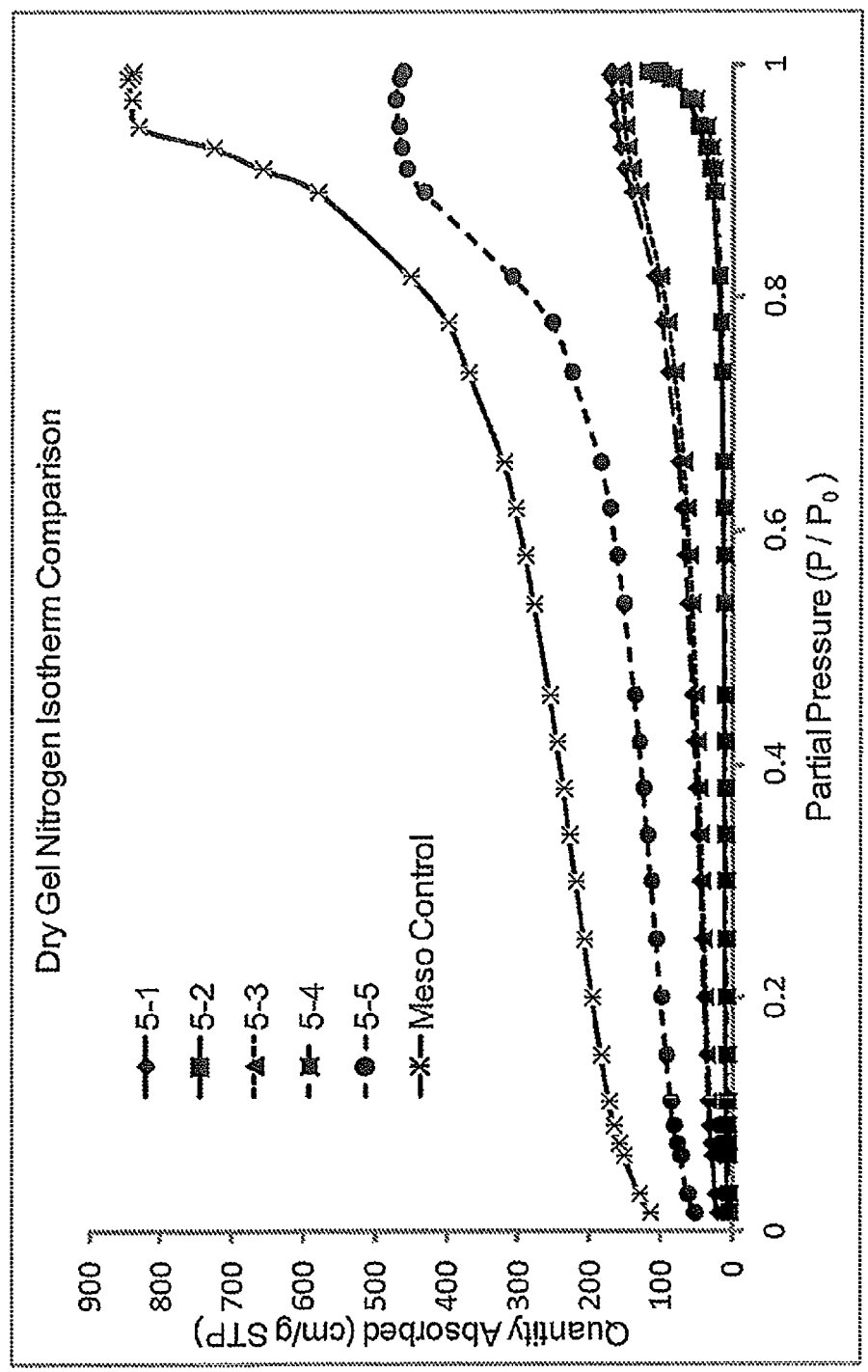
FIG. 3 is a graph showing $N_2$ absorption isotherms for freeze dried gels.

Nitrogen isotherm, surface area and pore volume data for dried gel samples prepared according to Example 4 are presented in FIG. 3 and in Table 6. All polymer gels were freeze dried prior to analysis. All samples showed a collapsed pore structure and lower SSA compared to a monolith prepared control of a mesoporous carbon (designated "MesoControl" herein) and compared to the individual control (monolith) gels. As discussed above, the low SSA and PV may be an artifact created by surfactant clogging the pores, which may or may not be linked to surfactant loading. Samples 1 and 3 both used 20% acid content and show a small pore volume contribution from the mesopore range. Samples 2 and 4 used 10% acid content and both show most of their pore volume being attributed to macropores.

Figure 4:
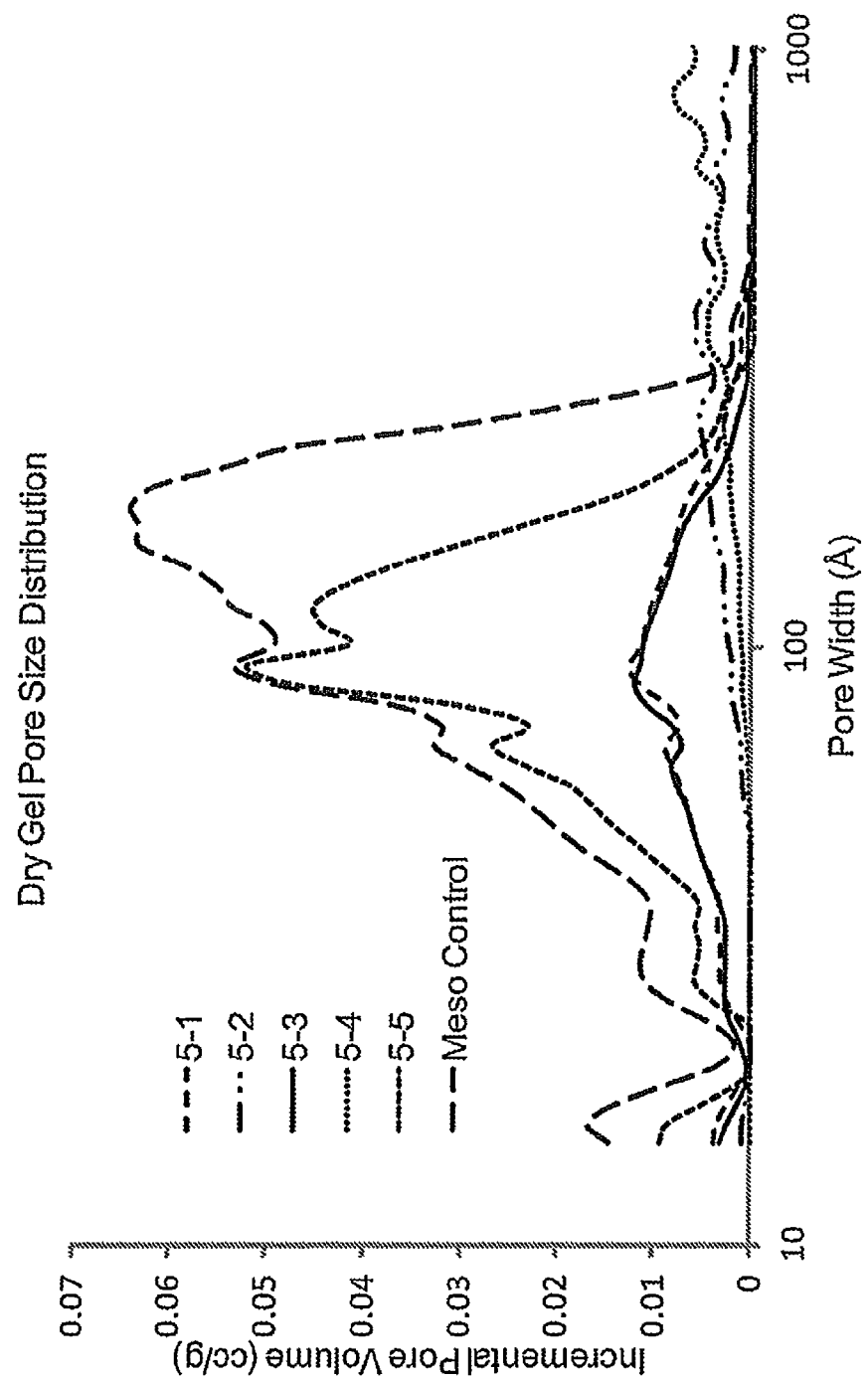
FIG. 4 demonstrates Pore size distributions for dry gels.

Taking into account the contraction of the mesopores in samples 1-4, it was decided to use less surfactant for sample 5. Low acid (10%) with low R:C (50:1) was used to achieve mesoporosity with no macro-porosity. Sample 5 shows (FIG. 4) a much greater contribution of volume from mesopores and maps closely to the MesoControl control dried gel. The surface area (Table 6) is still lower than the control, but based on activation data (see below) this may be due more to surfactant rather than the dried gel material.

TABLE 6

Dried Gel Surface Area and Pore Volume

| Sample | Gel (Solid/Acid/R:C) | SSA (m²/g) | PV (cm³/g) | P95/P5 |
|---|---|---|---|---|
| 5-1 | 33/20/100 | 143 | 0.278 | 5.77 |
| 5-1C | 33/20/100 | 633 | 0.882 | 4.22 |
| 5-2 | 33/10/100 | 33 | 0.153 | 7.80 |
| 5-2C | 33/10/100 | 396 | 1.203 | 4.95 |
| 5-3 | 33/20/400 | 137 | 0.249 | 5.58 |
| 5-3C | 33/20/400 | 632 | 1.198 | 5.44 |
| 5-4 | 33/10/400 | 25 | 0.176 | 8.83 |
| 5-4C | 33/10/400 | 469 | 1.169 | 3.31 |
| 5-5 | 33/10/50 | 358 | 0.755 | 6.70 |
| 5-5C | 33/10/50 | 687 | 1.919 | 7.06 |
| MesoControl | — | 625-725 | 0.98-1.20 | 4.4-5.5 |

Example 6—Activated Carbon Data

Figure 5:
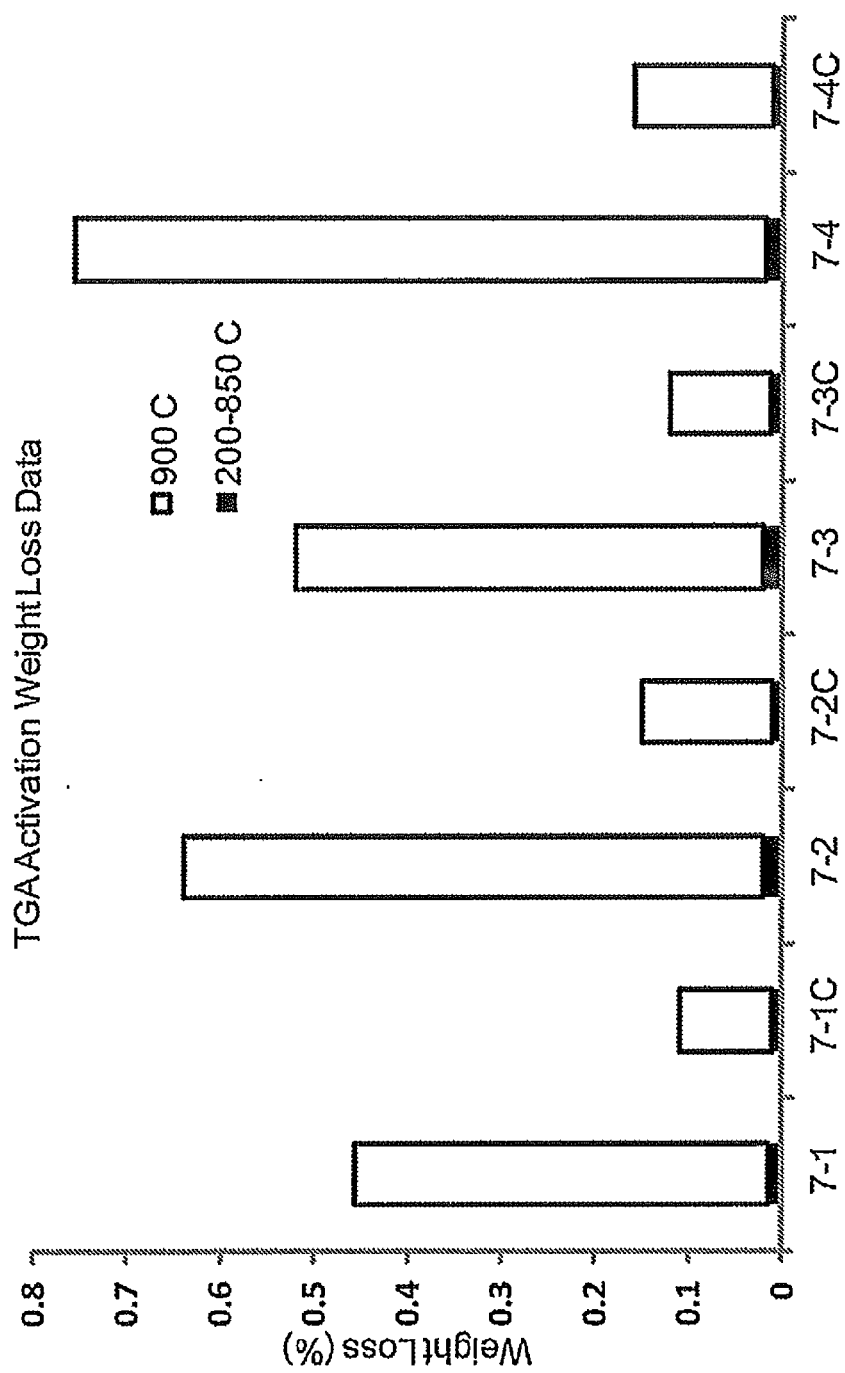
FIG. 5 is a bar graph showing weight loss upon activation.

The gels dried gels from Example 5 were pyrolyzed and activated (samples 7-1 to 7-5). Weight loss upon activation, nitrogen isotherm, surface area, pore volume, and electrochemical testing data for these activated carbon samples are presented in FIGS. 5 & 6 and in Table 7. All samples and their controls were pyrolyzed at high temperatures under inert atmosphere. All Pyrolyzed Carbon (PC) samples were put on for TGA analysis of activation rates at 900° C. Each emulsion PC sample was activated at high temperature in the tube furnace.

Figure 6:
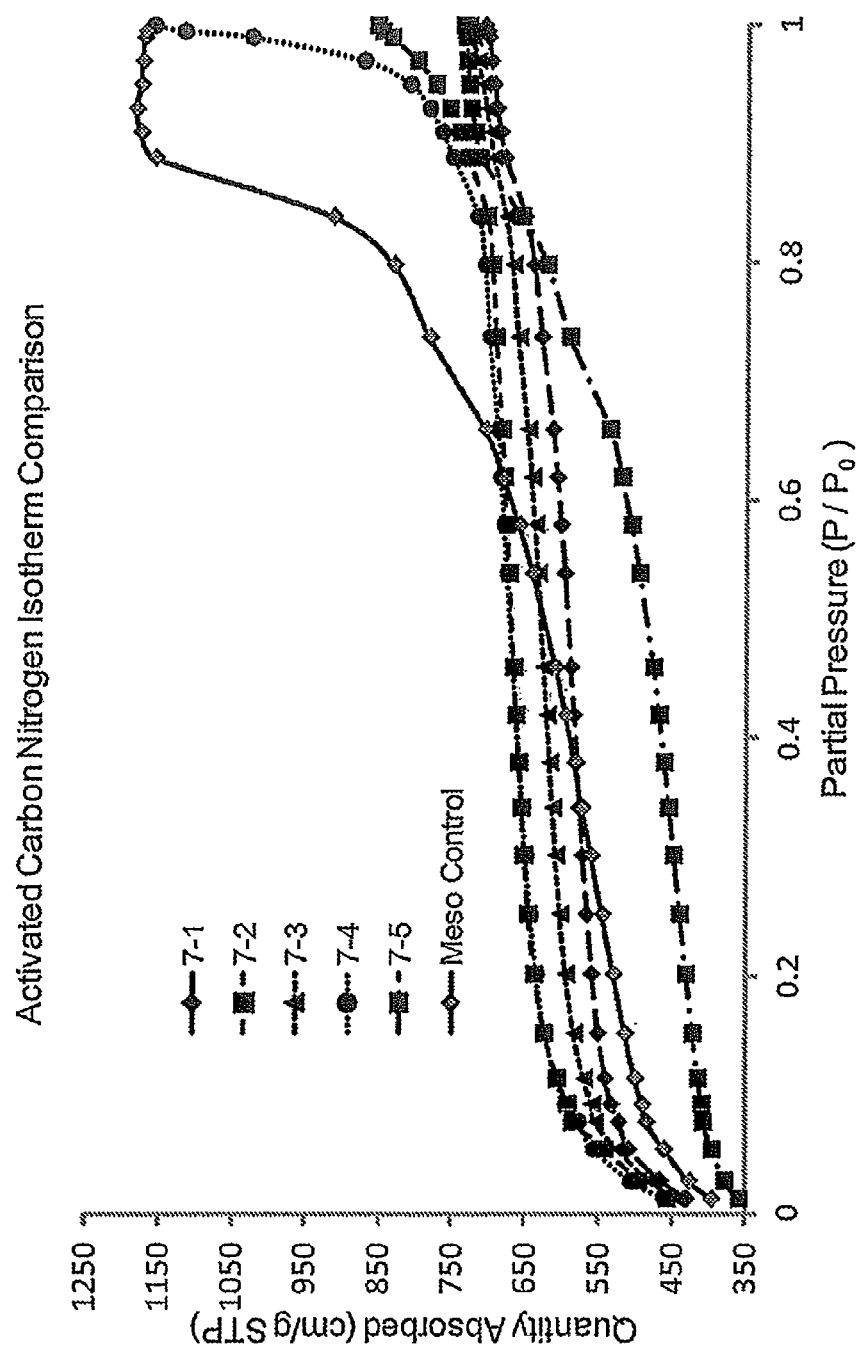
FIG. 6 shows $N_2$ absorption isotherms for activated carbon samples.

TGA data (FIG. 5) shows a significant increase in activation rate for the emulsion samples compared to their control samples. This may be due more to particle size being very small and not solely due to the amount of porosity. Samples 2 and 4 show an increased activation rate compared to samples 1 and 3, as indicated by higher N2 adsorption from the same activation conditions, and are more macroporous. Samples 1 and 3 used a higher acid content and contain more mesopore volume, than other protocols and were more collapsed compared to the MesoControl (FIG. 6). Although samples 1-4 were over-activated, their pore development is not similar to MesoControl carbon. Samples 1 and 3, that used 20% acid, give a more mesoporous carbon development than the samples that used 10% Acid.

Figure 7:
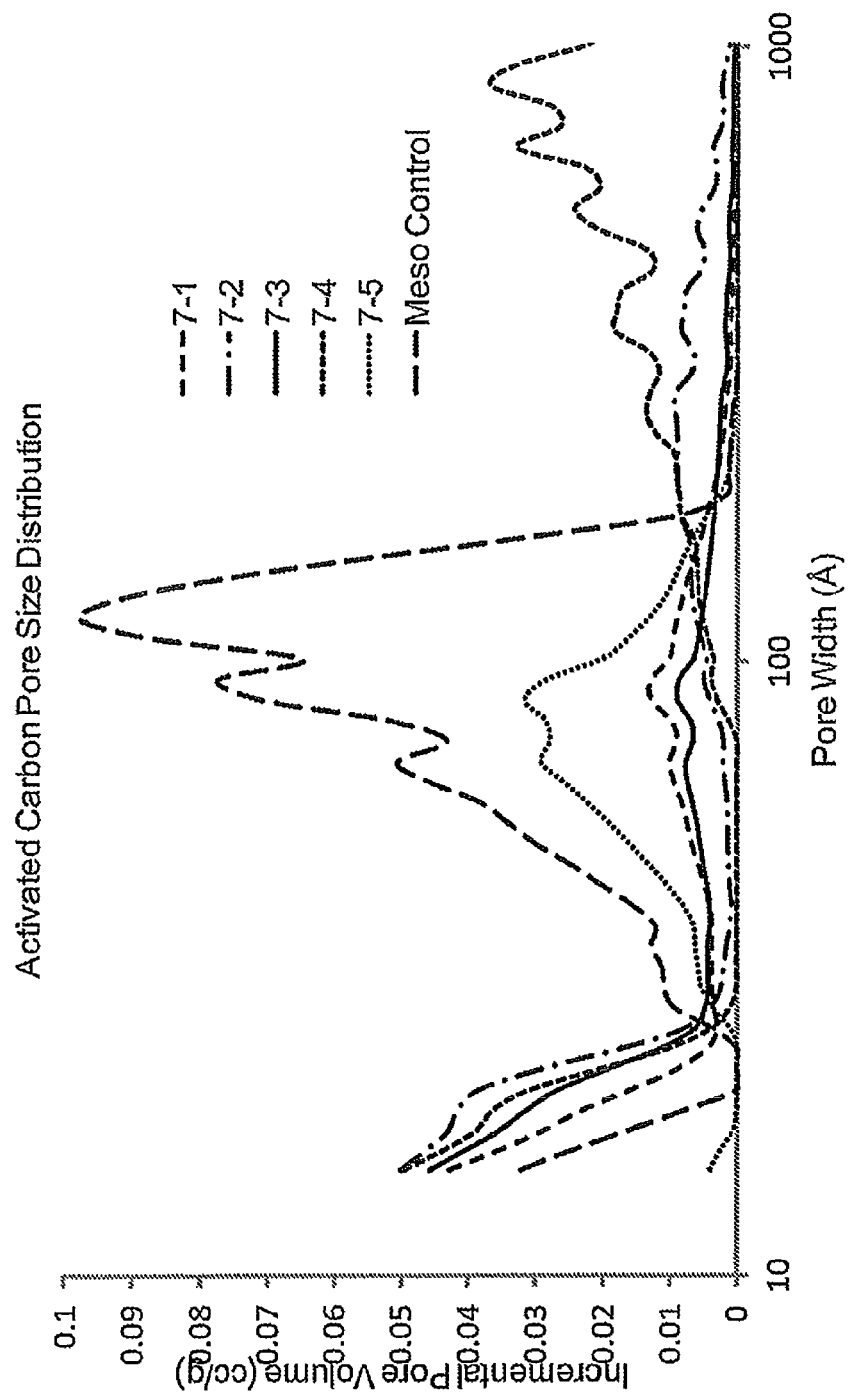
FIG. 7 illustrates pore size distribution DFT for activated carbons.

Sample 5 used less surfactant with the intention of creating more mesoporosity and the data for sample 5 shows successful creation of mesoporosity (see FIG. 7). This carbon material shows less of a pore contribution from 100 Å to 200 Å than the MesoControl control, but this may not be an issue for electrochemical performance. Thus the described method is suitable for preparation of a mesoporous carbon material.

TABLE 7

Activated Carbon Surface Area and Pore Volume

| Sample | Gel (Solid/Acid/R:C) | SSA (m²/g) | PV (cm³/g) | P95/P5 |
|---|---|---|---|---|
| 7-1 | 33/20/100 | 2,122 | 1.090 | 1.37 |
| 7-2 | 33/10/100 | 2,423 | 1.312 | 1.42 |
| 7-3 | 33/20/400 | 2,258 | 1.125 | 1.36 |
| 7-4 | 33/10/400 | 2,411 | 1.777 | 1.48 |
| 7-5 | 33/10/50 | 1,704 | 1.217 | 1.88 |
| MesoControl | 33/20/25 | 1,800 | 1.420 | 2.04 |

Example 7—Preparation of Dried Polymer Gel

Ten emulsion polymerizations were performed according to the general procedures of Example 1 to explore parameters for preparation of a microporous carbon material. Control samples (designated with "C" in Table 9) were also prepared using the same gel formulations and allowing the gel to polymerize in a monolith fashion. Polymerization conditions are set forth in Table 8.

TABLE 8

Polymerization Conditions

| Sample | % Solids | % Acid | R:C | SPAN 80% | % RF Gel |
|---|---|---|---|---|---|
| 8-1 | 50 | 10 | 10 | 1 | 20 |
| 8-2 | 41 | 10 | 25 | 1 | 20 |
| 8-3 | 41 | 20 | 10 | 30 | 20 |
| 8-4 | 41 | 20 | 25 | 1 | 40 |
| 8-5 | 41 | 20 | 10 | 10 | 20 |
| 8-6 | 41 | 10 | 10 | 10 | 30 |
| 8-7 | 46 | 15 | 15 | 5 | 25 |
| 8-8 | 50 | 10 | 25 | 10 | 30 |
| 8-9 | 50 | 20 | 25 | 10 | 20 |
| 8-10 | 50 | 20 | 10 | 1 | 30 |

Example 8—Dried Polymer Gel Data

Figure 8:
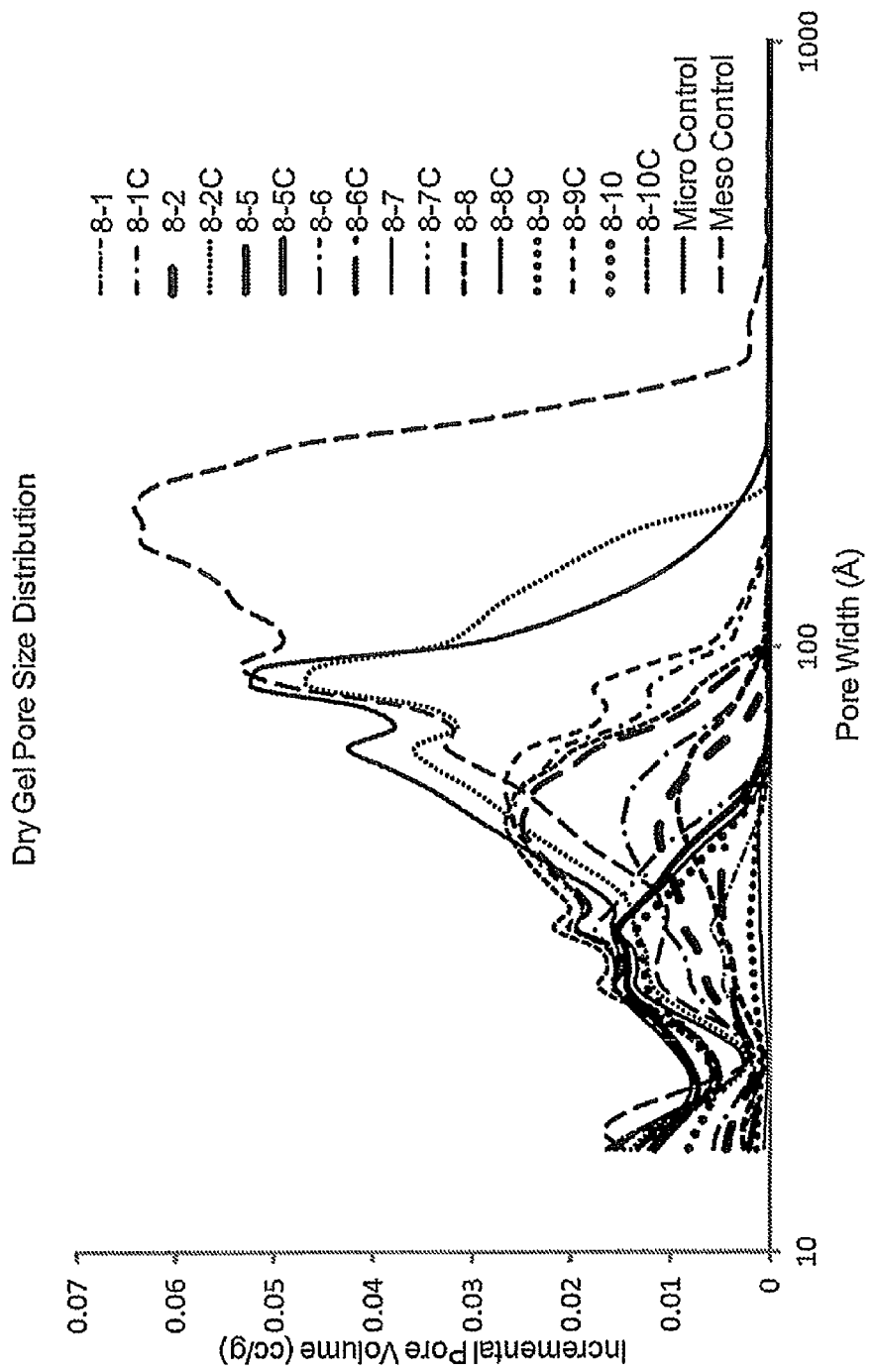
FIG. 8 is a graph of pore volume distributions for RD-538 freeze dried gels.

Nitrogen isotherm, surface area and pore volume data for dried gel samples of Example 7 are presented in FIG. 8 and in Table 8. Samples 3 and 4 did not make processable wet gel so no data was collected for those samples. All other samples were freeze-dried. DFT pore size distributions (FIG. 8) show a contraction in pore structure in emulsion samples vs. their oven-cured control as noted with the other examples. Following from this, the emulsion samples show a lower specific surface area and pore volume (Table 9) as compared to their corresponding monolith control samples.

TABLE 9

Dried Gel Surface Area and Pore Volume

| Sample | Gel (Solid/Acid/R:C/Surfactant/RF) | SSA (m²/g) | PV (cm³/g) | P95/P5 |
|---|---|---|---|---|
| 8-1 | 50/10/10/1/20 | 108 | 0.086 | 2.36 |
| 8-1C | | 615 | 0.543 | 2.70 |
| 8-2 | 41/10/25/1/20 | 185 | 0.195 | 3.08 |
| 8-2C | | 618 | 0.785 | 3.80 |
| 8-5 | 41/20/10/10/20 | 94 | 0.094 | 2.84 |
| 8-5C | | 509 | 0.315 | 1.86 |
| 8-6 | 41/10/10/10/30 | 233 | 0.264 | 3.26 |
| 8-6C | | 555 | 0.479 | 2.62 |
| 8-7 | 46/15/15/5/25 | 23 | 0.026 | 3.19 |
| 8-7C | | 580 | 0.363 | 1.86 |
| 8-8 | 50/10/25/10/30 | 110 | 0.151 | 4.01 |
| 8-8C | | 679 | 0.814 | 3.65 |
| 8-9 | 50/20/25/10/20 | 54 | 0.039 | 2.20 |
| 8-9C | | 660 | 0.587 | 2.69 |
| 8-10 | 50/20/10/1/30 | 355 | 0.234 | 2.03 |
| 8-10C | | 646 | 0.542 | 2.56 |

Example 9—Activated Carbon Data and Electrochemical Testing

Figure 9:
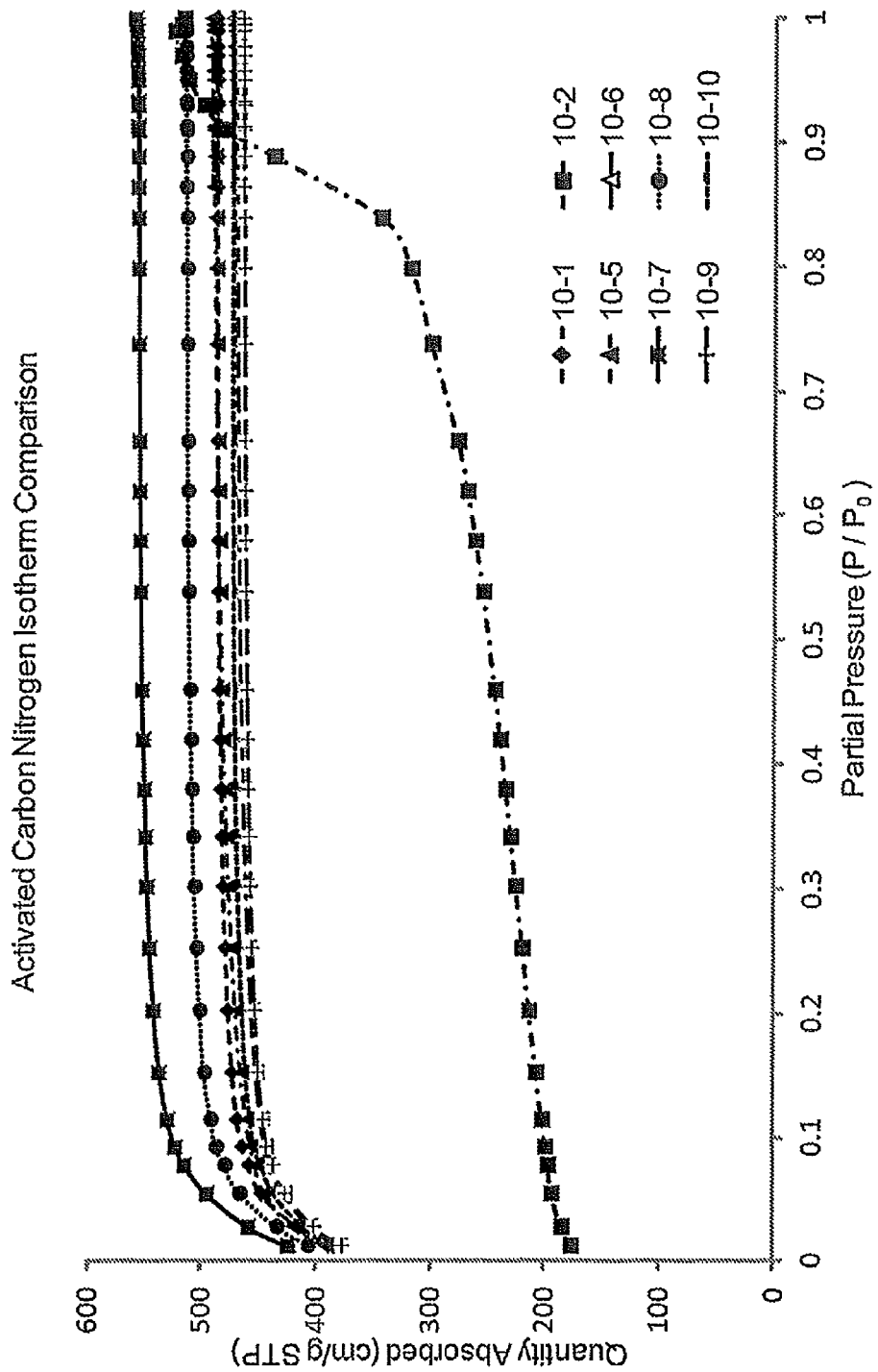
FIG. 9 presents $N_2$ absorption isotherms for activated carbon samples.
Figure 10:
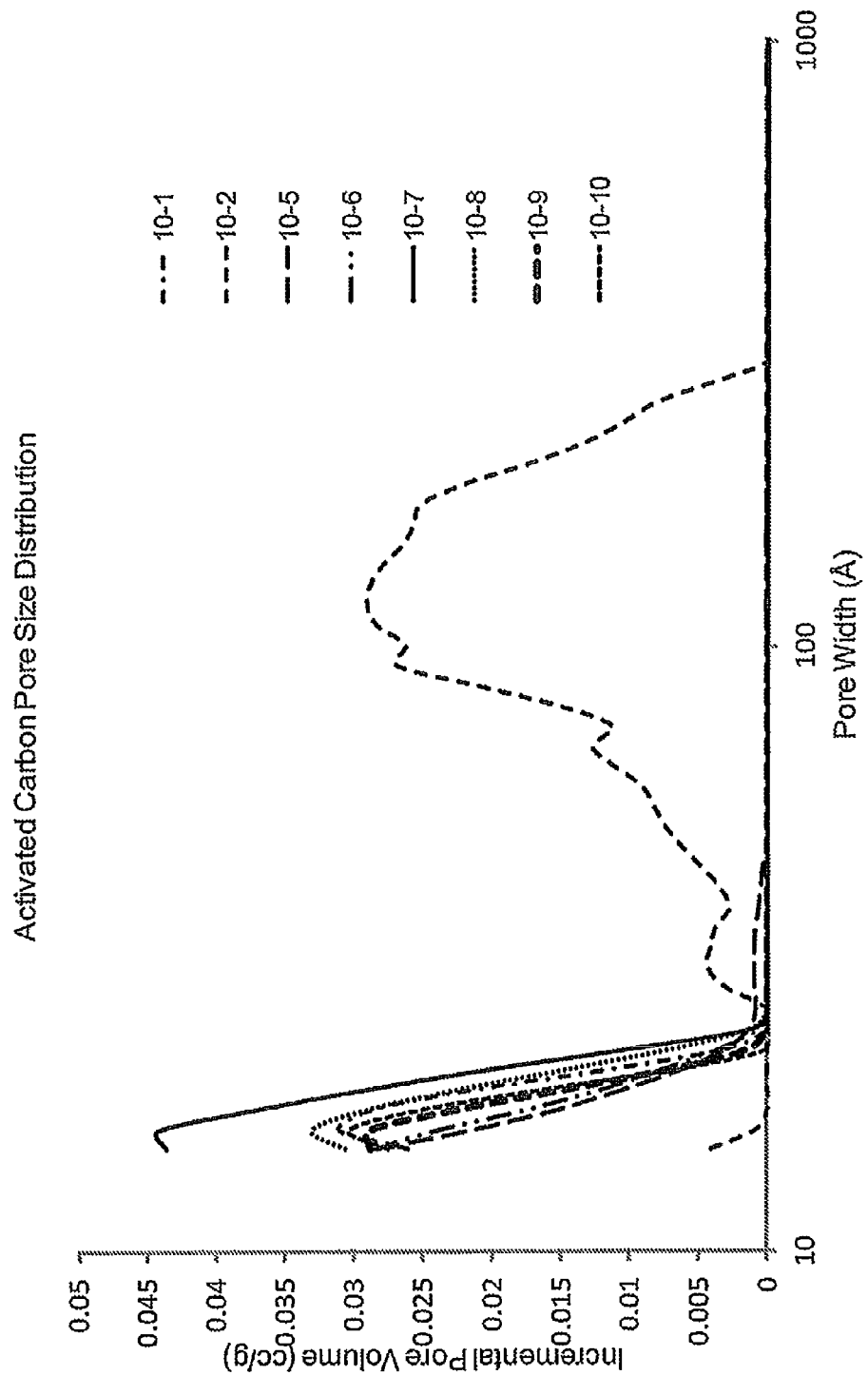
FIG. 10 shows pore size distributions for activated carbons.

Nitrogen isotherm, surface area and pore volume data for activated carbon samples from Example 8 are presented in FIGS. 9 & 10 and in Table 10. Samples were pyrolyzed at high temperature under an inert atmosphere. All samples were activated in a tube furnace with the goal of achieving 1,700 m²/g to 1,900 m²/g SSA. Isotherm data (FIG. 9) and DFT pore size distributions (FIG. 10) demonstrate the ability of the current emulsion formulations to create a microporous carbon, and in fact only one sample (10-2) exhibited any mesoporosity. Mesopore development in 10-2 may be due to the low surfactant concentration along with low catalyst and low acid content. High surfactant loading, ≥5%, produced similar surface area, pore volume, and isotherm data for activated carbon, independent of gel formulation. With lower surfactant loading, 1%, the material shows more sensitivity to changes in gel formulation.

Electrochemical testing (ECT) data for the activated carbons is presented in Table 11. Samples were milled in a Fritsch mill and then rolled into dry electrodes for ECT. Sample 5 recorded adequate performance compared to current MicroControl carbon at similar activation levels.

TABLE 10

Activated Carbon Surface Area and Pore Volume

| Sample | Gel (Solid/Acid/R:C/Surfactant/RF) | SSA ($m^2/g$) | PV ($cm^3/g$) | P95/P5 | GM* |
|---|---|---|---|---|---|
| 10-1 | 50/10/10/1/20 | 1,813 | 0.756 | 1.09 | 24.0 |
| 10-2 | 41/10/25/1/20 | 783 | 0.806 | 2.69 | 9.7 |
| 10-5 | 41/20/10/10/25 | 1,780 | 0.762 | 1.12 | 23.4 |
| 10-6 | 41/10/10/10/30 | 1,736 | 0.733 | 1.10 | 23.7 |
| 10-7 | 46/15/15/5/25 | 2,074 | 0.866 | 1.12 | 23.9 |
| 10-8 | 50/10/25/10/30 | 1,910 | 0.800 | 1.11 | 23.9 |
| 10-9 | 50/20/25/10/20 | 1,726 | 0.721 | 1.09 | 23.9 |
| 10-10 | 50/20/10/1/30 | 1,768 | 0.735 | 1.08 | 24.1 |

*GM = (specific surface area)/(100 * PV)

TABLE 11

Activated Carbon Electrochemical Testing Performance

| Sample | Gel (Solid/Acid/R:C/Surfactant/RF) | F/cc | F/g | R2 | −45 | Max |
|---|---|---|---|---|---|---|
| 10-5 | 41/20/10/10/20 | 23.9 | 114.2 | 4.63 | 0.14 | 23.8 |
| 10-7 | 46/15/15/5/25 | 21.5 | 121.6 | 5.54 | 0.16 | 23.3 |

Example 10—Preparation of Dried Polymer Gel

To better understand the relationship between formulation and processing parameters, twelve polymerization experiments were performed according to the general procedures described in Example 1. Certain processing parameters such as stir rate, reaction start temperature and cure time were varied as summarized in Table 12.

TABLE 12

Polymerization Conditions

| Sample | % Solids | % Acid | R:C | % SPAN80 | % RF Gel | Start Temp | Cure Time | RPM |
|---|---|---|---|---|---|---|---|---|
| 12-1 | 30 | 5 | 50 | 2 | 30 | 45 | 6 | 200 |
| 12-2 | 50 | 5 | 50 | 0.5 | 30 | 70 | 6 | 400 |
| 12-3 | 30 | 5 | 10 | 0.5 | 10 | 45 | 6 | 200 |
| 12-4 | 30 | 20 | 50 | 0.5 | 30 | 45 | 12 | 400 |
| 12-5 | 50 | 20 | 10 | 2 | 10 | 45 | 6 | 400 |
| 12-6 | 50 | 20 | 50 | 0.5 | 10 | 45 | 12 | 200 |
| 12-7 | 30 | 20 | 50 | 0.5 | 30 | 45 | 12 | 400 |
| 12-8 | 30 | 5 | 10 | 0.5 | 10 | 70 | 12 | 400 |
| 12-9 | 30 | 20 | 10 | 2 | 30 | 70 | 12 | 200 |
| 12-10 | 30 | 20 | 50 | 2 | 10 | 70 | 6 | 400 |
| 12-11 | 50 | 5 | 10 | 2 | 30 | 45 | 12 | 400 |
| 12-12 | 50 | 20 | 10 | 0.5 | 30 | 70 | 6 | 200 |

Example 11—Dried Polymer Gel Data

Figure 11:
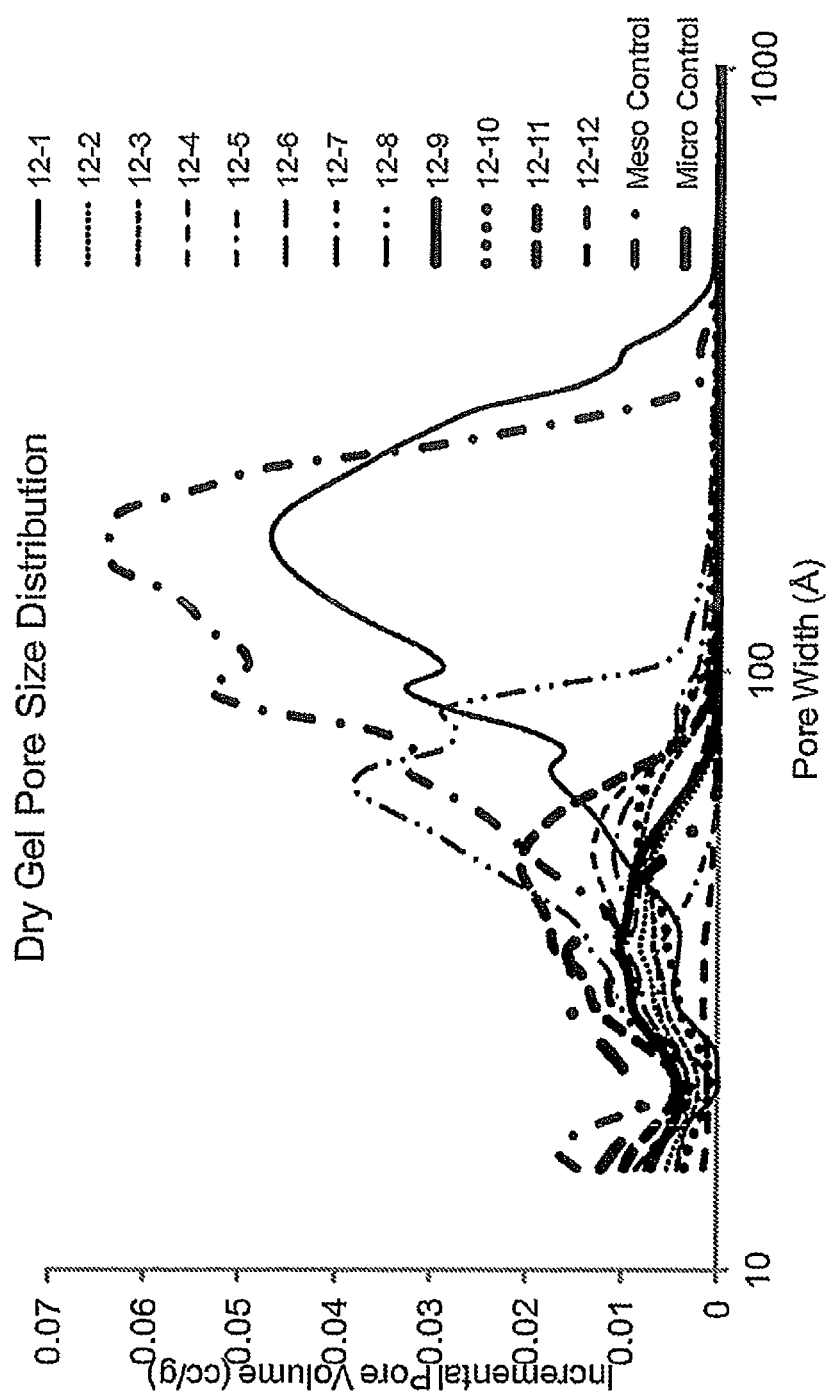
FIG. 11 presents pore volume distributions for freeze dried gels.
Figure 12:
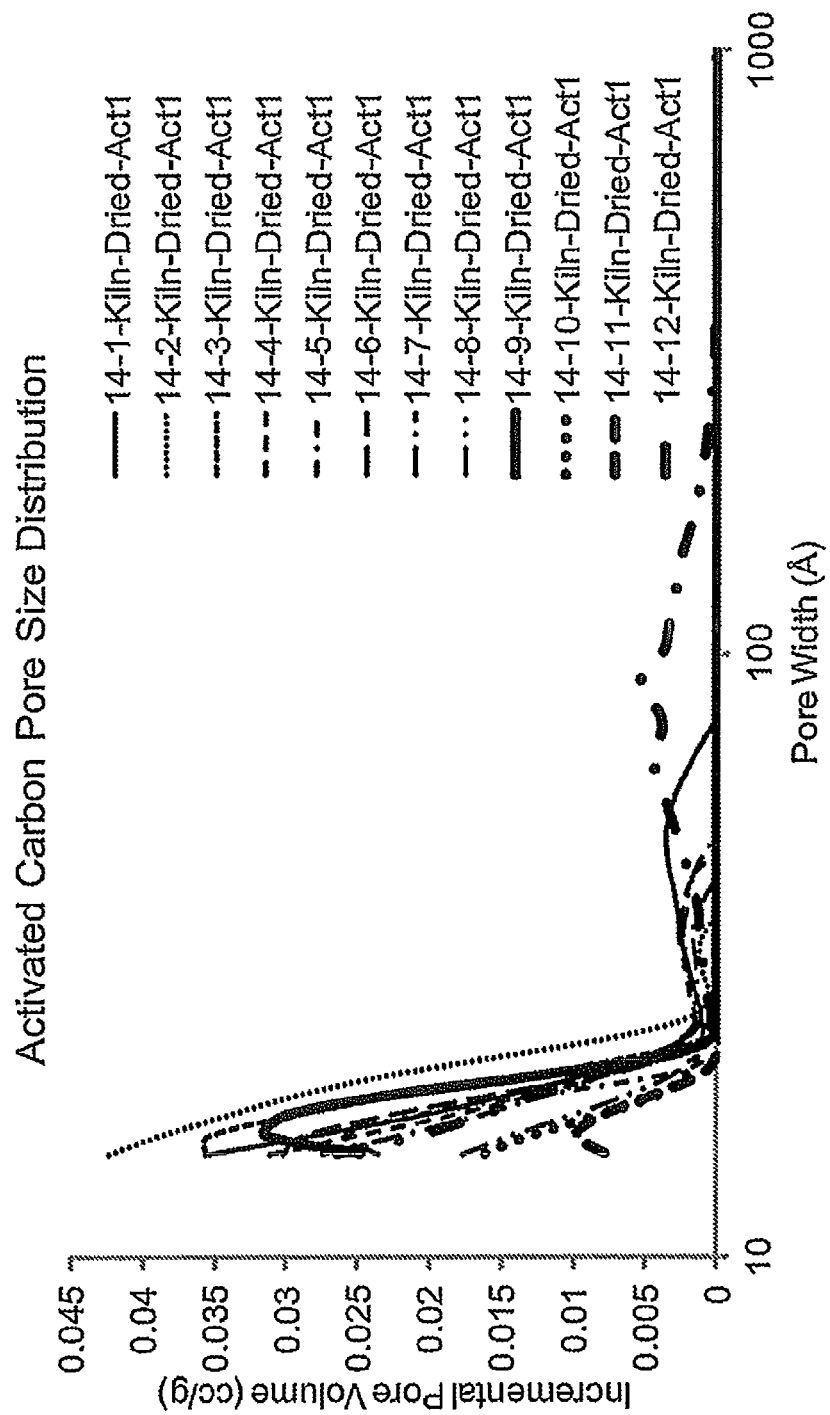
FIG. 12 is a graph of pore size distributions for activated carbons.
Figure 13:
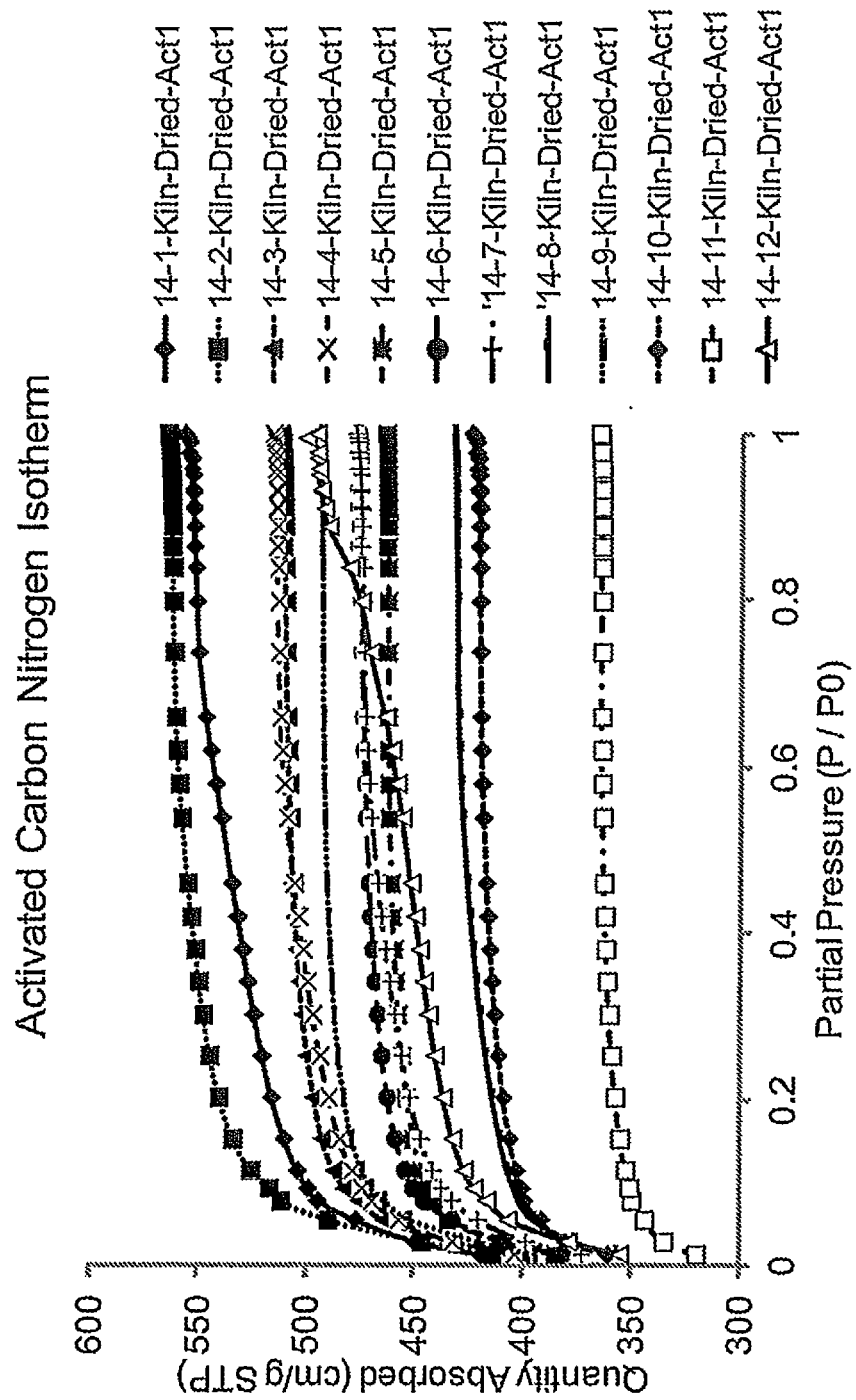
FIG. 13 shows nitrogen absorption isotherms for activated carbon samples.

Nitrogen isotherm, surface area and pore volume data for dried gel samples of Example 10 are presented in FIG. 11 and in Table 13. For comparative purposes, data for representative microporous and micro/mesoporous gels (MicroControl and MesoControl, respectively) prepared via monolith procedures are also presented in FIG. 11. It can be seen that there is a correlation between surface area and cure time. It is also clear that one can obtain a spectrum of dry gels ranging from solely microporous to micro/mesoporous, and their resulting carbons are readily available through emulsion polymerization.

TABLE 13

Dry Gel Data

| Sample | Gel (Solid/Acid/R:C/Surfactant/C:RF) | SSA | PV | P95/P5 | GM | Fines* |
|---|---|---|---|---|---|---|
| 12-1 | 30/5/50/2/30 | 310 | 0.893 | 8.46 | 3.2 | 1 |
| 12-2 | 50/5/50/0.5/30 | 235 | 0.166 | 2.12 | 12.9 | 0 |
| 12-3 | 30/5/10/0.5/10 | 156 | 0.159 | 3.03 | 8.9 | 0 |
| 12-4 | 30/20/50/0.5/30 | 329 | 0.276 | 2.57 | 10.8 | 2 |
| 12-5 | 50/20/10/2/10 | 174 | 0.113 | 2.00 | 14.0 | 3 |
| 12-6 | 50/20/50/0.5/10 | 333 | 0.224 | 2.03 | 13.5 | 2 |
| 12-7 | 30/20/50/0.5/30 | 322 | 0.268 | 2.48 | 10.9 | 3 |
| 12-8 | 30/5/10/0.5/10 | 414 | 0.583 | 4.17 | 6.5 | 3 |
| 12-9 | 30/20/10/2/30 | 286 | 0.206 | 2.20 | 12.6 | 1 |
| 12-10 | 30/20/50/2/10 | 146 | 0.187 | 3.53 | 7.1 | 2 |
| 12-11 | 50/5/10/2/30 | 417 | 0.381 | 2.72 | 9.9 | 1 |
| 12-12 | 50/20/10/0.5/30 | 58 | 0.035 | 1.83 | 15.1 | 0 |
| MicroControl | 40/20/10 | 545 | 0.327 | 1.80 | — | NA |
| MesoControl | 33/20/25 | 625-725 | 0.98-1.20 | 4.4-5.5 | — | NA |

*Scale of 0-3,
0 = no fine material,
3 = most fine material

Example 12—Activated Carbon Data

As a means to determine appropriate conditions for preparation of a microporous carbon material via an emulsion polymerization, the gels from example 10 were pyrolyze at high temperature under an inert atmosphere without previously drying the material gel. Only select samples were dried and then pyrolyzed. All samples were activated in the tube furnace at 900° C. with the goal of achieving 1,700 m²/g to 1,900 m²/g SSA. TGA data was collected to determine activation rates. Pore volume and pore size data is presented in FIGS. 12-15. Tables 14-16 present various physical and electrochemical properties of the carbon materials. As can be seen the full spectrum of microporous to mesoporous carbon materials having various physical and electrochemical properties can be prepared via the described methods. Samples denoted with "PCt" have been freeze dried prior to pyrolysis, while samples identified as "kiln dried" have been pyrolyzed directly from wet gel (i.e., not freeze dried).

TABLE 14

Activated Carbon Data

| Sample | Gel (Solid/Acid/R:C/ Surfactant/C:RF) | SSA | PV | P95/P5 | GM |
| --- | --- | --- | --- | --- | --- |
| 14-1-Kiln dried-ACt1 | 30/5/50/2/30 | 1,963 | 0.860 | 1.16 | 22.8 |
| 14-2-Kiln dried-ACt1 | 50/5/50/0.5/30 | 2,062 | 0.873 | 1.16 | 23.6 |
| 14-3-Kiln dried-ACt1 | 30/5/10/0.5/10 | 1,889 | 0.792 | 1.11 | 23.9 |
| 14-4-Kiln dried-ACt1 | 30/20/50/0.5/30 | 1,857 | 0.797 | 1.13 | 23.3 |
| 14-5-Kiln dried-ACt1 | 50/20/10/2/10 | 1,722 | 0.716 | 1.07 | 24.1 |
| 14-6-Kiln dried-ACt1 | 50/20/50/0.5/10 | 1,762 | 0.738 | 1.10 | 23.9 |
| 14-7-Kiln dried-ACt1 | 30/20/50/0.5/30 | 1,713 | 0.738 | 1.13 | 23.2 |
| 14-8-Kiln dried-ACt1 | 30/5/10/0.5/10 | 1,566 | 0.668 | 1.09 | 23.4 |
| 14-9-Kiln dried-ACt1 | 30/20/10/2/30 | 1,836 | 0.764 | 1.09 | 24.0 |
| 14-10-Kiln dried-ACt1 | 30/20/50/2/10 | 1,557 | 0.654 | 1.08 | 23.8 |
| 14-11-Kiln dried-ACt1 | 50/5/10/2/30 | 1,362 | 0.565 | 1.06 | 24.1 |
| 14-12-Kiln dried-ACt1 | 50/20/50/0.5/30 | 1,654 | 0.767 | 1.22 | 21.6 |

TABLE 15

Activated Carbon Surface Area and Pore Volume

| Sample | Gel (Solid/Acid/R:C/ Surfactant/RF) | SSA (m²/g) | PV (cm³/g) | JRI | GM |
| --- | --- | --- | --- | --- | --- |
| 14-1-PCt-ACt1 | 30/5/50/2/30 | 2,146 | 1.752 | 2.23 | 12.2 |
| 14-8-PCt-ACt1 | 30/5/10/0.5/10 | 2,458 | 1.343 | 1.52 | 18.3 |
| 14-11-PCt-ACt1 | 50/5/10/2/30 | 2,008 | 0.905 | 1.21 | 22.2 |

TABLE 16

Activated Carbon Electrochemical Testing Performance

| Sample | Gel (Solid/Acid/R:C/ Surfactant/RF) | F/cc | F/g | R2 | −45* (Hz) | Normalized F/cc |
| --- | --- | --- | --- | --- | --- | --- |
| 14-1-PCt-ACt1 | 30/5/50/2/30 | 14.6 | 127.5 | 4.80 | 0.26 | 14.5 |
| 14-5-Kiln Dried-ACt1 | 50/20/10/2/10 | 23.7 | 119.8 | 4.82 | 0.07 | 25.9 |

*Frequency response = Frequency as calculated from the Bode plot at a 45° phase angle

Example 13—Variable Process Parameters

In addition to the above process parameters, polymerizations were performed with various surfactants and solvents. For each sample, two separate solutions were prepared. A gel solution was made as described herein, and a continuous phase/surfactant solution was also prepared and the temperature was increased to 85° C. Once the gel solution was done mixing for 10 minutes, it was poured into the continuous phase/surfactant solution and held for 6 hours at 85° C. The sample was then removed and placed in a large beaker to let settle. The excess continuous phase was decanted off and then the remaining material was rinsed with iso-propanol and filtered through a Buchner funnel. Samples conditions are summarized in Table 17. 17-6 was created to test the suspension process with mineral oil as the continuous phase.

TABLE 17

Polymerization Conditions for Example 13

| Sample | Gel Formulation (Solids/Acid/R:C) | RF Solution (mL) | Continuous Phase (mL) | Surfactant (type/mL) |
| --- | --- | --- | --- | --- |
| 17-1 | 40/10/10 | 60 | Mineral Oil (200) | SPAN80/1 |
| 17-2 | 30/5/50 | 60 | Mineral Oil (200) | SPAN80/4 |
| 17-3 | 40/10/10 | 60 | Mineral Oil (200) | SPAN20/1 |
| 17-4 | 40/10/10 | 60 | Xylene (200) | SPAN80/1 |
| 17-5 | 40/20/10 | 60 | Paraffin Oil (200) | SPAN80/1 |
| 17-6 | 50/5/10 | 60 | Mineral Oil (200) | SPAN80/4 |

Figure 16:
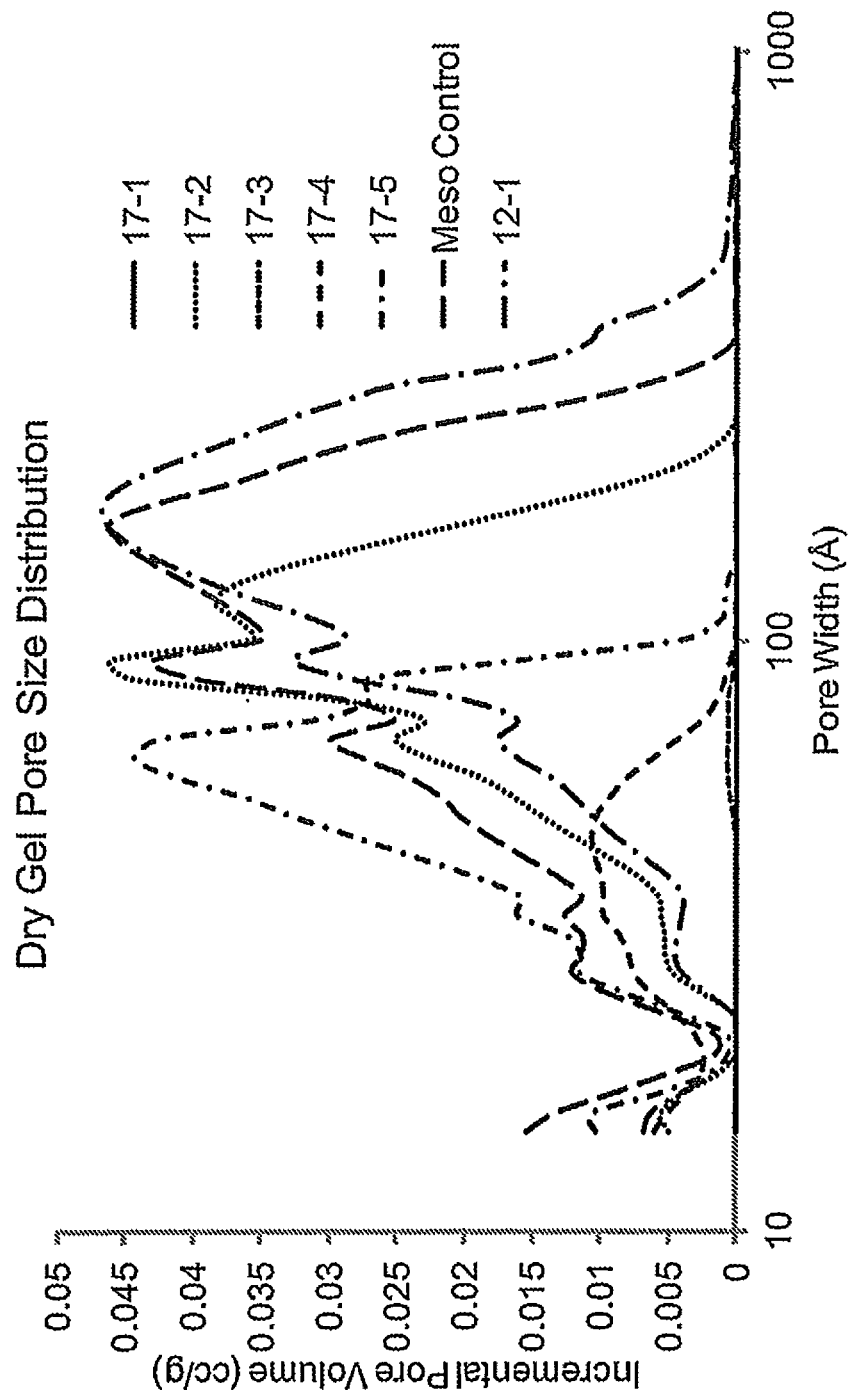
FIG. 16 is a graph of nitrogen absorption isotherms for freeze dried gels.

Nitrogen isotherm, surface area and pore volume data for the dried gel samples from Example 13 are presented in FIG. 16 and in Table 18. Samples 17-1 and 17-3 were not filtered, but rinsed with IPA and let dry in the hood. While not wishing to be bound by theory, it is thought that this decrease in pore volume is likely due to surfactant in the pores and on the surface of the gel material, and was expected to be burned off during pyrolysis. This theory was supported by the ability to activate the pyrolyzed material to a target surface area, pore volume, and P95/P5 (i.e., ratio of nitrogen sorbed at 95% partial pressure to that sorbed at 5% partial pressure) at a reasonable activation rate. Therefore certain properties of the dried gel may not be predictive of the properties of the final carbon materials.

It is important to note the ability of higher solids (>30%) formulations to produce mesoporous resin in an oil emulsion, which was not seen with the cyclohexane system. Sample 17-5 used the microporous monolith formulation, but in the paraffin oil inverse emulsion a mesoporous resin was produced. This may be due to controlled temperature profile of the resin as it cures in the oil. Different continuous phases may allow more or less movement of reagents from one phase to the other, which would contribute to a change in porosity as seen here.

TABLE 18

Dry Gel Surface Area and Pore Volume

| Sample | Gel (Solid/Acid/R:C/ Surfactant/RF) | SSA ($m^2/g$) | PV ($cm^3/g$) | JRI | Fines (0 = coarse 3 = fine) |
|---|---|---|---|---|---|
| 17-1 | 40/10/10/0.5/30 | 0.073 | 0 | 0 | 2 |
| 17-2 | 30/5/50/0.5/30 | 260 | 0.642 | 7.39 | 3 |
| 17-3 | 40/10/10/0.5/30 | 2.5 | 0.004 | 5.32 | 1 |
| 17-4 | 40/10/10/0.5/30 | 241 | 0.211 | 2.58 | 1 |
| 17-5 | 40/20/10/0.5/30 | 371 | 0.593 | 4.85 | 1 |

Figure 17:
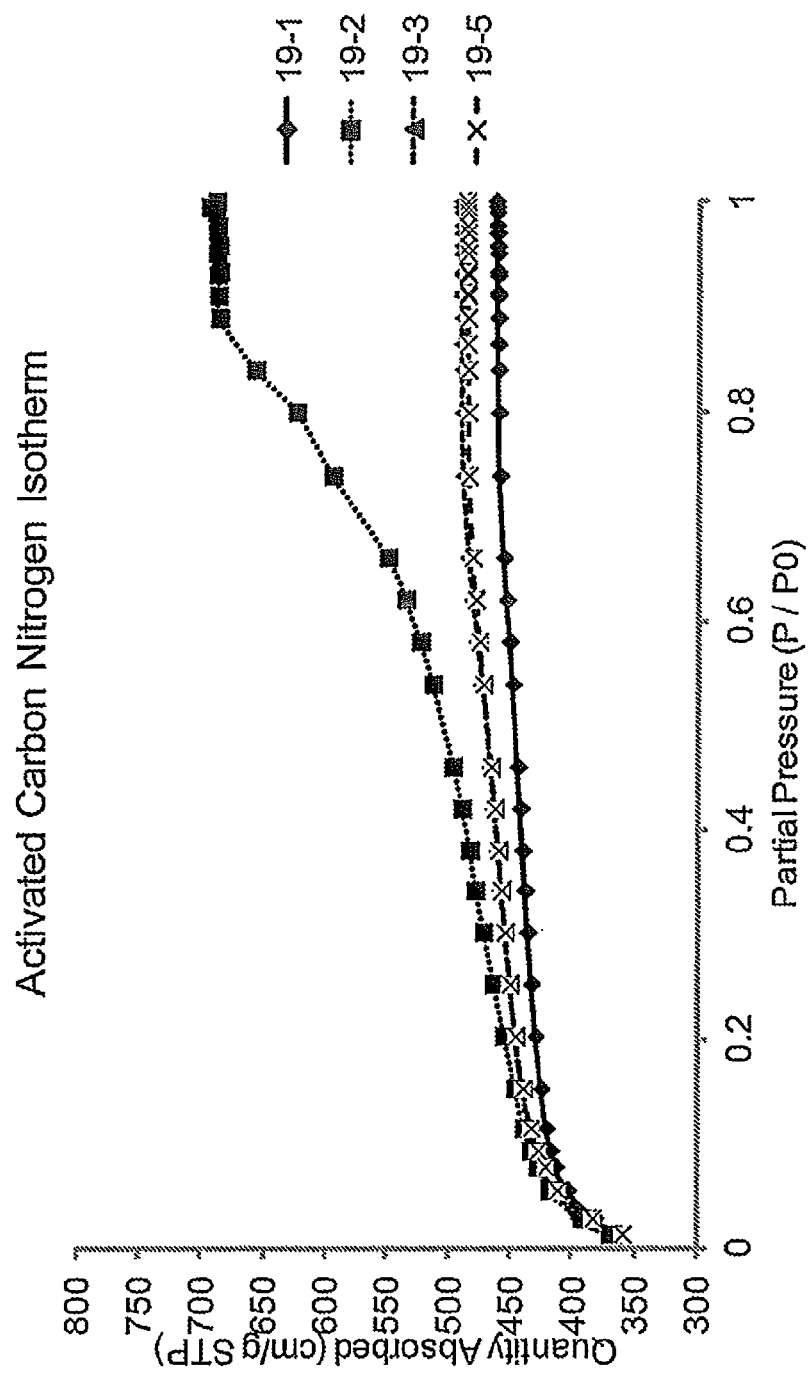
FIG. 17 shows nitrogen absorption isotherms for activated carbon samples.
Figure 18:
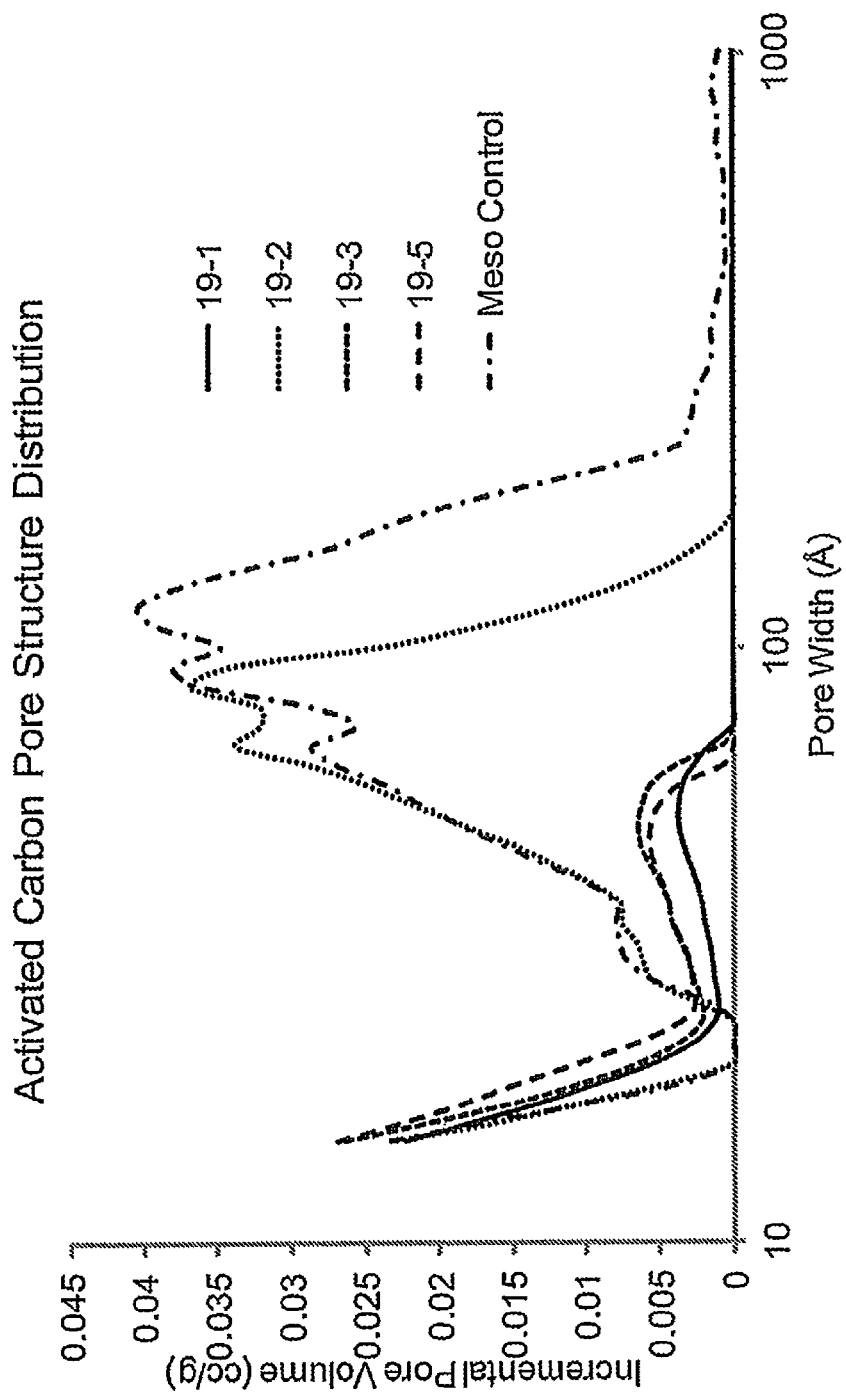
FIG. 18 presents pore size distributions for activated carbons.

Nitrogen isotherm, surface area, pore volume, and electrochemical testing data for 17 series activated carbon samples are presented in FIG. 17 and in Tables 19 & 20. All samples were pyrolyzed at high temperature under an inert atmosphere. Samples 1 and 5 were pyrolyzed without drying using the kiln dried technique. All samples were activated at high temperature in the tube furnaces to achieve a surface area of 1,700 $m^2/g$ 1,900 $m^2/g$. TGA data was collected to determine activation rates. The isotherm and DFT data (FIGS. 18 & 19) shows the ability to make various carbon materials. With low solids and acid content a mesoporous carbon can be achieved in an oil continuous phase. FIGS. 17 & 18 also show the ability to make carbon with properties of a microporous carbon and a mixed microporous/mesoporous carbon.

Electrochemical testing performance (Table 20) was measured after Fritsch milling the material for 15 minutes. Sample 17-2 data demonstrated adequate performance for a mesoporous carbon compared to current EnerG2's mesoporous product. Sample 17-6 performance was at the same level as current EnerG2's microporous carbon. 17-1 produced a device with exceptional energy density.

TABLE 19

Activated Carbon Surface Area and Pore Volume

| Sample | Gel (Solid/Acid/R:C/Surfactant/RF) | SSA ($m^2/g$) | PV ($cm^3/g$) | JRI |
|---|---|---|---|---|
| 19-1 | 40/10/10/0.5/30 | 1,628 | 0.714 | 1.13 |
| 19-2 | 30/5/50/0.5/30 | 1,699 | 1.066 | 1.64 |
| 19-3 | 40/10/10/0.5/30 | 1,686 | 0.758 | 1.19 |
| 19-5 | 40/20/10/0.5/30 | 1,683 | 0.752 | 1.18 |
| 19-6 | 50/5/10/3/30 | 2,086 | 0.877 | 1.15 |

TABLE 20

Activated Carbon Electrochemical Testing Performance

| Sample | Gel (Solid/Acid/R:C/ Surfactant/RF) | F/cc | F/g | R2 | -45* (Hz) | Normalized F/cc |
|---|---|---|---|---|---|---|
| 19-1 | 40/10/10/0.5/30 | 24.8 | 114.5 | 5.95 | 0.11 | 25.1 |
| 19-2 | 30/5/0/0.5/30 | 14.1 | 115.4 | 7.26 | 0.26 | 19.2 |
| 19-6 | 50/5/10/2/30 | 21.3 | 122.8 | 5.93 | 0.14 | 23.3 |

*Frequency response = Frequency as calculated from the Bode plot at a 45° phase angle

Example 14—Preparation of Phenol Formaldehyde Based Gel

Five different gel solutions were made by admixing a phenol and formaldehyde (molar ratio of phenol:formaldehyde=0.5:1) solution with a water/acid solvent. In some cases an ammonium acetate catalyst was added. The ratios of the various gel reagents are indicated in Table 21 for the five samples. The gel solution was allowed to mix for 5-10 minutes before it was poured into the continuous phase/ SPAN80 solution and the temperature was set to 95° C. and held for 3-5 days before the excess continuous phase was decanted. Wet gel samples were pyrolyzed directly at high temperatures under inert atmosphere with weight loss between 50-75%. Representative carbonization and activation data is presented in Table 22.

TABLE 21

Gel Preparation Parameters

| Sample | Acid type | Phenol-Catalyst (g) | Water-Acid-Formaldehyde[1] | Continuous Phase (mL) | SPAN80 (mL) |
|---|---|---|---|---|---|
| 21-1 | acetic | 20-0 | 10-30-27 | Xylenes 200 | 5 |
| 21-2 | acetic | 20-0 | 10-30-27 | Parrafin oil 200 | 5 |
| 21-3 | Oxalic[2] | 20-1 | 10-2-27 | Xylenes 200 | 5 |
| 21-4 | Acetic | 20-0 | 10-30-27 | Parrafin oil 200 | 5 |
| 21-5 | Acetic | 20-0 | 10-25-27 | Parrafin oil 200 | 5 |

[1]Added in the form of a 37 wt % aqueous solution
[2]Added in the form of a 5 wt % aqueous solution

TABLE 22

Carbonization and Activation Data

| Sample | Carbonization wt loss (%) | TGA activation rate (% wt loss/min) | Surface Area ($m^2/g$) | Pore Volume ($cm^3/g$) | F/cc | F/g | ~45 Hz |
|---|---|---|---|---|---|---|---|
| 22-4 | 55 | 0.187 | 2,209 | 0.972 | 1/14 | 1/14 | 1/14 |

* Frequency response = Frequency as calculated from the Bode plot at a 45° phase angle

Example 15—Surfactant-Free Emulsion Urea-Formaldehyde Synthesis

Microspheres of polymer gel can also be created through polymerization using an ultra-dilute solution. Polymer gels were prepared using the following general procedure. Urea and formaldehyde (1.6:1) were mixed into deionized water (143:1 water:urea) at room temperature, forming a dilute solution. The solution was mixed for 5 minutes, where formic acid is added. After about 30 minutes, the solution turned from clear to milky white, at which point the solution was allowed to sit, undisturbed until a collection of white polymer spheres were formed. In one embodiment, the specific surface area and pore volume as measured by nitrogen sorption for the polymer spheres is about 7.86 $m^2/g$ and about 0.57 $cm^3/g$, respectively. In some embodiments the ratio of urea:formaldehyde, urea:water, quantity of formic acid, dwell and stir time, and base or acid catalyst can be altered to yield a preferred polymer.

Figure 19:
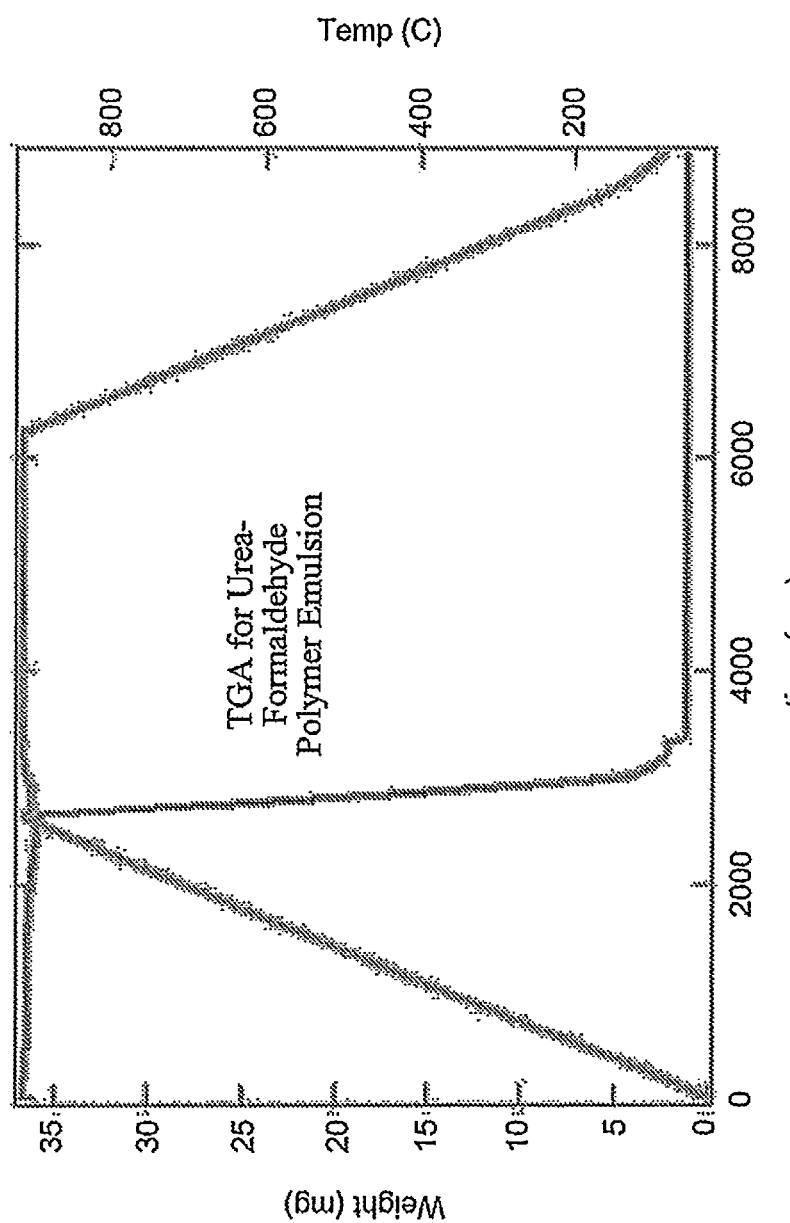
FIG. 19 illustrates TGA data for a urea-formaldehyde emulsion.

Polymers were then pyrolyzed to carbon at high temperature under inert atmosphere. In one embodiment, the physical properties of the carbon after pyrolysis are a surface area of about 48.3 $m^2/g$ and a pore volume of about 0.036 $cm^3/g$. FIG. 19 shows the TGA for one embodiment of urea-formaldehyde polymer emulsion. Notice there a rapid weight loss>90% occurs at the dwell temperature.

Figure 20:
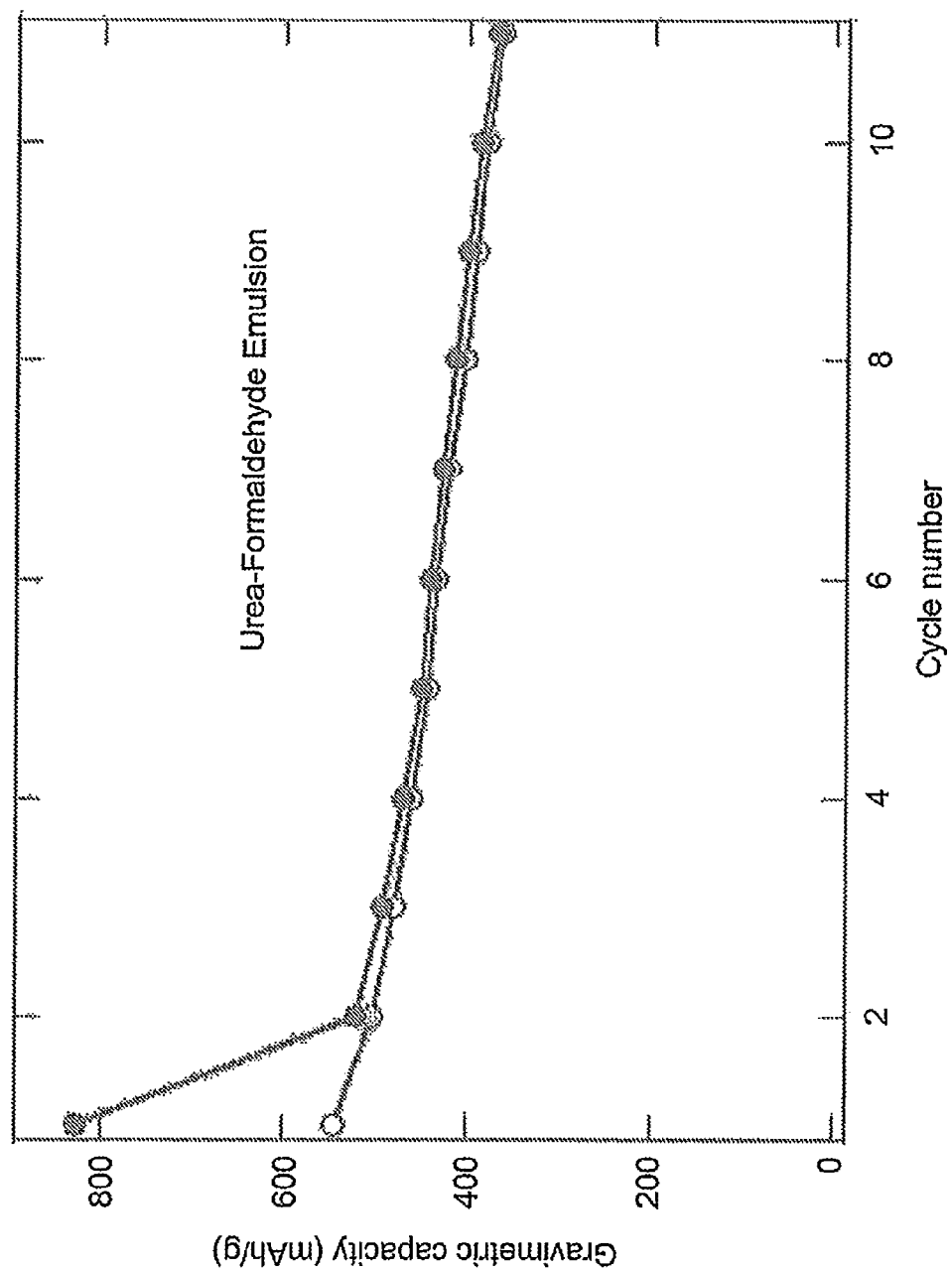
FIG. 20 shows electrochemical performance of a urea-formaldehyde based carbon material.

The carbon was tested in a lithium ion battery as a hard carbon anode material with lithium metal as a counter electrode, 1M LiPF6 in 1:1 ethylene carbon/diethylcarbonate (EC:DEC) as the electrolyte, with a commercial polypropylene separator. In one exemplary embodiment, the electrochemical performance, shown in FIG. 20 with an 88:2:10 (hard carbon:carbon black, PVDF binder) composition, displays high gravimetric capacity (>500 mAh/g).

Example 16—Preparation of Silicon-Carbon Composite

A solution was prepared of resorcinol and formaldehyde (0.5:1 molar ratio) in water and acetic acid (40:1 molar ratio) and ammonium acetate (10:1 molar ratio resorcinol to ammonium acetate). Lastly, 1 molar equivalent (resorcinol to silicon) of micronized (−325 mesh) silicon powder was added to the mixture. The final mixture was stirred for five minutes followed by sonication for 10 minutes. This mixture was poured into a 1:100 by volume solution of SPAN 80 (surfactant):cyclohexane and heated to 45° C. After five hours the temperature was increased to 65° C. and allowed to stir (covered) for 24 hours. Once the powder settled from solution, the cyclohexane was decanted and the recovered powder was dried at 88° C. for 10 minutes then pyrolyzed at high temperature under inert atmosphere. The obtained powder had a surface area of 476 $m^2/g$, pore volume of 0.212 $cm^3/g$ and average pore width of 17.8 angstroms.

Figure 21:
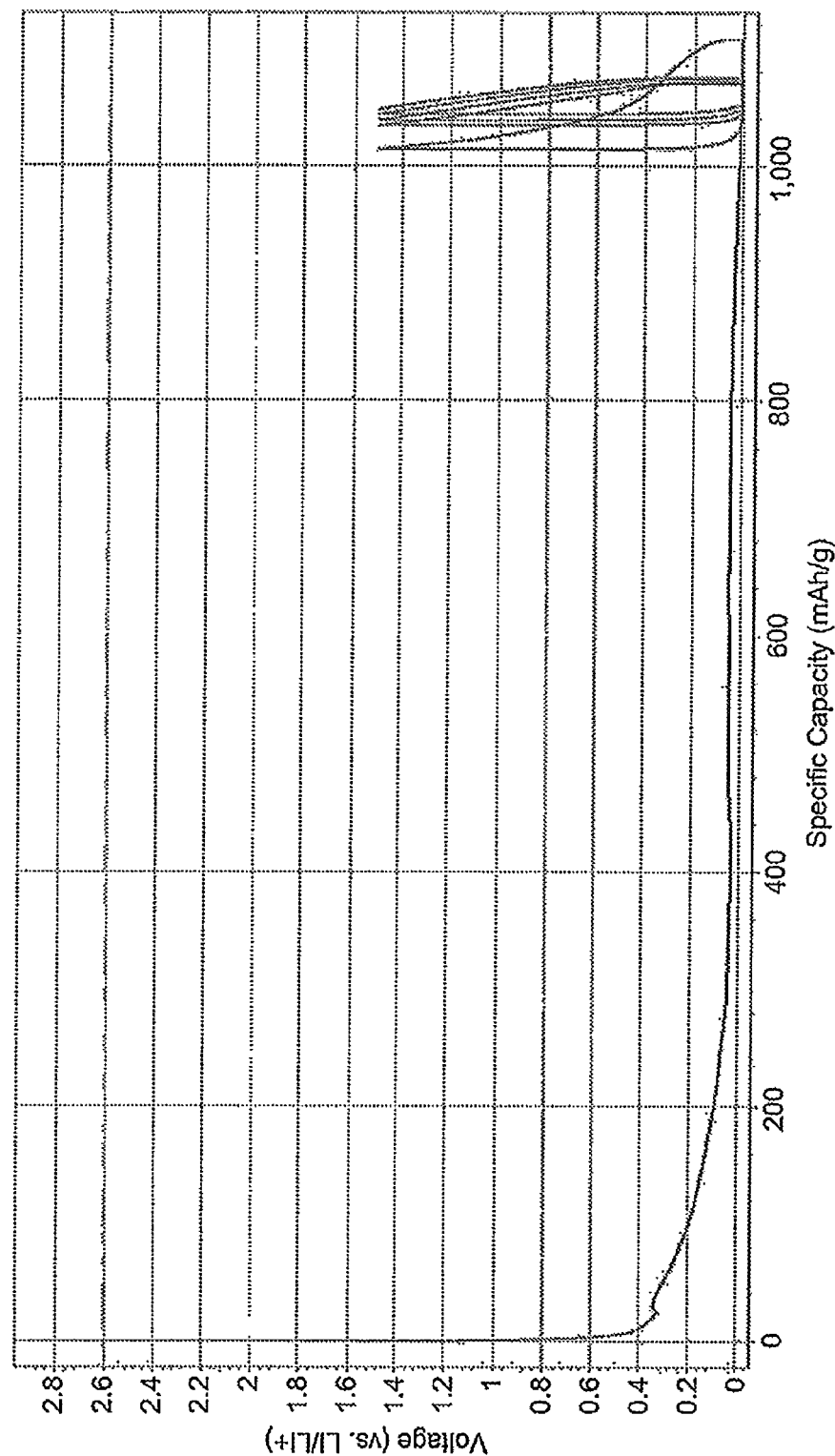
FIG. 21 depicts electrochemical performance of a silicon-carbon composite material.

Voltage vs. specific capacity of the Si—C composite material was tested and results are shown in FIG. 21. Cells were tested using lithium metal as the counter electrode and the working electrode comprised of 88:2:10 by weight Si—C composite material-conductivity enhancer (Super P)-binder (polyvinylidene fluoride). The electrodes were separated by a Rayon 33 micron membrane and the electrolyte was 1M LiPF6 in 1:1 by weight ethylene carbonate-diethylene carbonate. The cells were first discharged to 0.005V at constant current of 40 mA/g and then charged to 2V at the same current.

Example 17—Particle Size Distribution and Shape

Figure 22:
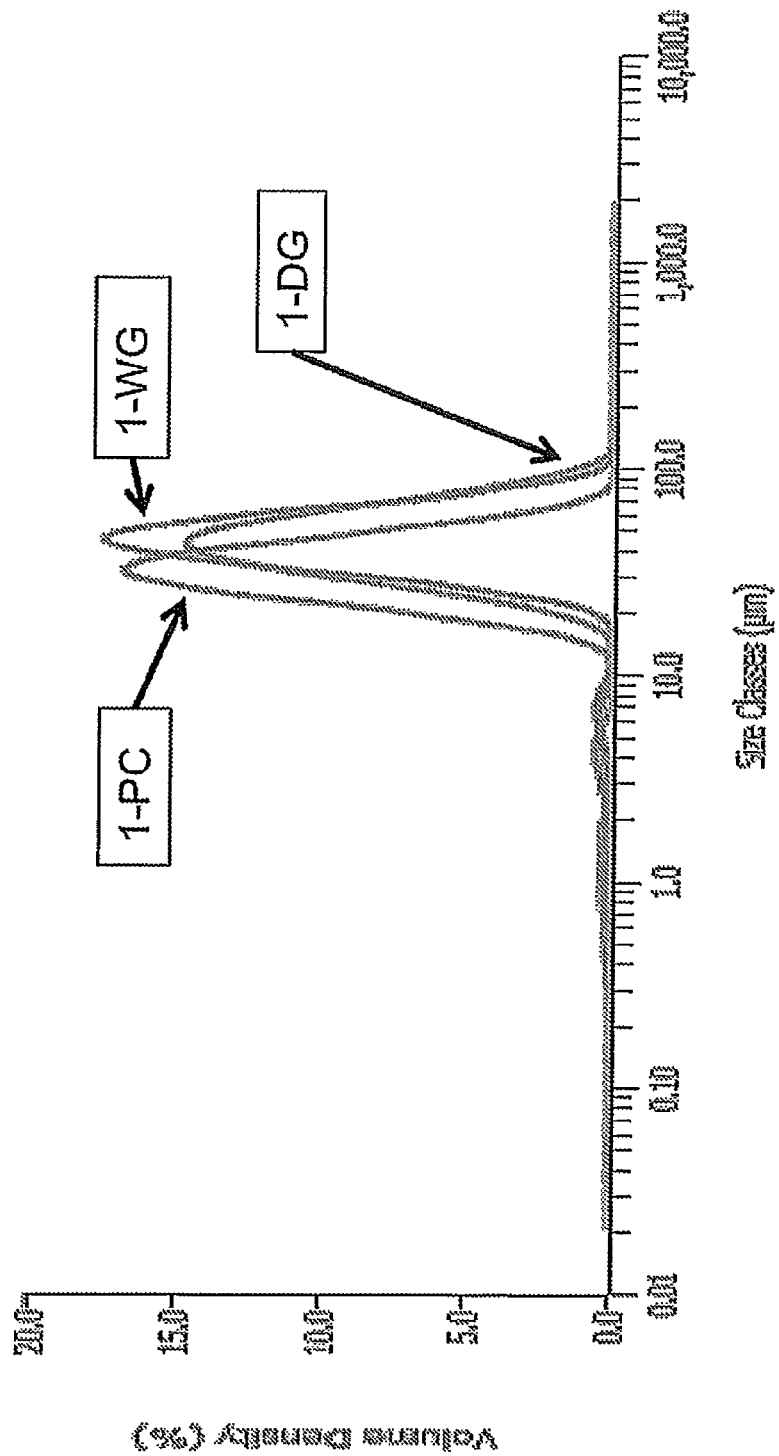
FIG. 22 shows particle size distributions for gels and carbon materials.

Emulsion polymerizations were performed as described above and activated carbon particles prepared. FIG. 22 demonstrates the near monodisperse particle size distribution for wet gel, dry gel and activated carbon particles obtained via emulsion polymerization (1-3/3-3 wet gel particles, dry gel particles and activated carbon particles, respectively from left to right in FIG. 22). The wet gel particles have a Dv10 of 26.4 um, a Dv50 of 43.6 um, and a Dv90 of 66.3 um (Span=0.914). The dry gel particles have a Dv10 of 23.7 um, a Dv50 of 42.0 um, and a Dv90 of 69.4 um (Span=1.090). The carbonized particles have a Dv10 of 19.5 um, a Dv50 of 31.5 um, and a Dv90 of 49.3 um (Span=0.947). Emulsion formulations and process parameters (e.g., stirring rate, etc.) are modified to control the particle size and extent of mono-dispersity of the resulting products. FIGS. 23A and 23B demonstrate the spherical nature of the gel and carbon particles, respectively. The spherical shape has advantages in certain electrochemical applications where packing of carbon particles affects the electrochemical performance of the device.

Example 18—Exemplary Monolith Preparation of Gels and Carbon Materials

A polymer gel was prepared by polymerization of resorcinol and formaldehyde (0.5:1) in a water/acetic acid solvent (75:25) in the presence of ammonium acetate catalyst. The resorcinol to solvent ration (R/S) was 0.3, and the resorcinol to catalyst ratio (R/C) was 25. The reaction mixture was placed at elevated temperature (incubation at 45° C. for about 6 h followed by incubation at 85° C. for about 24 h) to allow for gellation to create a polymer gel. Polymer gel particles were created from the polymer gel and passed through a 4,750 micron mesh sieve. The sieved particles were flash frozen by immersion in liquid nitrogen, loaded into a lyophilization tray at a loading of 3 $g/in^2$ to 7 $g/in^2$, and lyophilized at approximately 50 mTorr. The time to dry (as inferred from time for product to reach within 2° C. of shelf temperature) varied with product loading on the lyophilizer shelf.

Other monolith gels and carbon materials are prepared according to the above general procedures. Modifications to the procedure, including different gel formulations and/or no freeze drying are also used.

Example 19—General Testing of Electrochemical Properties

The carbon samples were analyzed for their electrochemical performance, specifically as an electrode material in EDLC coin cell devices. Specific details regarding fabrication of electrodes, EDLCs and their testing are described below.

Capacitor electrodes comprised about 97 parts by weight carbon particles (average particle size 5-15 microns) and about 3 parts by weight Teflon. The carbon and Teflon were masticated in a mortar and pestle until the Teflon was well distributed and the composite had some physical integrity. After mixing, the composite was rolled out into a flat sheet, approximately 50 microns thick. Electrode disks, approximately 1.59 cm in diameter, were punched out of the sheet. The electrodes were placed in a vacuum oven attached to a dry box and heated for 12 hours at 195° C. This removed water adsorbed from the atmosphere during electrode preparation. After drying, the electrodes were allowed to cool to room temperature, the atmosphere in the oven was filled with argon and the electrodes were moved into the dry box where the capacitors were made.

A carbon electrode was placed into a cavity formed by a 1 inch (2.54 cm) diameter carbon-coated aluminum foil disk and a 50 micron thick polyethylene gasket ring which had been heat sealed to the aluminum. A second electrode was then prepared in the same way. Two drops of electrolyte comprising 1.8 M tetraethylene ammonium tetrafluoroborate in acetonitrile were added to each electrode. Each electrode was covered with a 0.825 inch diameter porous polypropylene separator. The two electrode halves were sandwiched together with the separators facing each other and the entire structure was hot pressed together.

When complete, the capacitor was ready for electrical testing with a potentiostat/function generator/frequency response analyzer. Capacitance was measured by a constant current discharge method, comprising applying a current pulse for a known duration and measuring the resulting voltage profile. By choosing a given time and ending voltage, the capacitance was calculated from the following $C=It/\Delta V$, where C=capacitance, I=current, t=time to reached the desired voltage and $\Delta V$=the voltage difference between the initial and final voltages. The specific capacitance based on the weight and volume of the two carbon electrodes was obtained by dividing the capacitance by the weight and volume respectively. This data is reported for discharge between 2.43 and 1.89V.

Example 20—Particle Size and Porosity as a Function of Continuous Phase Viscosity and Surfactant Resorcinol-formaldehyde polymer formulations known to result in microporous gels (samples 20-1 . . . 5, (solids/Acid/R:C)) and mesoporous gels (20-6 . . . 10, (solids/Acid/R:C)) were prepared according to the general procedures described in Example 1, except no surfactant was used Suspensions and/or emulsions of the polymer formulations were admixed with various paraffinic oils (various suppliers) having different viscosities and allowed to age with stirring at 80° C.

Figure 24:
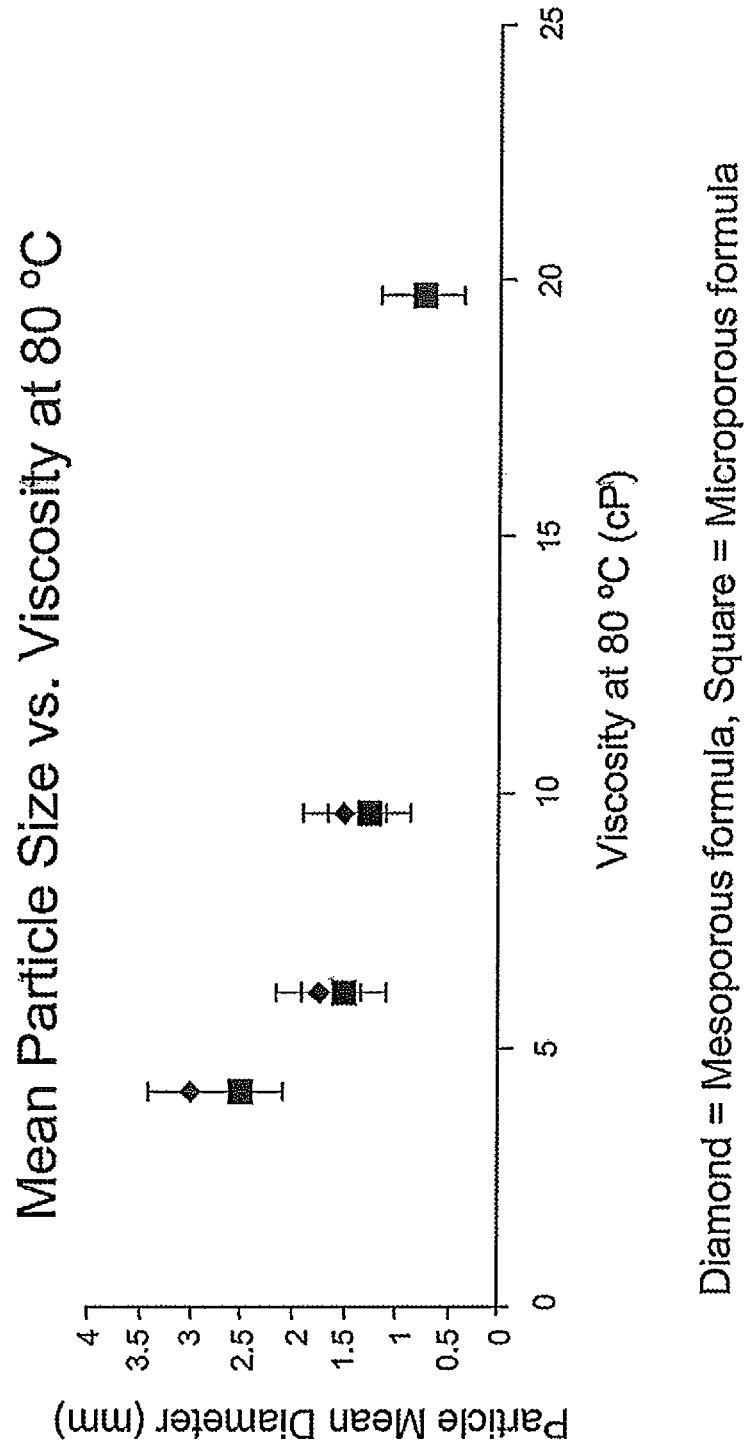
FIG. 24 is a graphical depiction of the particle size of the gel particles from Example 20.
Figure 25:
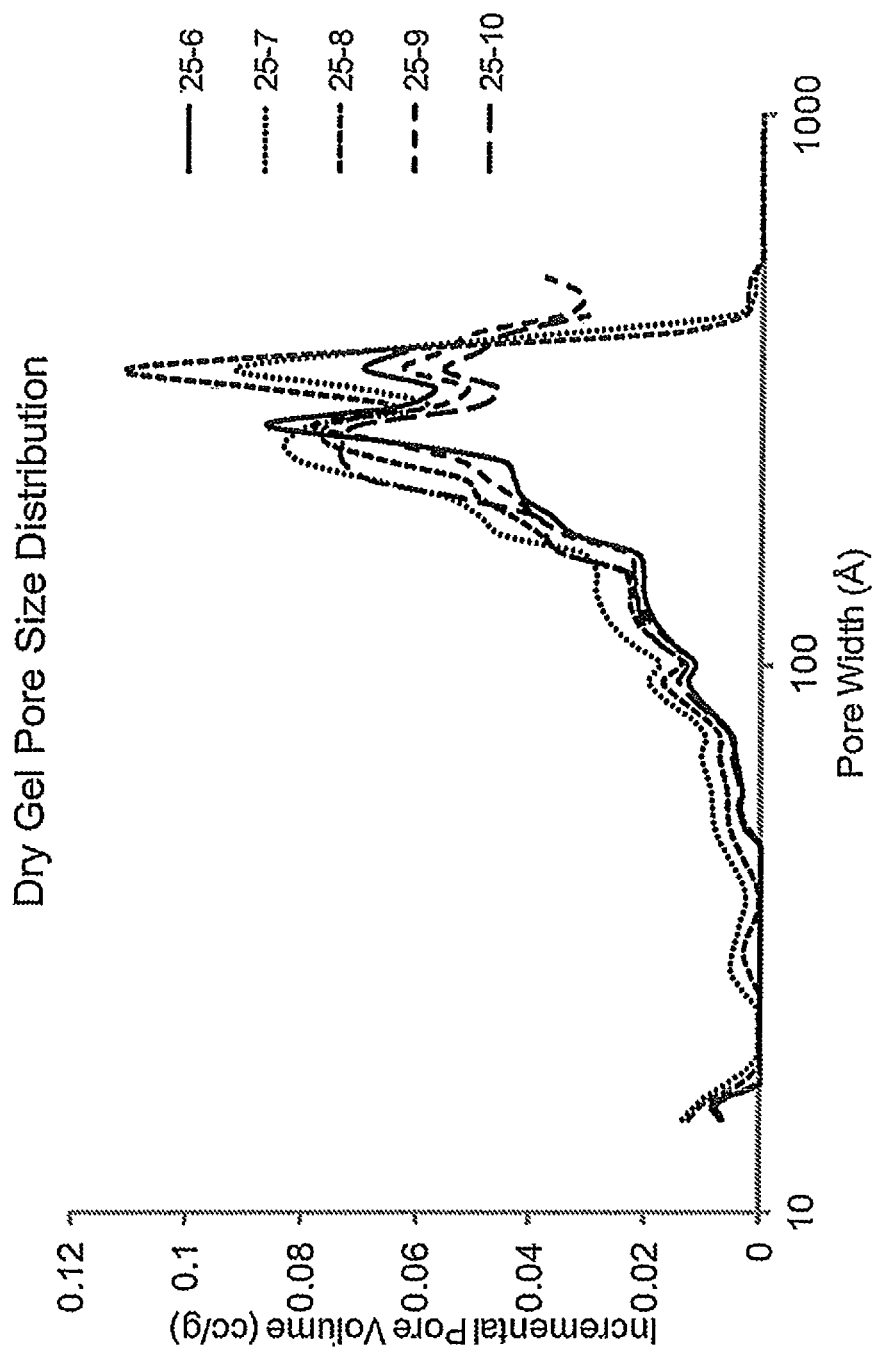
FIG. 25 is a graphical depiction of the pore size distribution of the freeze dried gel particles from Example 20.
Figure 26:
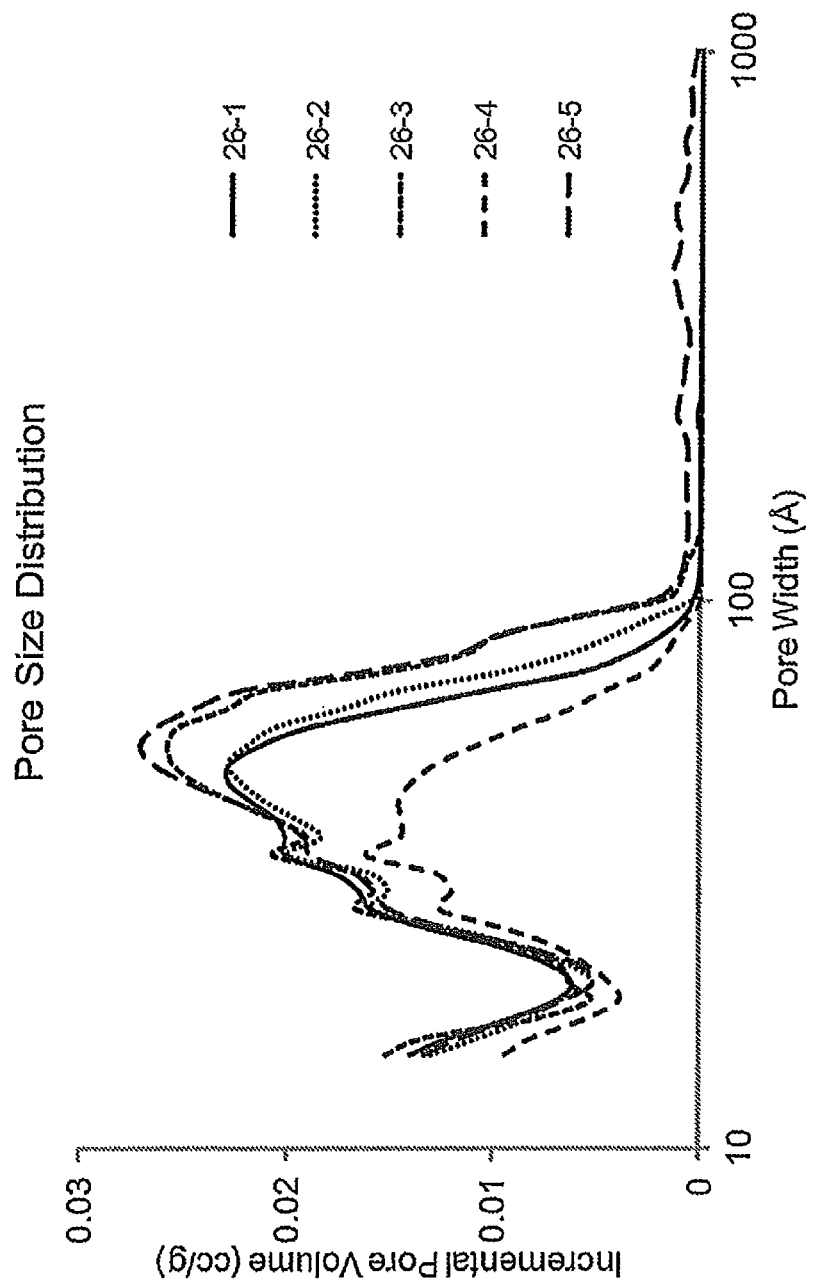
FIG. 26 is another graphical depiction of the pore size distribution of the freeze dried gel particles from Example 20.

The particle size and incremental pore volume of the resulting gel particles was determined. Results are presented in FIGS. 24-26. As seen in FIG. 24, the particle size of the resulting gel particles ranged from about 0.5 mm to about 3 mm in diameter, and the particle size was indirectly proportional to the continuous phase viscosity. That is, the higher the viscosity of the continuous phase the smaller the average particle diameter. Although the particle size of the gel particles varied, the pore structure of the freeze dried gel particles was very consistent (FIGS. 25 and 26).

Figure 27A:
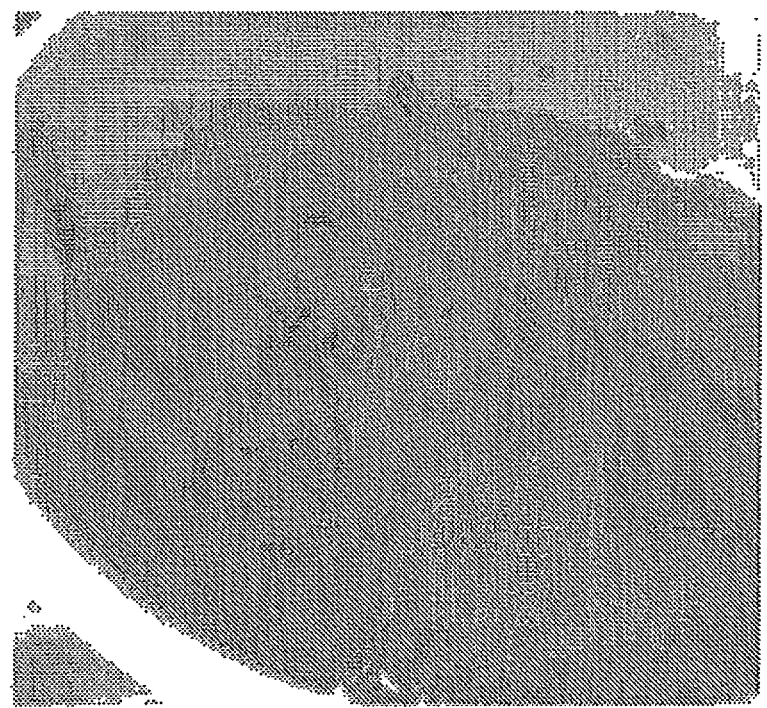
FIGS. 27A and 27B are photographs of the gel particles from Example 20 prepared in the presence of a surfactant and in the absence of a surfactant, respectively.
Figure 27B:
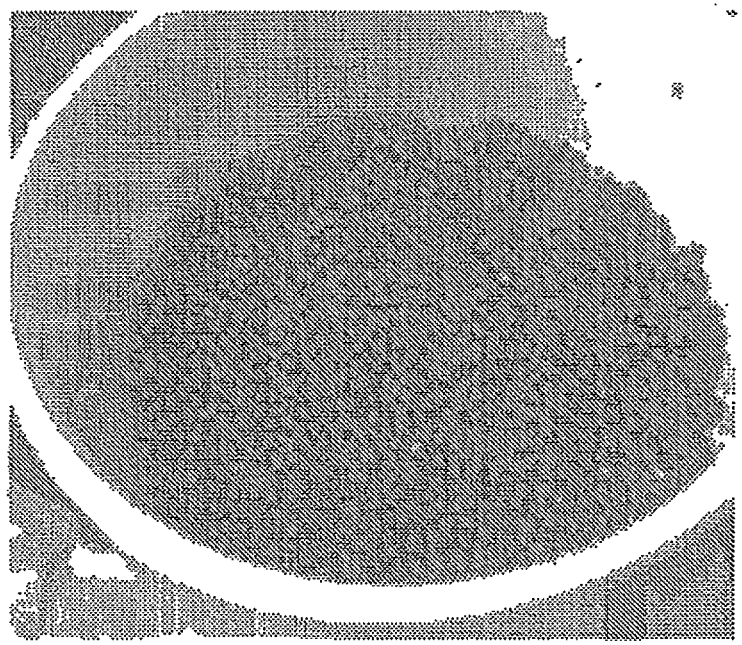
Figure 28:
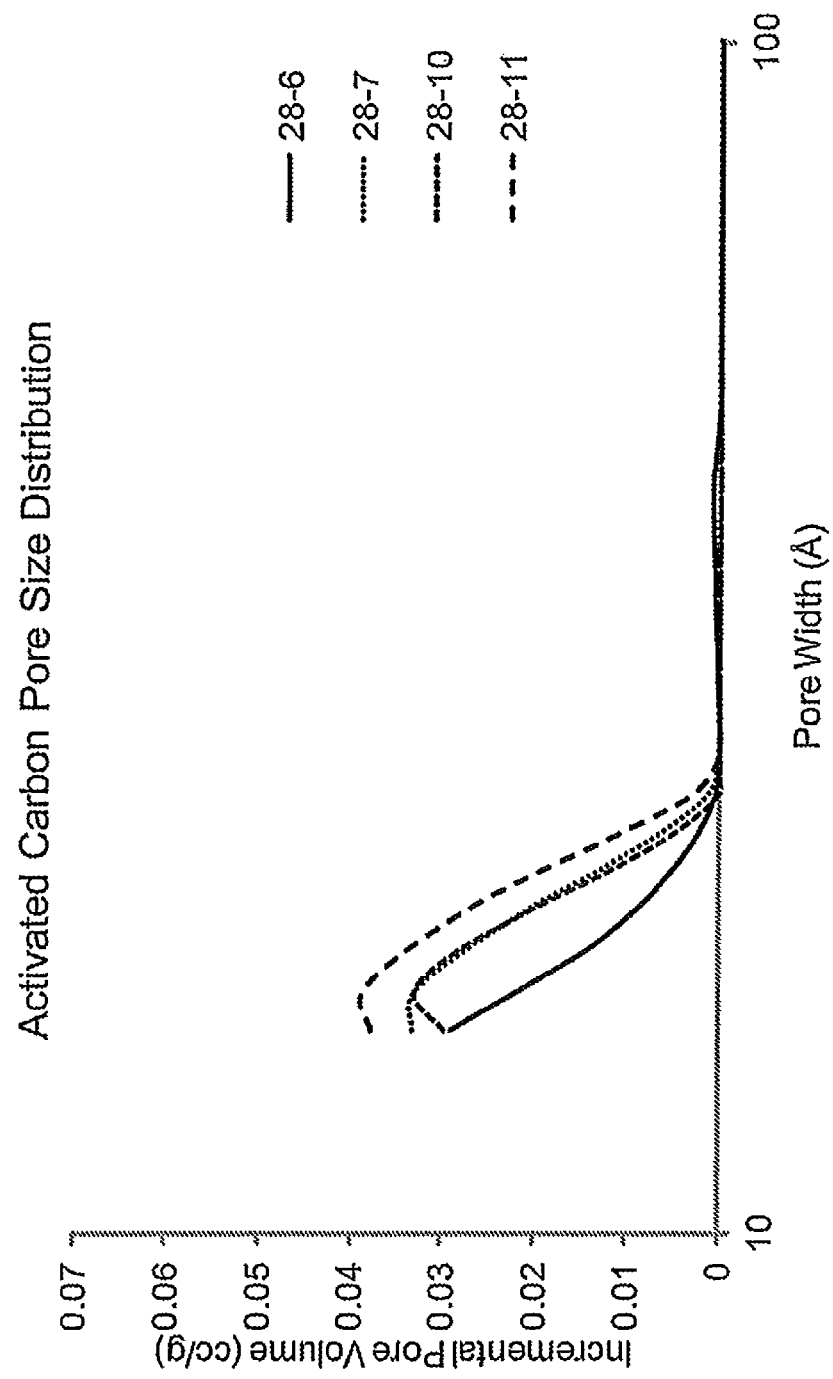
FIG. 28 is a graphical depiction of the pore size distribution for the activated carbon from Example 20.

Similar experiments were performed in the presence of surfactant. The presence of surfactant in the polymer formulations results in much smaller gel particle sizes. FIG. 27 compares the particle sizes of gels prepared in the presence of surfactant (FIG. 27A, about 200 μm) and absence of surfactant (FIG. 27B, from about 0.5 mm to about 3 mm). Although the particle size of these two preparation methods varied significantly, the pore structure of the resulting activated carbon was consistent among the two methods (FIG. 28, dotted lines represent surfactant samples and solid lines represent no surfactant).

Accordingly, certain embodiments of the present methods allow manipulation of the particle size while maintaining the desired pore structure, simply by selection of the appropriate continuous phase. Further, the methods provide robust and reproducible manufacturing processes since fluctuations in process parameters which affect the particle size are not expected to affect the resulting pore structure of the final product.

Example 21—Control of Particle Size

As noted in Example 20, in certain embodiments of the method the particle size of the gel particles does not have a significant effect on the pore structure of the gel particles. These embodiments of the invention provide advantages over other known methods since the particle size of the gel can be manipulated to obtain optimum processing properties (e.g., filtration, downstream pyrolysis and activation, final carbon particle size, etc.) while still maintaining the desired pore structure. Accordingly, various experiments were designed to understand how to control the gel particle size so that manufacturing processes can be optimized. Each of the experiments described below were performed with resorcinol/formaldehyde polymers; however, other polymers such as phenol/formaldehyde and melamine/formaldehyde polymers, and the like may also be used.

A. Degree of Polymerization

Figure 29:
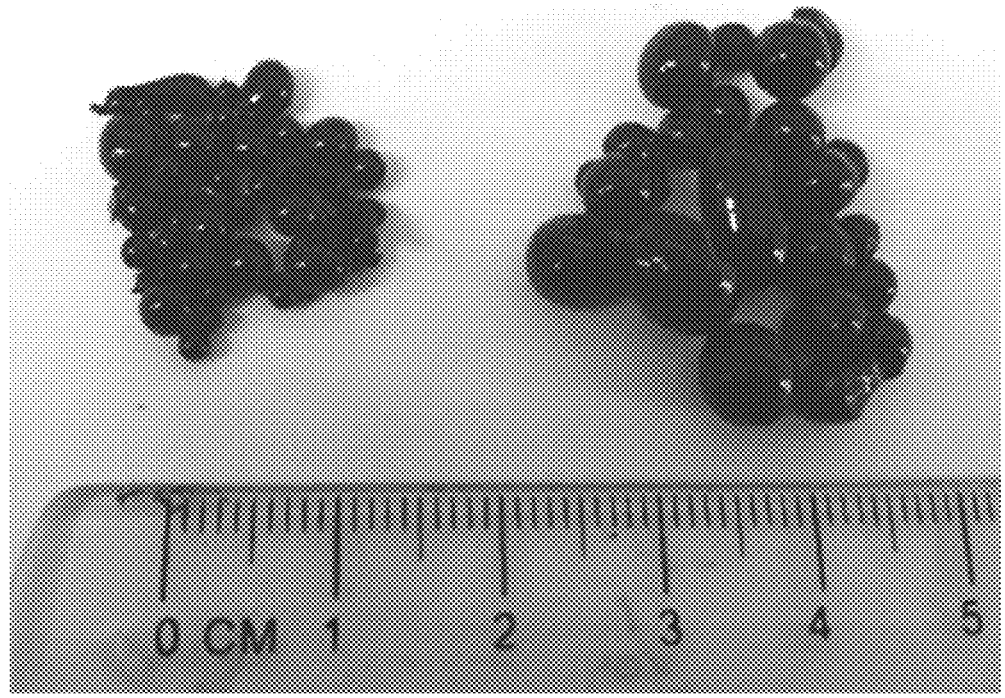
FIG. 29 is a photograph of gel particles from Example 21 that were formed by allowing a prepolymer composition to react prior to addition to a continuous phase.

As described in example 1 (and throughout the other examples), the polymer precursors and optional acid, solvent and/or catalyst are first admixed to prepare a prepolymer composition. Experiments performed in support of the present invention showed that the longer the prepolymer composition is allowed to react before being added to the continuous layer, the larger the resulting polymer gel particles. FIG. 29 shows gel particles formed by allowing the prepolymer composition to react prior to addition to the continuous phase. As seen in FIG. 29, larger particles result from longer reaction times prior to curing.

B. Temperature Effect

Figure 30:
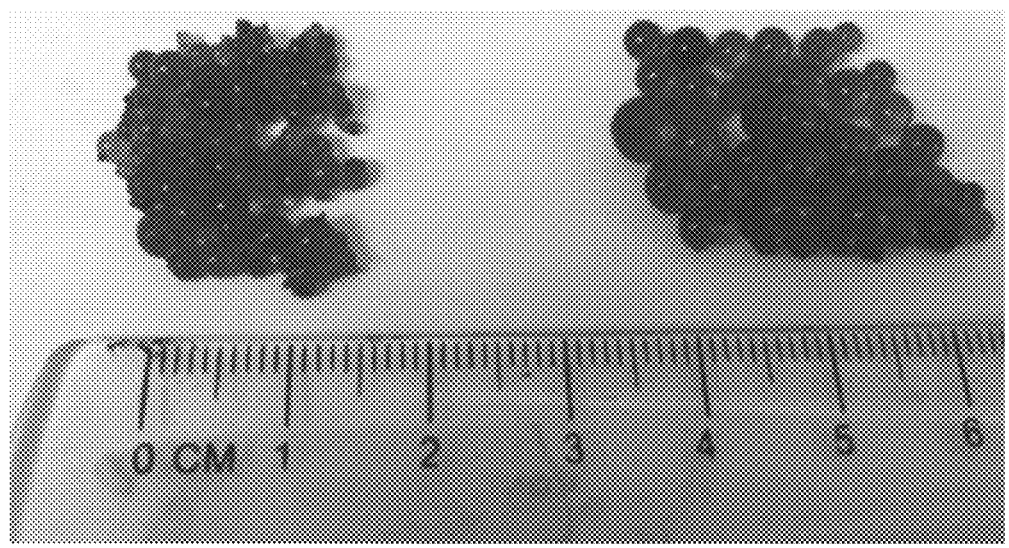
FIG. 30 is a photograph of gel particles from Example 21 that were formed at an incubation temperature of 80° C. (left) and an incubation temperature of 65° C. (right).

In a separate set of experiments, prepolymer compositions were prepared having the following composition: 40% solid, 10% acetic acid, R/C ratio of 10, and formaldehyde:resorcinol ratio of 2. Each prepolymer composition sample was incubated at either 65° C. or 80° C. and then added to a Flint Hills 100-HC continuous phase (resin/continuous phase ratio of 30:100) and stirred under the same conditions. As seen in FIG. 30, a higher preincubation temperature results in smaller gel particles and lower preincubation temperature results in larger gel particles (FIG. 30: left: 80° C. incubation temperature; right: 65° C. incubation temperature). This approach provides a simple, feasible way to control bead particle size in large production scale.

C. Continuous Phase Effect

Figure 31:
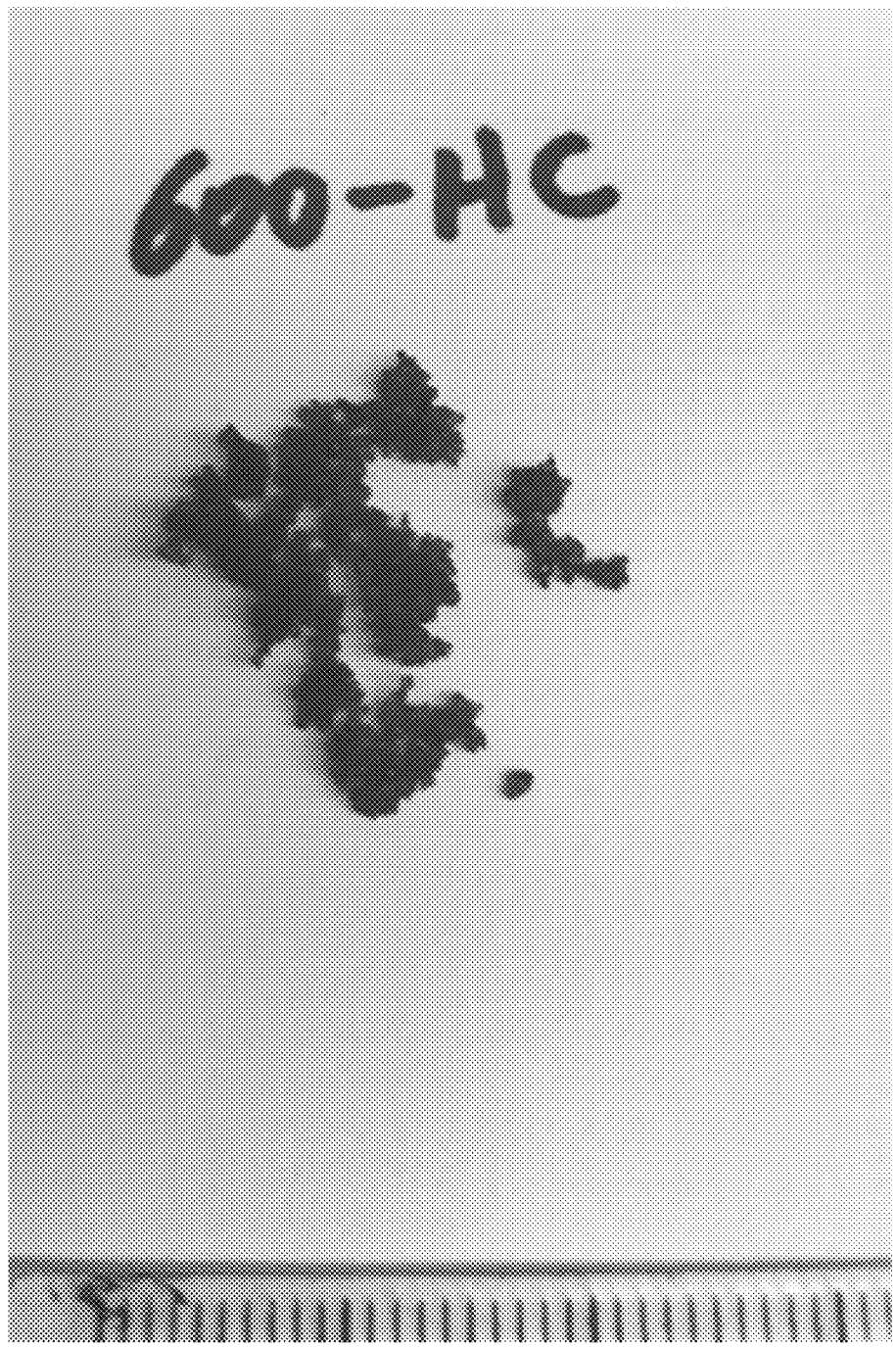
FIGS. 31-33 are photographs of gel particles from Example 21 made with continuous phase chain lengths of 600-HC, 230-HC, and 70-HC, respectively.
Figure 32:
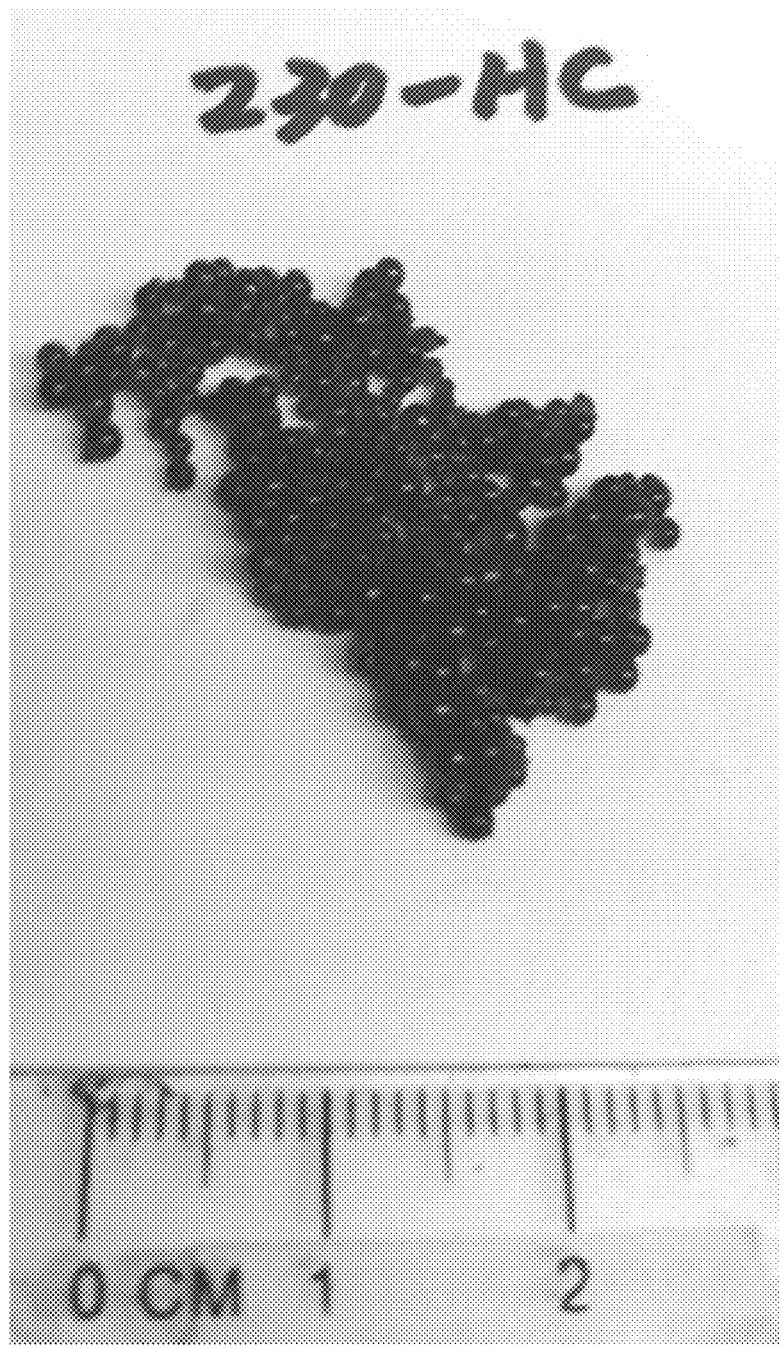
Figure 33:
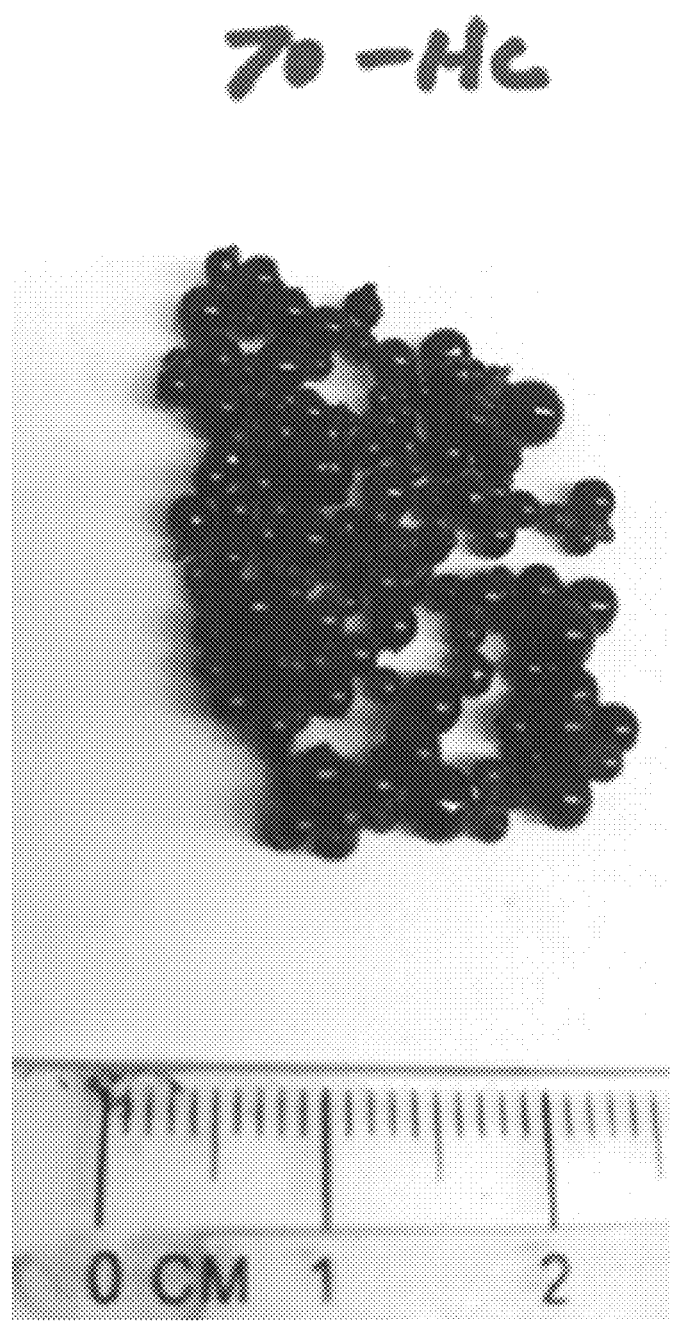

In a next set of experiments, all processing parameters, except the continuous phase, were kept the same. A single batch of prepolymer was prepared as described in part B. The continuous phases were selected from the same oil family: Flint Hills' saturated hydrocarbons with different chain lengths. The continuous phase chain lengths of 70-HC, 100-HC, 230-HC, and 600-HC were tested. As shown in FIGS. 31 (600 HC), 32 (230 HC) and 33 (70 Hc), the gel particle size decreases with increasing continuous phase hydrocarbon chain length. This finding demonstrates the easy bead size tenability by simply changing the continuous phase.

Depending on the applications and/or processing constraints, polymer beads with various sizes can be realized readily by adjusting continuous phase hydrocarbon chain length.

D. Polymer Formulation Effect

Figure 34:
FIGS. 34-36 are photographs of gel particles from Example 21 made from different prepolymer formulations.

It was also determined that the prepolymer composition has an impact on gel particle size. In this set of experiments, all experimental conditions were kept the same except the prepolymer compositions. The continuous phase was BDH White Paraffin oil, and the bead formation temperature (i.e., pre-reaction temperature) was 80° C. FIG. 34 shows gel particles formed using a prepolymer composition comprising 30% solids, 5% acetic acid, a resorcinol:ammonium acetate ratio of 50 and a formaldehyde:resorcinol ratio of 2.

Figure 35:
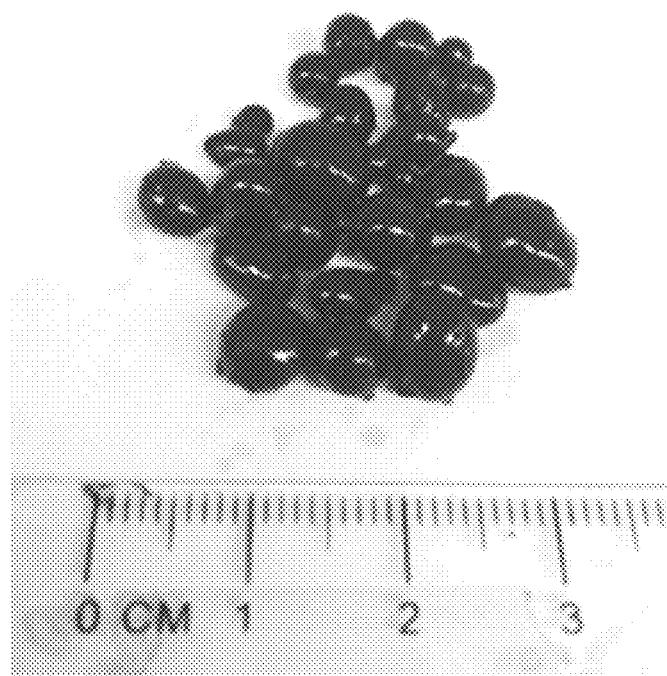
Figure 36:

As shown in FIGS. 34-36, gel particle size can be varied by changing the prepolymer formulations. FIG. 34 shows gel particles formed from a prepolymer composition comprising 30% solid, 5% acetic acid, Resorcinol:Ammonium Acetate ratio of 50, and Formaldehyde:Resorcinol of 2 (30/5/50/2). FIG. 35 shows gel particles formed from a prepolymer composition comprising 40% solid, 15% acetic acid, Resorcinol:Ammonium Acetate ratio of 25, and Formaldehyde:Resorcinol of 2 (40/15/25/2). FIG. 36 shows gel particles formed from a prepolymer composition comprising 40% solid, 25% acetic acid, Resorcinol:Ammonium Acetate ratio of 5, and Formaldehyde:Resorcinol of 2 (40/25/5/2).

Embodiments of the present disclosure further relate to any one or more of the following paragraphs:

1. A method for preparing a condensation polymer gel via an emulsion or suspension process, the method comprising: a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a polycondensation polymer gel.

2. A method for preparing a dried condensation polymer gel, the method comprising drying a condensation polymer gel, wherein the condensation polymer gel has been prepared by an emulsion or suspension process comprising: a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

3. A method for preparing a carbon material, the method comprising heating condensation polymer gel particles to obtain a carbon material, wherein the condensation polymer gel particles have been prepared by a process comprising: a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

4. The method according to any of the preceding paragraphs, wherein the polycondensation polymer gel is dried by freeze drying or by kiln drying.

5. The method according to any of the preceding paragraphs, wherein the condensation polymer gel is microporous.

6. The method according to any of the preceding paragraphs, wherein the condensation polymer gel is mesoporous.

7. The method according to any of the preceding paragraphs, wherein the condensation polymer gel comprises a pore structure having a mixture of microporous, mesoporous, and/or macroporous pores.

8. The method according to paragraph 3, wherein the carbon material is microporous.

9. The method according to paragraph 3, wherein the carbon material is mesoporous.

10. The method according to paragraph 3, wherein the carbon material comprises a pore structure having a mixture of microporous, mesoporous and/or macroporous pores.

11. The method according to any of the preceding paragraphs, wherein the continuous phase and the polymer phase are not miscible with each other, and the mixture is an emulsion or a suspension.

12. The method according to paragraph 11, wherein the polymer phase is not pre-reacted and the method is continuous.

13. The method according to any of the preceding paragraphs, wherein the continuous phase and the polymer phase are miscible.

14. The method according to paragraph 13, wherein the mixture becomes an emulsion or suspension upon aging.

15. The method according to any of the preceding paragraphs, wherein the polymer phase is aged prior to preparation of the mixture, and the mixture is a suspension upon combination of the continuous phase and the polymer phase.

16. The method according to any of the preceding paragraphs, wherein the polymer phase comprises two or more different polymer precursors.

17. The method according to any of the preceding paragraphs, wherein the polymer precursors are selected from an amine-containing compound, an alcohol-containing compound and a carbonyl-containing compound.

18. The method according to any of the preceding paragraphs, wherein the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

19. The method according to any of the preceding paragraphs, wherein the polymer precursors comprise an aldehyde and a phenol.

20. The method according to any of the preceding paragraphs, wherein the polymer precursors comprise formaldehyde and resorcinol.

21. The method according to any of the preceding paragraphs, wherein the polymer precursors comprise formaldehyde and phenol.

22. The method according to any of the preceding paragraphs, wherein the polymer precursors comprise formaldehyde and urea.

23. The method according to any of the preceding paragraphs, wherein the optional solvent is present.

24. The method according to paragraph 23, wherein the optional solvent comprises water.

25. The method according to any of the preceding paragraphs, wherein the continuous phase comprises an organic solvent.

26. The method according to any of the preceding paragraphs, wherein the continuous phase comprises a hydrocarbon solvent.

27. The method according to any of the preceding paragraphs, wherein the continuous phase comprises cyclohexane, paraffinic oil, xylene, isoparaffinic oils or combinations thereof.

28. The method according to paragraph 27, wherein the continuous phase is selected to be amenable for large scale production.

29. The method according to paragraph 28, wherein the continuous phase comprises paraffinic oil.

30. The method according to any of the preceding paragraphs, wherein the continuous phase has a purity greater than 99.9%.

31. The method according to any of the preceding paragraphs, further comprising admixing an electrochemical modifier with the mixture, the polymer phase or the continuous phase.

32. The method according to paragraph 31, wherein the electrochemical modifier comprises nitrogen or silicon.

33. The method according to any of the preceding paragraphs, wherein the polymer phase is prepared by admixing the one or more polymer precursors and the optional solvent.

34. The method according to any of the preceding paragraphs, wherein the mixture is prepared by admixing the continuous phase and the polymer phase.

35. The method according to paragraph 3, wherein heating the condensation polymer gel particles comprises pyrolyzing the condensation polymer gel particles by a method comprising heating the condensation polymer gel particles in an inert atmosphere at temperatures ranging from 500° C. to 2,400° C. to obtain pyrolyzed condensation polymer gel particles.

36. The method according to paragraph 35, wherein the temperature ranges from about 550° C. to about 900° C.

37. The method according to paragraph 35, further comprising activating the pyrolyzed condensation polymer gel particles by a method comprising contacting the pyrolyzed condensation polymer gel particles with an atmosphere comprising carbon dioxide, carbon monoxide, steam, oxygen or combinations thereof at a temperature may ranging from 800° C. to 1,300° C.

38. The method according to paragraph 37, wherein the temperature ranges from about 850° C. to about 950° C.

39. The method according to paragraph 37, wherein the pyrolyzed condensation polymer gel particles are activated to obtain a carbon material having a specific surface area ranging from 1,500 to 2,100 m²/g.

40. The method according to any of the preceding paragraphs, further comprising admixing a surfactant with the mixture, the polymer phase or the continuous phase.

41. The method according to paragraph 40, wherein the surfactant is a sorbitan surfactant.

42. The method according to paragraph 40, wherein the surfactant comprises SPAN™ 80, SPAN™ 85, SPAN™ 65, SPAN™ 60, SPAN™ 40, SPAN™ 20, TWEEN® 80, TWEEN® 40, TWEEN® 20, TWEEN® 21, TWEEN® 60, Triton-X® 100 or combinations thereof.

43. The method according to paragraph 42 where the surfactant is SPAN™ 80.

44. The method according to paragraph 42 where the surfactant is SPAN™ 20.

45. The method according to any of the preceding paragraphs, wherein the method further comprises use of a catalyst to increase a rate of formation of the polymer gel.

46. The method according to paragraph 45, wherein the catalyst comprises a basic volatile catalyst or organic catalyst or any other catalysts that can increase the polymerization rate.

47. The method according to paragraph 45, wherein the catalyst comprises ammonium carbonate, ammonium bicarbonate, ammonium acetate, ammonium hydroxide or combinations thereof.

48. The method according to paragraph 45, wherein the ratio of catalyst to one of the polymer precursors ranges from 2:1 to 2,000:1.

49. The method according to paragraph 45, wherein the ratio of catalyst to one of the polymer precursors is about 400:1.

50. The method according to paragraph 45, wherein the ratio of catalyst to one of the polymer precursors is about 100:1.

51. The method according to paragraph 45, wherein the ratio of catalyst to one of the polymer precursors is about 50:1.

52. The method according to paragraph 45, wherein the ratio of catalyst to one of the polymer precursors is about 10:1.

53. The method according to any of paragraphs 48-52, wherein the polymer precursor is a phenolic compound.

54. The method according to paragraph 53, wherein the phenolic compound is resorcinol.

55. The method according to paragraph 53, wherein the phenolic compound is phenol.

56. The method according to any of paragraphs 48-52, wherein the polymer precursor is an amine containing compound.

57. The method according to any of paragraphs 48-52, wherein the polymer precursor is urea.

58. The method according to any of paragraphs 48-52, wherein the polymer precursor is melamine.

59. The method according to any of the preceding paragraphs, further comprising admixing an acid with the mixture, the polymer phase or the continuous phase.

60. The method according to paragraph 59, wherein the acid is acetic acid.

61. The method according to paragraph 59, wherein the acid is oxalic acid.

62. The method according to paragraph 59, wherein the acid is added in an amount such that the mixture comprises from 5% to 35% of the acid on a solvent mass percent basis.

63. The method according to paragraph 59, the mixture comprises about 10% of the acid on a weight basis.

64. The method according to paragraph 59, the mixture comprises about 20% of the acid on a weight basis.

65. The method according to any of the preceding paragraphs, wherein the mixture comprises a surfactant and the surfactant is present in the mixture in an amount ranging from 0.01% to 20% on a weight basis.

66. The method according to any of the preceding paragraphs, wherein the mixture comprises a surfactant and the surfactant is present in the mixture in an amount ranging from 0.01% to 1.0% on a weight basis.

67. The method according to any of the preceding paragraphs, wherein the mixture comprises a surfactant and the surfactant is present in the mixture in an amount ranging from 9.0% to 11.0% on a weight basis.

68. The method according to any of the preceding paragraphs, wherein the mixture comprises a surfactant and the surfactant is present in the mixture in an amount ranging from 0.05% to 1.1% on a weight basis.

69. The method according to any of the preceding paragraphs, wherein aging the mixture includes stirring the mixture.

70. The method according to any of the preceding paragraphs, wherein mixture is aged at temperatures ranging from 20° C. to 90° C.

71. The method according to any of the preceding paragraphs, wherein the mixture is aged for a period of time ranging from 0.5 to 48 hours.

72. The method according to any of the preceding paragraphs, further comprising isolating the polymer gel particles.

73. The method according to paragraph 72, wherein isolating includes filtering, decanting a solvent or continuous phase or combinations thereof.

74. The method according to paragraph 72, further comprising drying the isolated polymer gel particles to remove volatile content.

75. The method according to paragraph 74, wherein drying comprises freeze drying.

76. The method according to any of the preceding paragraphs, wherein the polymer precursors are allowed to partially react prior to admixing the continuous phase with the polymer phase.

77. The method according to any of the preceding paragraphs, wherein the mixture comprises a surfactant and the polymer precursors are allowed to partially react prior to admixing the surfactant with mixture.

78. A carbon material or polymer gel prepared according to the method according to any one of paragraphs 1-77.

79. A carbon material or polymer gel having a particle size distribution such that $(Dv,90-Dv,10)/Dv,50$ is less than 3, wherein $Dv,10$, $Dv,50$, and $Dv,90$ are the particle size at 10%, 50%, and 90%, respectively of the particle size distribution by volume.

80. The carbon material or polymer gel of paragraph 79, wherein $(Dv,90-Dv,10)/Dv,50$ is less than 2.

81. The carbon material or polymer gel of paragraph 79, wherein $(Dv,90-Dv,10)/Dv,50$ is less than 1.

82. The carbon material of paragraph 79, wherein the carbon material has not been subjected to an operation for reducing the particle size of the carbon material.

83. The carbon material or polymer gel of paragraph 79, wherein the carbon material or polymer gel is prepared according to a method according to any one of paragraphs 1-77.

84. The carbon material of paragraph 78 or 79 comprising a plurality of carbon particles, wherein the plurality of carbon particles comprises a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3.

85. The carbon material or polymer gel of paragraph 78, wherein the carbon material or polymer gel comprises a plurality of carbon or polymer gel particles having a mean particle diameter ranging from about 1 µm to about 10 mm.

86. The carbon material or polymer gel of paragraph 78, wherein the carbon material or polymer gel comprises a plurality of carbon or polymer gel particles having a mean particle diameter of about 0.9 mm.

87. The carbon material or polymer gel of paragraph 78, wherein the carbon material or polymer gel comprises a plurality of carbon or polymer gel particles having a mean particle diameter of about 0.8 mm.

88. The carbon material or polymer gel of paragraph 78, wherein the carbon material or polymer gel comprises a plurality of carbon or polymer gel particles having a mean particle diameter of about 0.5 mm.

89. The carbon material or polymer gel of paragraph 78, wherein the carbon material or polymer gel comprises a plurality of carbon or polymer gel particles having a mean particle diameter ranging from about 100 µm to about 10 µm.

90. The carbon material or polymer gel of paragraph 78, wherein the carbon material or polymer gel comprises a plurality of carbon or polymer gel particles having a mean particle diameter of about 100 µm.

91. The carbon material or polymer gel of paragraph 78, wherein the carbon material or polymer gel comprises a plurality of carbon or polymer gel particles having a mean particle diameter of about 50 µm.

92. The carbon material or polymer gel of paragraph 78, wherein the carbon material or polymer gel comprises a plurality of carbon or polymer gel particles having a mean particle diameter of about 10 µm.

93. A carbon material comprising a plurality of carbon particles, wherein greater than 90% of the carbon particles have a spherical geometry as determined by optical microscopy and image analysis.

94. The carbon material of paragraph 93, wherein greater than 95% of the carbon particles have a spherical geometry.

95. The carbon material of paragraph 93, wherein the carbon material has been prepared by a method comprising a method according to any one of paragraphs 1-77.

96. An electrode comprising a carbon material according to any one of paragraphs 78-95.

97. An electrical energy storage device comprising a carbon material according to any one of paragraphs 78-95.

98. The electrical energy storage device of paragraph 97, wherein the electrical energy storage device is an electric double layer capacitor.

99. The electrical energy storage device of paragraph 97, wherein the electrical energy storage device is a battery.

100. The electrical energy storage device of paragraph 97, wherein the electrical energy storage device is a lithium/carbon battery, zinc/carbon battery, lithium air battery or lead acid battery.

101. A method for preparing a condensation polymer, the method comprising: a) preparing an emulsion, suspension or combination thereof by admixing a surfactant, one or more polymer precursors and a first and second solvent, wherein the first and second solvents are not miscible with each other; and b) aging the emulsion at a temperature and for a time sufficient for the one or more polymer precursors to react with each other and form a condensation polymer.

102. The method according to paragraph 101, wherein the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

103. The method according to paragraph 101, wherein at least one polymer precursor is a phenolic compound.

104. The method according to paragraph 101, wherein at least one polymer precursor is resorcinol.

105. The method according to paragraph 101, wherein at least one polymer precursor is phenol.

106. The method according to paragraph 101, wherein at least one polymer precursor is an aldehyde compound.

107. The method according to paragraph 101, wherein at least one polymer precursor is formaldehyde.

108. The method according to paragraph 101, wherein at least one polymer precursor is formaldehyde, at least one polymer precursor is resorcinol and the condensation polymer is a resorcinol-formaldehyde polymer.

109. The method according to paragraph 101, wherein at least one polymer precursor is urea.

110. The method according to paragraph 101, wherein at least one polymer precursor is melamine.

111. The method according to paragraph 101, wherein the method further comprises including an electrochemical modifier in the emulsion.

112. The method according to paragraph 111, wherein the electrochemical modifier comprises silicon or nitrogen.

113. A condensation polymer resin having a particle size distribution such that $(Dv,90-Dv,10)/Dv,50$ is less than 3, wherein $Dv,10$, $Dv,50$, and $Dv,90$ are the particle size at 10%, 50%, and 90%, respectively of the particle size distribution by volume.

114. The polymer resin of paragraph 113, wherein $(Dv,90-Dv,10)/Dv,50$ is less than 2.

115. The polymer resin of paragraph 113, wherein $(Dv,90-Dv,10)/Dv,50$ is less than 1.

116. The carbonized polymer resin of paragraph 113, wherein $(Dv,90-Dv,10)/Dv,50$ is less than 2.

117. The carbonized polymer resin of paragraph 113, wherein $(Dv,90-Dv,10)/Dv,50$ is less than 1.

118. The polymer resin of paragraph 113, wherein the polymer resin has been prepared by a method according to anyone of paragraphs 101 to 112.

119. A method for making a carbon material, comprising: combining one or more polymer precursors with one or more liquids to produce a mixture, wherein the mixture is an emulsion, dispersion, or a suspension, and wherein the liquid comprises hexane, pentane, cyclopentane, benzene, toluene, o-xylene, m-xylene, p-xylene, diethyl ether, ethylmethylketone, dichloromethane, tetrahydrofuran, mineral oils, paraffin oils, vegetable derived oils, or any mixture thereof; aging the mixture at a temperature and time sufficient for the polymer precursor to react and form polymer gel particles having a volume average particle size ($Dv,50$) greater than or equal to 1 mm; and heating the polymer gel particles to produce a carbon material.

120. The method according to paragraph 119, wherein heating the polymer gel particles comprises pyrolyzing the condensation polymer gel particles in an inert atmosphere at a temperature of about 500° C. to about 2,400° C. to produce the carbon material.

121. The method according to paragraph 119 or 120, wherein the liquid forms a continuous phase and the polymer precursor forms a discontinuous phase.

122. The method according to paragraph 121, wherein the continuous phase and the discontinuous phase are not miscible with each other.

123. The method according to paragraph 119 or 120, wherein the liquid and the polymer precursor are miscible with each other, and wherein upon aging the liquid and the polymer precursor are not miscible with each other such that the mixture becomes an emulsion or suspension.

124. The method according to any one of paragraphs 119 to 123, wherein the carbon material has a total pore volume from about 1 cm$^3$/g to about 7 cm$^3$/g.

125. The method according to paragraph 124, wherein at least 50% of the total pore volume resides in pores having a diameter of about 50 Å to about 5,000 Å.

126. The method according to any one of paragraphs 119 to 125, wherein carbon material has a mean particle diameter of about 1 μm to about 4 mm.

127. The method according to any one of paragraphs 119 to 126, wherein the carbon material has a specific surface area of about 100 m$^2$/g to about 3,000 m$^2$/g.

128. The method according to any one of paragraphs 119 to 127, wherein the carbon material has a particle size distribution such that (Dv,90–Dv,10)/Dv,50 is less than 3, wherein the Dv,10, Dv,50, and Dv,90 are the particle size at 10%, 50%, and 90%, respectively, of the particle size distribution by volume.

129. The method according to any one of paragraphs 119 to 128, wherein the carbon material has a pore structure comprising about 20% to about 80% micropores and about 20% to about 80% mesopores.

130. The method according to any one of paragraphs 119 to 128, wherein a pore structure of the carbon material comprises about 20% to about 90% micropores.

131. The method according to any one of paragraphs 119 to 128, wherein a pore structure of the carbon material comprises about 20% to about 80% mesopores.

132. The method according to any one of paragraphs 119 to 128, wherein the carbon material has a microporous structure, a mesoporous structure, macroporous structure, or any combination thereof.

133. The method according to any one of paragraphs 119 to 132, further comprising admixing an electrochemical modifier with the mixture, the polymer phase, or the liquid.

134. The method according to paragraph 133, wherein the electrochemical modifier comprises nitrogen or silicon.

135. The method according to any one of paragraphs 119 to 132, wherein the carbon material comprises less than 500 ppm of all elements having atomic numbers ranging from 11 to 92, as measured by proton induced x-ray emission.

136. A method for making a carbon material, comprising: heating polycondensation polymer gel particles to produce a carbon material, wherein the polycondensation polymer gel particles are prepared by a process comprising: preparing a mixture comprising a continuous phase and a polymer phase, wherein the polymer phase comprises one or more polymer precursors, wherein the continuous phase comprises hexane, pentane, cyclopentane, benzene, toluene, o-xylene, m-xylene, p-xylene, diethyl ether, ethylmethylketone, dichloromethane, tetrahydrofuran, mineral oils, paraffin oils, vegetable derived oils, or any mixture thereof; and aging the mixture at a temperature and for a time sufficient for the polymer precursor to react and form the polycondensation polymer gel particles, the polycondensation polymer gel particles having a volume average particle size (Dv,50) greater than or equal to 1 mm.

137. The method according to paragraph 136, wherein the polycondensation polymer gel particles have a microporous structure, a mesoporous structure, a macroporous structure, or any combination thereof.

138. The method according to paragraph 136 or 137, wherein the carbon material has a microporous structure, a mesoporous structure, macroporous structure, or any combination thereof.

139. The method according to any one of paragraphs 136 to 138, wherein the continuous phase and the polymer phase are not miscible with each other, and the mixture is an emulsion or a suspension.

140. The method according to any one of paragraphs 136 to 138, wherein the continuous phase and the polymer phase are miscible with one another, and wherein the mixture becomes an emulsion or suspension upon aging.

141. The method according to any one of paragraphs 136 to 140, wherein the polycondensation polymer gel particles are dried by freeze drying or by kiln drying prior to heating.

142. The method according to any one of paragraphs 136 to 141, wherein the polymer precursor comprises an aldehyde and at least one compound selected from the group consisting of: an amine-containing compound, an alcohol-containing compound, and a carbonyl-containing compound.

143. The method according to any one of paragraphs 136 to 141, wherein the polymer precursor comprises formaldehyde and at least one compound selected from the group consisting of: phenol, resorcinol, and urea.

144. The method according to any one of paragraphs 136 to 141, wherein the polymer precursors comprises an amine-containing compound, an alcohol-containing compound, a carbonyl-containing compound, or any mixture thereof.

145. The method according to any one of paragraphs 136 to 141, wherein the polymer precursors comprises an alcohol, a phenol, a polyol, a sugar, an alkyl amine, an aromatic amine, an aldehyde, a ketone, a carboxylic acid, an ester, a urea, an acid halide, an isocyanate, or any mixture thereof.

146. The method according to any one of paragraphs 136 to 145, wherein the continuous phase has a purity greater than 99.9%.

147. The method according to any one of paragraphs 136 to 146, further comprising admixing an electrochemical modifier with the mixture, the polymer phase or the continuous phase.

148. The method according to paragraph 147, wherein the electrochemical modifier comprises nitrogen or silicon.

149. A method for preparing a carbon material, comprising: admixing a surfactant, one or more polymer precursors, water, and an organic solvent to produce an emulsion or suspension, wherein a total weight of the surfactant and organic solvent has less than 50 wt % cyclohexane; aging the emulsion or suspension at a temperature and for a time sufficient for the one or more polymer precursors to react and form condensation polymer gel particles having a volume average particle size (Dv,50) greater than or equal to 1 mm; and heating the condensation polymer gel particles to produce a carbon material.

150. The method according to paragraph 149, wherein the polymer precursor comprises formaldehyde, phenol, resorcinol, urea, or any mixture thereof.

151. The method according to paragraph 149 or 150, further comprising admixing one or more acids with the surfactant, the polymer precursor, water, and the organic solvent to produce the emulsion or suspension.

152. The method according to paragraph 151, wherein the acid comprises acetic acid, oxalic acid, or a mixture thereof.

153. The method according to paragraph 149 or 150, further comprising admixing one or more basic catalysts with the surfactant, the polymer precursor, water, and the organic solvent to produce the emulsion or suspension.

154. The method according to paragraph 153, wherein the basic catalyst comprises ammonium carbonate, ammonium bicarbonate, ammonium acetate, ammonium hydroxide, or any mixture thereof.

155. The method according to any one of paragraphs 149 to 154, wherein the carbon material has at least one property selected from the group consisting of: a total pore volume from about 1 cm$^3$/g to about 7 cm$^3$/g; a mean particle diameter of about 1 µm to about 4 mm; a specific surface area of about 100 m$^2$/g to about 3,000 m$^2$/g; a particle size distribution such that (Dv,90–Dv,10)/Dv,50 is less than 3, where Dv,10, Dv,50, and Dv,90 are the particle size at 10%, 50%, and 90%, respectively, of the particle size distribution by volume; a pore structure comprising about 20% to about 90% micropores; and a pore structure comprising about 20% to about 80% mesopores.

156. A carbon material manufactured according to any one of paragraphs 119 to 155, comprising a plurality of carbon particles, wherein greater than 90% of the carbon particles have a spherical geometry as determined by optical microscopy and image analysis.

157. The carbon material according to paragraph 156, wherein greater than 95% of the carbon particles have a spherical geometry.

158. The carbon material according to paragraph 156 or 157, wherein the carbon material has a particle size distribution such that (Dv,90–Dv,10)/Dv,50 is less than 3, wherein Dv,10, Dv,50, and Dv,90 are the particle size at 10%, 50%, and 90%, respectively of the particle size distribution by volume.

159. The carbon material according to paragraph 158, wherein (Dv,90–Dv,10)/Dv,50 is less than 2.

160. The carbon material according to paragraph 158, wherein (Dv,90–Dv,10)/Dv,50 is less than 1.

161. The carbon material according to any one of paragraphs 156 to 160, wherein the carbon particles have a mean particle diameter of about 1 µm to about 4 mm.

162. The carbon material according to any one of paragraphs 156 to 161, wherein the carbon material has not been subjected to an operation for reducing the particle size of the carbon material.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method for making a carbon material, comprising:
    combining one or more polymer precursors with one or more liquids to produce a mixture, wherein the mixture is an emulsion, a dispersion, or a suspension, and wherein the liquid comprises hexane, pentane, cyclopentane, benzene, toluene, o-xylene, m-xylene, p-xylene, diethyl ether, ethylmethylketone, dichloromethane, tetrahydrofuran, a mineral oil, a paraffin oil, a vegetable derived oil, or any mixture thereof;
    aging the mixture at a temperature and time sufficient for the polymer precursor to react and form polymer gel particles having a volume average particle size (Dv,50) of greater than or equal to 1 mm; and
    heating the polymer gel particles to produce a carbon material.

2. The method according to claim 1, wherein heating the polymer gel particles comprises pyrolyzing the polymer gel particles in an inert atmosphere at a temperature of about 500° C. to about 2,400° C. to produce the carbon material.

3. The method of claim 1, wherein the carbon material has a total pore volume of about 1 cm$^3$/g to about 7 cm$^3$/g.

4. The method of claim 1, wherein the carbon material comprises activated carbon.

5. The method of claim 1, wherein the carbon material has a specific surface area of about 100 m$^2$/g to about 3,000 m$^2$/g.

6. The method of claim 1, wherein the carbon material has a particle size distribution such that (Dv,90–Dv,10)/Dv,50 is less than 3, wherein the Dv,10, Dv,50, and Dv,90 are the particle sizes at 10%, 50%, and 90% of the particle size distribution by volume, respectively.

7. The method of claim 1, wherein the polymer gel particles having the volume average particle size (Dv,50) of greater than or equal to 1 mm are made without milling, grinding, or other physical means of particle sizing.

8. The method of claim 1, wherein:
    the polymer gel particles having the volume average particle size (Dv,50) of greater than or equal to 1 mm are made without milling, grinding, or other physical means of particle sizing, the carbon material has a total pore volume of about 1 cm³/g to about 7 cm³/g,
at least 50% of the total pore volume resides in pores having a diameter of about 50 Å to about 5,000 Å,
the carbon material has a specific surface area of about 100 m²/g to about 3,000 m²/g, and
the carbon material has a particle size distribution such that (Dv,90−Dv,10)/Dv,50 is less than 3, wherein the Dv,10, Dv,50, and Dv,90 are the particle sizes at 10%, 50%, and 90% of the particle size distribution by volume, respectively.

9. The method of claim 1, further comprising combining an electrochemical modifier with the one or more polymer precursors, the one or more liquids, or the mixture, wherein the electrochemical modifier comprises nitrogen or silicon.

10. The method of claim 1, further comprising combining an acid and a basic catalyst with the one or more polymer precursors and the one or more liquids to produce the mixture, wherein the acid comprises acetic acid, oxalic acid, or a mixture thereof, and wherein the basic catalyst comprises ammonium carbonate, ammonium bicarbonate, ammonium acetate, ammonium hydroxide, or any mixture thereof.

11. A method for making a carbon material, comprising:
mixing a polymer precursor and a liquid to produce an emulsion, wherein a continuous phase of the emulsion comprises the liquid, and wherein the liquid comprises hexane, pentane, cyclopentane, benzene, toluene, o-xylene, m-xylene, p-xylene, diethyl ether, ethylmethylketone, dichloromethane, tetrahydrofuran, mineral oils, paraffin oils, vegetable derived oils, or any mixture thereof;
aging the mixture at a temperature and for a time sufficient for the polymer precursor to react and form polycondensation polymer gel particles having a volume average particle size (Dv,50) of greater than or equal to 1 mm; and
heating the polycondensation polymer gel particles to produce a carbon material.

12. The method of claim 11, wherein the polymer precursor comprises an aldehyde and at least one compound selected from the group consisting of: an amine-containing compound, an alcohol-containing compound, and a carbonyl-containing compound.

13. The method of claim 11, wherein the polymer precursor comprises formaldehyde and at least one compound selected from the group consisting of: phenol, resorcinol, and urea.

14. The method of claim 11, wherein:
the polycondensation polymer gel particles having the volume average particle size (Dv,50) of greater than or equal to 1 mm are made without milling, grinding, or other physical means of particle sizing,
the carbon material has a total pore volume of about 1 cm³/g to about 7 cm³/g,
at least 50% of the total pore volume resides in pores having a diameter of about 50 Å to about 5,000 Å,
the carbon material has a specific surface area of about 100 m²/g to about 3,000 m²/g, and
the carbon material has a particle size distribution such that (Dv,90−Dv,10)/Dv,50 is less than 3, wherein the Dv,10, Dv,50, and Dv,90 are the particle sizes at 10%, 50%, and 90% of the particle size distribution by volume, respectively.

15. The method of claim 11, further comprising mixing an electrochemical modifier with the polymer precursor and the liquid, wherein the electrochemical modifier comprises nitrogen or silicon.

16. The method of claim 11, further comprising mixing an acid and a basic catalyst with the a polymer precursor and the liquid to produce the emulsion, wherein the acid comprises acetic acid, oxalic acid, or a mixture thereof, and wherein the basic catalyst comprises ammonium carbonate, ammonium bicarbonate, ammonium acetate, ammonium hydroxide, or any mixture thereof.

17. A method for preparing a carbon material, comprising:
mixing a surfactant, one or more polymer precursors, water, and an organic solvent to produce an emulsion or suspension, wherein a total weight of the surfactant and organic solvent contains less than 50 wt % cyclohexane;
aging the emulsion or suspension at a temperature and for a time sufficient for the one or more polymer precursors to react and form condensation polymer gel particles having a volume average particle size (Dv,50) greater than or equal to 1 mm; and
heating the condensation polymer gel particles to produce a carbon material.

18. The method of claim 17, further comprising mixing an acid with the surfactant, the polymer precursor, water, and the organic solvent to produce the emulsion or suspension, wherein the acid comprises acetic acid, oxalic acid, or a mixture thereof, and wherein the polymer precursor comprises formaldehyde and at least one of phenol, resorcinol, and urea.

19. The method of claim 18, further comprising mixing a basic catalyst with the surfactant, the polymer precursor, water, the organic solvent, and the acid to produce the emulsion or suspension, and wherein the basic catalyst comprises ammonium carbonate, ammonium bicarbonate, ammonium acetate, ammonium hydroxide, or any mixture thereof.

20. The method of claim 19, wherein:
the condensation polymer gel particles having the volume average particle size (Dv,50) of greater than or equal to 1 mm are made without milling, grinding, or other physical means of particle sizing,
the carbon material has a total pore volume of about 1 cm³/g to about 7 cm³/g,
a specific surface area of about 100 m²/g to about 3,000 m²/g, and
a particle size distribution such that (Dv,90−Dv,10)/Dv,50 is less than 3, wherein the Dv,10, Dv,50, and Dv,90 are the particle sizes at 10%, 50%, and 90% of the particle size distribution by volume, respectively.

* * * * *